(12) United States Patent
Abbott

(10) Patent No.: US 8,370,762 B2
(45) Date of Patent: Feb. 5, 2013

(54) MOBILE FUNCTIONAL ICON USE IN OPERATIONAL AREA IN TOUCH PANEL DEVICES

(75) Inventor: Martin Jeffrey Abbott, Flemington, NJ (US)

(73) Assignee: Cellco Partnership, Basking Ridge, NJ (US)

(*) Notice: Subject to any disclaimer, the term of this patent is extended or adjusted under 35 U.S.C. 154(b) by 393 days.

(21) Appl. No.: 12/421,934

(22) Filed: Apr. 10, 2009

(65) Prior Publication Data

US 2010/0262928 A1 Oct. 14, 2010

(51) Int. Cl.
*G06F 3/048* (2006.01)
(52) U.S. Cl. ........ 715/769; 715/835; 715/864; 455/566; 345/173
(58) Field of Classification Search .................. 715/801, 715/864, 769, 702, 835, 863; 345/173; 455/566; 709/204
See application file for complete search history.

(56) References Cited

U.S. PATENT DOCUMENTS

| | | | | |
|---|---|---|---|---|
| 5,603,053 | A * | 2/1997 | Gough et al. | 710/5 |
| 5,657,049 | A * | 8/1997 | Ludolph et al. | 715/856 |
| 6,121,968 | A * | 9/2000 | Arcuri et al. | 715/825 |
| 6,545,669 | B1 * | 4/2003 | Kinawi et al. | 345/173 |
| 7,383,308 | B1 * | 6/2008 | Groves et al. | 709/206 |
| 2005/0105135 | A1 * | 5/2005 | Takahashi | 358/1.18 |
| 2005/0138631 | A1 | 6/2005 | Bellotti et al. | |
| 2006/0010197 | A1 | 1/2006 | Ovenden | |
| 2007/0245257 | A1 * | 10/2007 | Chan et al. | 715/769 |
| 2008/0082934 | A1 | 4/2008 | Kocienda et al. | |
| 2008/0098331 | A1 | 4/2008 | Novick et al. | |
| 2008/0270926 | A1 * | 10/2008 | Dettinger et al. | 715/769 |
| 2009/0019376 | A1 | 1/2009 | Quillen et al. | |
| 2009/0122018 | A1 | 5/2009 | Vymenets et al. | |
| 2009/0172594 | A1 * | 7/2009 | Chen | 715/810 |
| 2009/0227296 | A1 * | 9/2009 | Kim | 455/566 |
| 2009/0228820 | A1 * | 9/2009 | Kim et al. | 715/769 |
| 2009/0259959 | A1 * | 10/2009 | Grotjohn et al. | 715/769 |
| 2010/0251119 | A1 * | 9/2010 | Geppert et al. | 715/716 |
| 2011/0047459 | A1 * | 2/2011 | Van Der Westhuizen | 715/702 |

OTHER PUBLICATIONS

International Search Report issued in International Application No. PCT/US2010/30157 dated Jun. 2, 2010.

* cited by examiner

*Primary Examiner* — Kieu Vu
*Assistant Examiner* — James T Durkin

(57) ABSTRACT

The mobile terminal, configured to execute a variety of functions, has a touch panel display and circuitry for controlling the touch panel display and responding to touching of the touch panel display. The touch panel display is configured to display a number of functional icons, each of which is associated with one of the functions of the mobile terminal. When the circuitry detects an icon being dragged into a first region which is a designated area of the touch panel display and tapped or released by a user, the mobile terminal executes the function with which the icon is associated. Further, when a destination icon associated with contact information is displayed and the circuitry detects that an icon is dragged and overlapped with the destination icon, the mobile terminal executes the function with which the icon is associated with respect to the contact information.

53 Claims, 38 Drawing Sheets

MOBILE FUNCTIONAL ICON USE IN OPERATIONAL AREA IN TOUCH PANEL DEVICES

RELATED TECHNOLOGY FIELD

The present application relates to a smart object based graphical user interface for a mobile terminal having a touch panel display and the method for operating the same. Examples of the mobile terminal include a cellular phone, a PDA (Personal Digital Assistance) and a mobile computer, which have a touch panel display for an input device.

BACKGROUND

Many of mobile terminals such as a cellular phone, a PDA or a mobile computer use a touch panel display as an input device for a user to input instructions or commands into the terminal. For example, the user can dial a phone number by touching numbers displayed on the touch panel display. Further, since the mobile terminals have a variety of functions other than a phone, the touch panel display has become a more important feature for the mobile terminals as an input device of the commands or instructions for the functions.

Conventionally, a user of a mobile terminal, for example, a cellular phone, has needed to invoke several separate steps to accomplish a desired function. To send a text message, for example, the user would have to: access a main menu, locate the messaging icon, and press the messaging icon; specify the type of message to send (e.g., text message) which is located on a new screen; go to the list of contact information (e.g., an address book) and locate the contact; select a specific contact; navigate back to the composer; type the text message; and send the text message.

In addition, as the functions of the mobile terminals have not been well integrated, the user has been forced to re-invoke functions instead of stringing existing functions together to complete the function. If the user's goal is to get directions to a location of a person listed in the contact information, the user would need to do, for example, perform the following steps: select the "Contacts" icon from the main menu; locate the specific contact in the contact list; locate the address in the contact detail information; memorize (or copy) the contact information; launch the navigator application (e.g., VZ Navigator®); enter (or paste) the contact information into the navigator application; and press a button to display the directions to the contact.

As described above, the conventional mobile terminal and the operation method have required multiple steps to complete the desired function of the mobile terminal, which has resulted in time consuming and complex operational methods of the mobile terminal. Based on the above, there is a need for a more intuitive and easy operational method of a mobile terminal having a touch panel display to select and operate various functions available to the users via the touch panel display of the mobile terminal. Specifically, a more user friendly and intuitive graphical user interface for a mobile terminal has been required.

SUMMARY

It is one objective of the present application to provide a more intuitive and easy operational method using "a smart object" (a functional icon) base graphical user interface for a mobile terminal having a touch panel display. It is yet another objective to provide one of operational methods requiring fewer steps to accomplish a function of the mobile terminal.

Accordingly, this application discloses a mobile terminal configured to execute a plurality of functions. The mobile terminal has a touch panel display and a circuitry for controlling the touch panel display and for responding to touching of the touch panel display. In a first example of this type of disclosed mobile terminal, the touch panel display or its circuitry is configured to display a plurality of functional icons (i.e., smart objects). Each of the functional icons is associated with one of the plurality of functions of the mobile terminal. Further, when the circuitry detects one of the functional icons being dragged into a first region, which is a designated area of the touch panel display, and tapped or released by a user on the touch panel display, the mobile terminal executes the function with which the one of the functional icons is associated.

The circuitry in the first example of the mobile terminal may further control the touch panel display to display a destination icon associated with contact information. The contact information with which the destination icon is associated may include a telephone number, an e-mail address, an instant message screen name, a website address or a social networking site address. When the circuitry detects that the one of the functional icons is dragged and overlapped with the destination icon within the first region on the touch panel display, the mobile terminal executes the function with which the one of the functional icons is associated with respect to the contact information.

The circuitry may further control the touch panel display to display a plurality of incoming event icons. Each of the incoming event icons is associated with an incoming event which is triggered by an incident other than user input and with one of the plurality of functions of the mobile terminal. The incoming events may include receiving an incoming call, receiving a text message, receiving an e-mail or receiving an instant message. The mobile terminal is further configured to notify the user regarding reception of the incoming event upon receiving the incoming event by the mobile terminal. When the circuitry detects one of the incoming event icons, which is associated with the incoming event received by the mobile terminal, being dragged into the first region and released by the user, the mobile terminal executes the function with which the particular incoming event icon is associated.

This application also relates to a mobile terminal configured to execute a plurality of functions. The mobile terminal has a touch panel display and a circuitry configured to control the touch panel display and to respond to the touching of the touch panel display. In the second example of this type of the mobile terminal, the circuitry configures the touch panel display to display a destination icon associated with one of contact information including an e-mail address, a web site address, a social networking site address and any contact information capable of receiving electronic data, and to display a content icon associated with one of text data, image data, sound data and program data stored in the mobile terminal. When the circuitry detects that the destination icon overlaps with the content icon on the touch panel display, the mobile terminal sends the one of text data, image data, sound data and program data with which the content icon is associated to the one of an e-mail address, a web site address, a social networking site address and any contact information capable of receiving electronic data with which the destination icon is associated.

This application further relates to a method for operating a mobile terminal having a touch panel display. Specifically, the method includes steps of displaying a plurality of functional icons, each of which is associated with one of the plurality of functions, on the touch panel display. The method further includes steps of detecting touching of the touch panel display in such a manner that one of the functional icons is dragged into a first region, which is a designated area of the touch panel display and tapped or released by a user on the touch panel display and, responsive to the detecting, executing the function with which the one of the functional icons is associated.

This application also relates to a method for operating a mobile terminal having a touch panel display. The method includes steps of displaying a plurality of functional icons, each of which is associated with one of the plurality of functions, on the touch panel display; and displaying a destination icon associated with contact information. The method further includes steps of detecting the touching of the touch panel display in such a manner that one of the functional icons is dragged and overlapped with the destination icon on the touch panel display and, responsive to the detecting, executing the function with which the one of the functional icons is associated with respect to the contact information with respect to the contact information.

The method may further include steps of displaying a plurality of incoming event icons, each of which is associated with an incoming event which is triggered by an incident other than user input and with one of the plurality of functions; notifying the user reception of one of the incoming events upon receiving the one of the incoming event. The method further include steps of detecting the touching of the touch panel display such a manner that one of the incoming event icons, which is associated with the one of the incoming events received by the mobile terminal, is dragged into the first area by the user on the touch panel display; and, responsive to the touching, executing the function with which the one of the incoming event icons is associated. The incoming events may include receiving an incoming call, receiving a text message, receiving an e-mail or receiving an instant message.

This application further relates to a method for operating a mobile terminal having a touch panel display, including steps of displaying a destination icon associated with contact information including an e-mail address, a web site address, a social networking site address and any destination information capable of receiving electronic data on the touch panel display. The method also includes displaying a content icon associated with one of text data, image data, sound data and program data stored in the mobile terminal on the touch panel display and detecting touching of the touch panel display in such a manner that the destination icon overlaps with the content icon and, responsive to the detecting, sending the one of text data, image data, sound data and program data with which the content icon is associated to the one of an e-mail address, a web site address, a social networking site address and any destination information capable of receiving electronic data with which the destination icon is associated.

Furthermore, this application relates to an article of manufacture, including a machine readable storage medium and programming instructions embodied in the medium for execution by a programmable controller of a mobile terminal having a touch panel display. Execution of the programming instructions by the programmable controller causes the mobile terminal to execute tasks. The tasks include displaying a plurality of functional icons on the touch panel display, each of the functional icons being associated with one of the plurality of functions; detecting touching of the touch panel display in such a manner that one of the functional icons is dragged into a first region, which is a designated area of the touch panel display, and tapped or released by a user; and responsive to the detecting, executing the function with which the one of the functional icons is associated.

This application also relates to an article of manufacture, including a machine readable storage medium and programming instructions embodied in the medium for execution by a programmable controller of a mobile terminal having a touch panel display, wherein execution of the programming instructions by the programmable controller causes the mobile terminal to execute tasks. The tasks include displaying a plurality of functional icons on the touch panel display, each of the functional icons being associated with one of the plurality of functions; displaying a destination icon associated with contact information; detecting touching of the touch panel display in such a manner that the one of the plurality of functional icons is dragged and overlapped with the destination icon; and responsive to the detecting, executing the function with which the one of the functional icons is associated with respect to the contact information.

Further, the tasks may include: displaying a destination icon associated with contact information including an e-mail address, a web site address, a social networking site address and any destination information capable of receiving electronic data on the touch panel display; and displaying a content icon associated with one of text data, image data, sound data and program data stored in the mobile terminal on the touch panel display. The tasks further includes: detecting touching of the touch panel display in such a manner that the destination icon overlaps with the content icon; and responsive to the detecting, sending the one of text data, image data, sound data and program data with which the content icon is associated to the one of an e-mail address, a web site address, a social networking site address and any destination information capable of receiving electronic data with which the destination icon is associated.

In accordance with one embodiment, since a functional icon is associated with one of the functions of the mobile terminal, a user may operate the mobile terminal without taking a lot of steps. Accordingly, a more user friendly and easier mobile terminal and an operation method may be provided.

The present mobile terminal itself, together with further objects and advantages, can be better understood by reference to the following detailed description and the accompanying drawings.

DETAILED DESCRIPTION (1) Device Configuration

Figure 1:
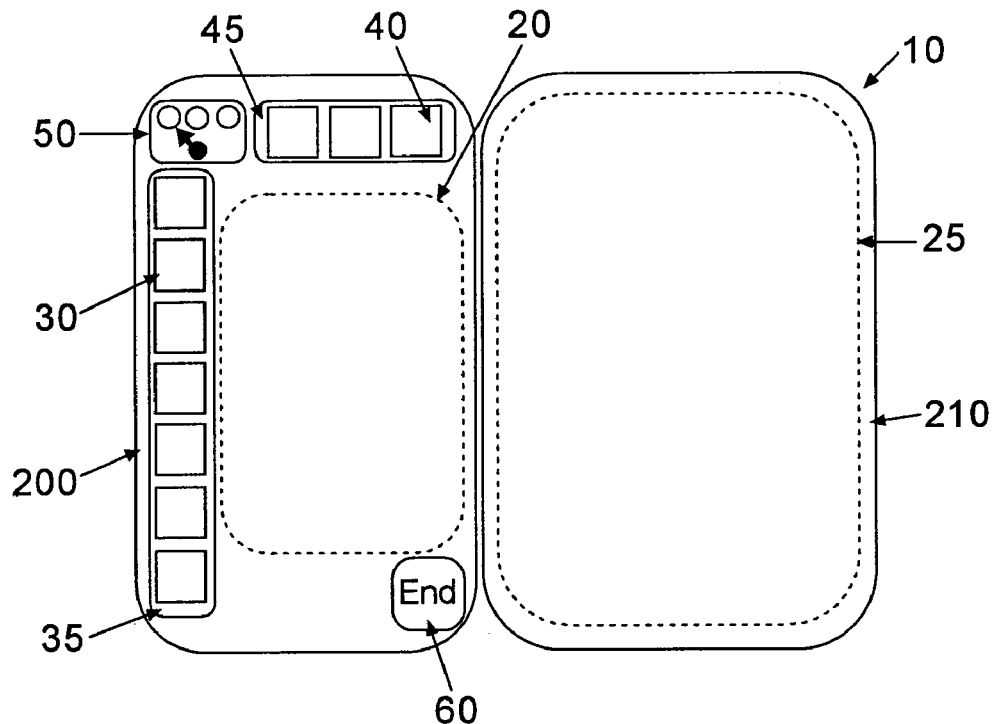
FIG. 1 is an exemplary schematic view of a mobile terminal having a touch panel display.
Figure 2:
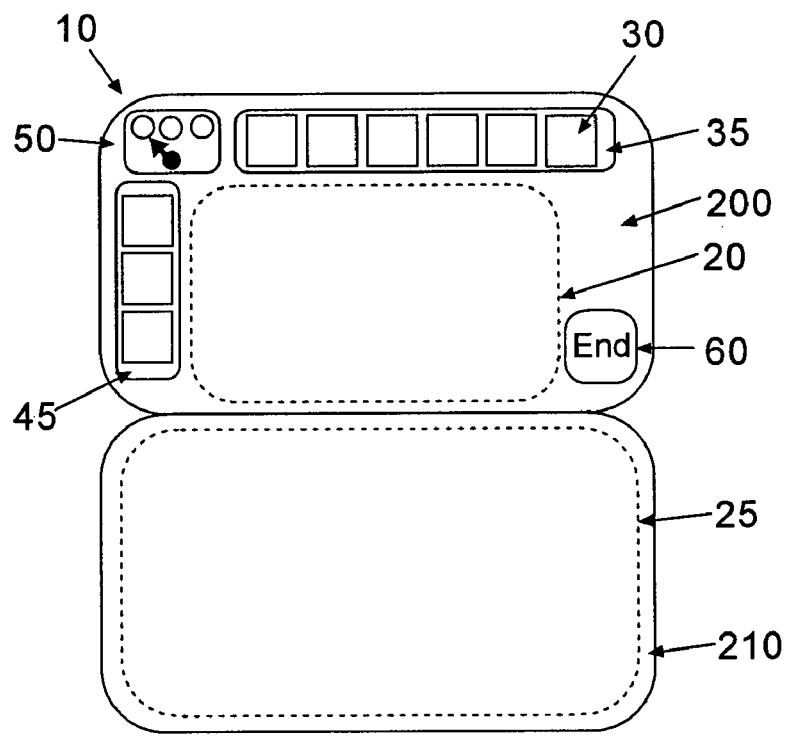
FIG. 2 is another exemplary schematic view of a mobile terminal having a touch panel display.

FIG. 1 shows an example of a mobile terminal having a touch panel display, for example a cellular phone, as may be operated in accordance with one embodiment of the present teachings. FIG. 2 shows another example of the same or a different mobile terminal having a touch panel display, e.g., in a different orientation.

In the examples of FIGS. 1 and 2, the mobile terminal 10 has a touch panel display. The touch panel display may comprise a first touch panel display 200 and a second touch panel display 210. The first touch panel display is configured by circuitry to display a plurality of functional icons 30, which is a first example of "smart objects." A functional icon is a user interface element that is associated with one of the functions of the mobile terminal. The functional icons 30 may be grouped into functional icon groups. One of the functional icon groups is displayed as a functional icon palette 35 on the first touch panel display 200. The first touch panel 200 is further configured to display a toggle switch icon 50 that allows the user to switch between two or more of the functional icon palettes by, for example, tapping the toggle switch icon 50. The icon palettes may contain different sets of the functional icons.

The touch panel display has a first region 20 on, for example, the first touch panel display 200 so that the user may touch and drag the functional icons from the displayed icon palettes into the first region 20, to trigger the function. The first region 20 is a designated area of the first touch panel display. It is not necessary that the first region 20 is physically or visually displayed on the first touch panel display 200. The whole first touch panel display may be the first region. The touch panel display further has a second region 25 on, for example, the second touch panel display 210 where a user interface relating to the function with which the functional icon is associated is displayed and executed. The second region may be referred to an execution area (or screen) in this application. The second region 25 is a designated area of one of the touch panel displays, and is not necessarily a physically or visually displayed or divided area of the second touch panel display 210. The whole second touch panel display 210 may be the second region 25.

The first touch panel display 200 is configured by the circuitry to display a plurality of incoming event icons 40 in an incoming icon palette 45. An incoming event icon is another type of smart object, and in this case a user interface element that is associated with an incoming event which is triggered by an incident other than user input and is associated with one of a plurality of functions of the mobile terminal 10. Examples of the incoming events are receiving a phone call, receiving a text message or receiving an e-mail. The incoming event icons 40 may be grouped into an incoming event icon group displayed as an incoming event icon palette 45 on the first touch panel display 200.

The first touch panel display 200 is further configured by the circuitry to display a termination icon 60 which is used to end processes that are running.

Figure 3:
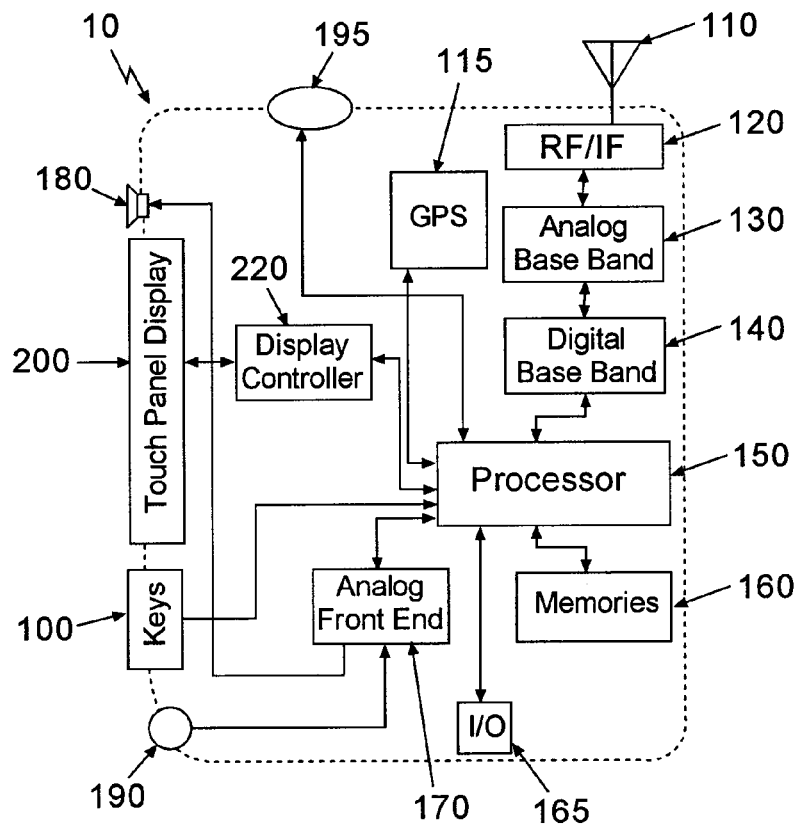
FIG. 3 is an exemplary block diagram of the mobile terminal having a touch panel display.

FIG. 3 shows an exemplary block diagram of the mobile terminal 10 of FIG. 1 or 2 having a touch panel display. The mobile terminal 10 comprises keys 100, an RF interface 120 connected to the antenna 110, an analog base band processor 130 and a digital base band processor 140 connected to a processor 150. A display controller or driver 220 is connected to the touch panel displays 200 and 210 and the processor 150, for controlling the touch panel displays 200 and 210. An analog front end processor 170 is connected to the processor 150 and controls the speaker 180 and the microphone 190. The processor controls the display controller 220, RF circuits (120, 130 and 140) and the analog front end processor 170. The processor 150 also connects to one or more memories 160. The memories 160 may comprise a RAM, a ROM or a flash memory, and may include a removable memory card. The mobile terminal may include a camera (still and/or video) 195 to take a picture or a video. The mobile terminal may further include a GPS (Global Positioning System) receiver 115 for use in locating the position of the mobile terminal 10. The mobile terminal may further include an input/output (I/O) terminal 165. The I/O port may be a USB port.

In this embodiment, the touch panel displays 200 and 210 are controlled by the display controller 220, i.e., circuitry. The display controller may detect and respond to the touching of the touch panel display by the user. However, the display controller may be included in the touch panel displays 200 and 210 or in the processor 150, and may be any circuitries configured to control outputs on and respond to touching of the touch panel displays 200 and 210. The display controller may also be controlled by the processor 150 and/or software. In the embodiment, the touch panel displays 200 and 210 are configured to be controlled by, e.g. the display controller 220 and the display controller 220 is configured to be controlled by, e.g. the processor 150.

The configuration of these elements is not limited to that shown in FIGS. 1 and 2. For example, the mobile terminal may display the termination icon 60 on the second touch panel display 210. The mobile terminal may have only one touch panel display instead of having the first touch panel display 200 and the second touch panel display 210.

(2) Syntax

The exemplary mobile terminal performs a function based on one or more interactions of a functional icon with displayed regions, the user's actions and/or one or more of other icons. The syntax underlying the interactions of icons is based on functions, contents, destinations and tools.

The function refers to the "action" part of the interaction (e.g., send, reply, answer, end, and view). The content refers to the "noun" part of the interaction or function (e.g., text messages, e-mail messages, songs, pictures and voice calls). The destination refers to the "target" part of the interaction or function (e.g., contact information such as a phone number, an email address or a social networking site to which a call or content is to be sent). A tool is an enabler function or operation used to accomplish a task (e.g., dialer, a message composer, or a music player).

Figure 4:
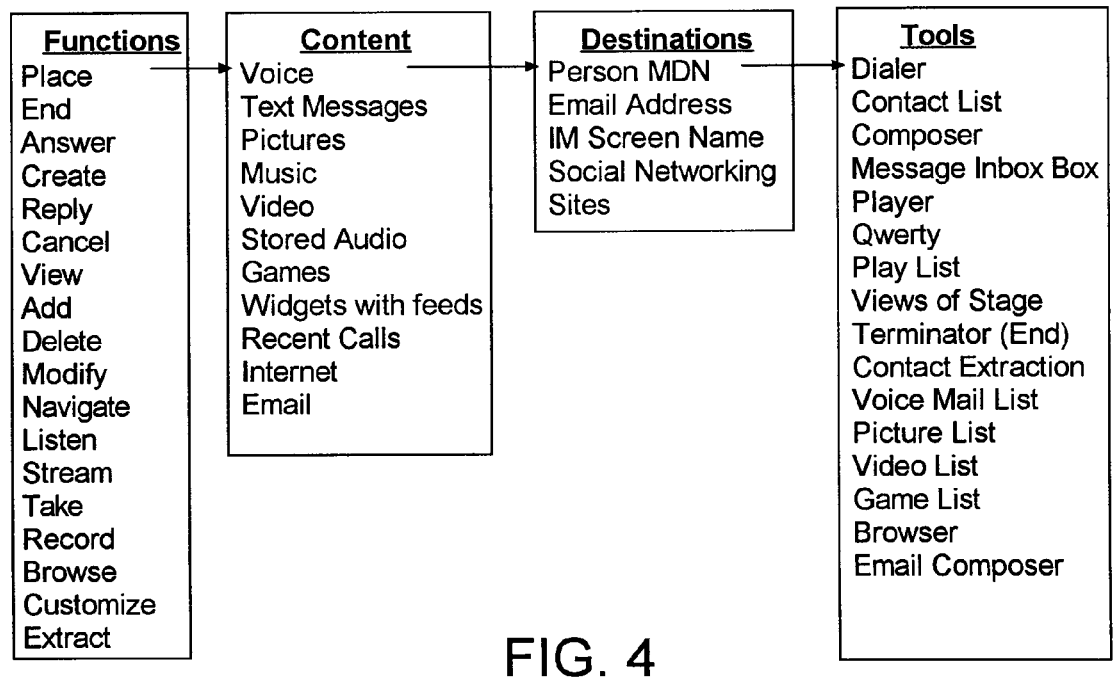
FIG. 4 is examples of syntax used in controlling the mobile terminal having a touch panel display.

FIG. 4 shows the example of the functions, contents, destinations and tools in the syntax that may be used to implement the smart object based graphical user interface (GUI) on a touch panel display of a mobile terminal. For example, the arrow in FIG. 4 shows the case of "Placing a voice call to a person's telephone number (TELEPHONE NUMBER) using a dialer tool."

Details of the functions are exemplified as follows.

2-1. PLACE

The "PLACE" function enables the mobile terminal to: place a voice call to a person's TELEPHONE NUMBER using a dialer; place a voice call to a person's TELEPHONE NUMBER using a contact list; place a voice call to a person's TELEPHONE NUMBER using an extracted contact (note: an extracted contact is a specific contact that has been placed onto the first region as explained below); or place a voice call to a person's TELEPHONE NUMBER using the list of recent calls.

2-2. END

The "END" function enables the mobile terminal to: end a voice call from execution area; or end a call using the termination icon.

2-3. ANSWER

The "ANSWER" function enables the mobile terminal to: answer a voice call from the incoming event icon palette; or answer a voice call from an extracted contact.

2-4. CREATE

The "CREATE" function enables the mobile terminal to: create a text message using the composer and send to a person's TELEPHONE NUMBER using the dialer; create a text message using the composer and send to a person's TELEPHONE NUMBER using the contact list; create a text message using the composer and send to a person's TELEPHONE NUMBER using an extracted contact; create an email message using the composer and send to a person's email address using the contact list; create an email message using the composer and send to a person's email address using an extracted contact; create an IM (instant messaging) message using the composer and send to a person's IM screen name using the contact list; create an IM message using the composer and send to a person's IM screen name using an extracted contact; create a message using the composer and send to a social networking site (SNS) using the contact list; or create a message using the composer and send to a SNS using an extracted contact.

2-5. REPLY

The "REPLY" function enables the mobile terminal to: reply to a text message from the incoming event icon palette using the composer; reply to a text message from an extracted contact; and reply to an email using the email composer.

2-6. CANCEL

The "CANCEL" function enables the mobile terminal to cancel any process using the termination icon.

2-7. VIEW

The "VIEW" function enables the mobile terminal to: view a list of contacts using the contact list; view a list of text messages using the message inbox; view a list of recent calls using the recent call list; view pictures using the player; view videos using the player; view a list of music using the play list; view of list of voice mails using the voice mail list; view a list of games; view a list of email messages; or view streaming video from the incoming event icon palette.

2-8. ADD

The "ADD" function enables the mobile terminal to add a contact to the contact list. It may also apply to adding a song to a playlist, adding a picture to a picture list, adding a video to a video list or adding a game to a game list.

2-9. DELETE

The "DELETE" function enables the mobile terminal to: delete a contact from the contact list; delete a voice call from the recent call list; delete a text message from the message inbox; delete a picture from the picture list; delete a video from the video list; delete a voice message from the voice message list; delete a game from the game list; or delete an email message from a list of email messages.

2-10. MODIFY

The "MODIFY" function enables the mobile terminal to modify contact information using the contact list.

2-11. NAVIGATE

The "NAVIGATE" function enables the mobile terminal to navigate to a contact's location using a navigator function. It may also apply to navigating to an address contained as part of a browser page.

2-12. LISTEN

The "LISTEN" function enables the mobile terminal to: listen to a song using a music player; or listen to a voice mail using the voice mail list.

2-13. STREAM

The "STREAM" function enables the mobile terminal to stream a video to the extracted contact.

2-14. TAKE

The "TAKE" function enables the mobile terminal to: take a picture and send it as a picture message; take a picture and upload to as SNS.

2-15. RECORD

The "RECORD" function enables the mobile terminal to record a video and send to a contact.

2-16. BROWSE

The "BROWSE" function enables the mobile terminal to browse the Internet.

2-17. EXTRACT

The "EXTRACT" function enables the mobile terminal to extract a contact from the contact list; extract a contact from the recent call list; extract a contact from the text message inbox and add to the contact list; or extract a song from a song list, extract a video from a video list, extract a picture from a picture list or extract a game from a game list.

2-18. CUSTOMIZE

The "CUSTOMIZE" function enables the mobile terminal to add or remove functional icons from the functional icon palette or incoming icon palette.

(3) Operation

The following describes examples of operations of the mobile terminal 10.

3-1. PLACE A VOICE CALL TO A PERSON'S TELEPHONE NUMBER USING A DIALER

Figure 5:
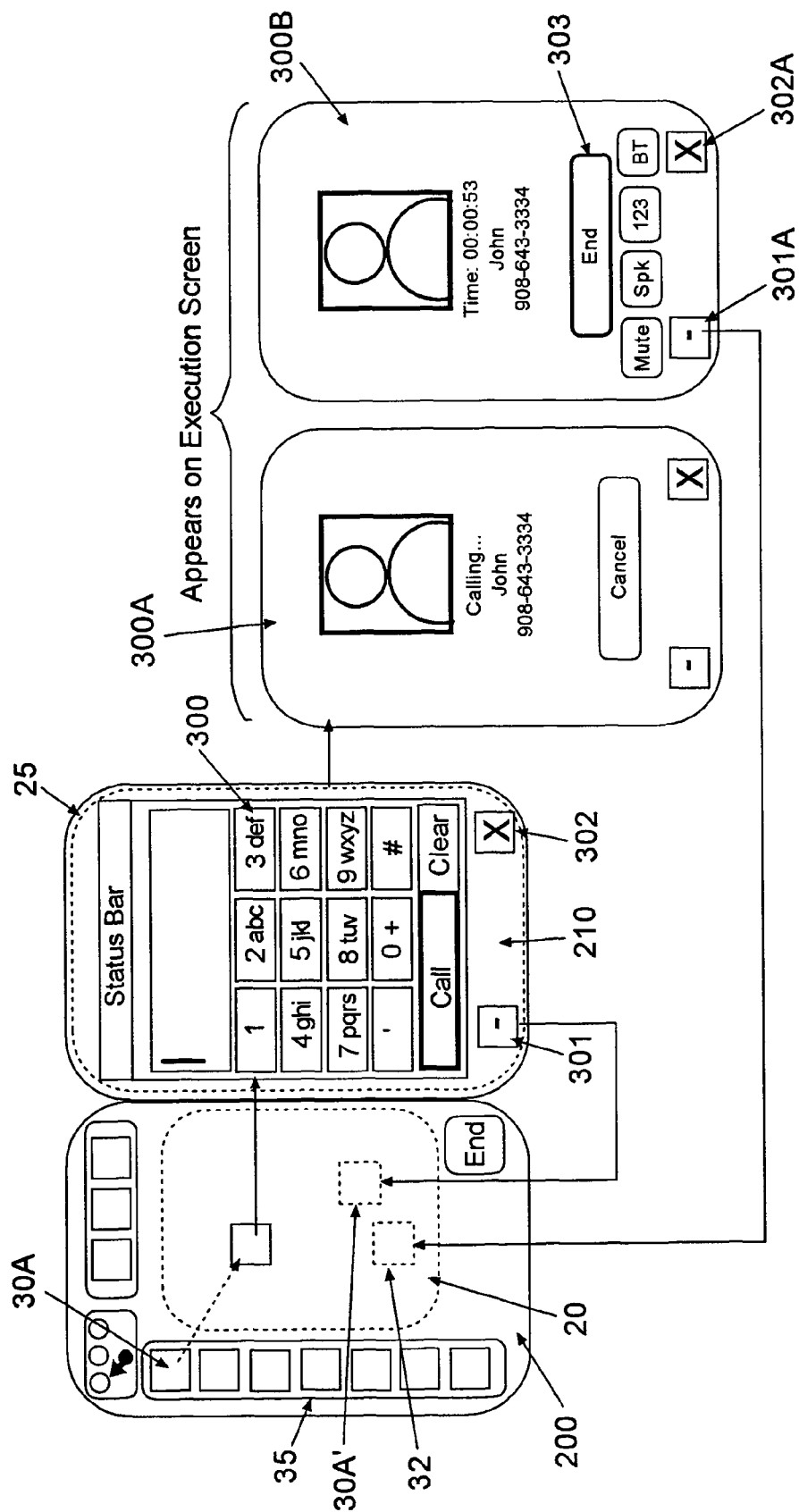
FIG. 5 is an example of an operation of placing a voice call to a person's telephone number using a dialer function of the mobile terminal.

FIG. 5 shows an operation of placing a voice call to a person's telephone number using a dialer function of the mobile terminal 10. When the user wishes to dial a person's telephone number, the user touches the display panel and drags a dialer icon 30A from the functional icon palette 35 into the first region 20 of the first touch panel display 200 and taps the icon 30A on the first region 20. The first region is a designated area of the first display panel 200 where the circuitry of the mobile terminal detects tapping, releasing or interactions of icons. In this example, the dialer icon 30A is associated with a dialing function of the mobile terminal 10. When the mobile terminal detects the tapping on the icon 30A in the first region 20, the mobile terminal triggers the programming for the dialer operation, and then the display controller 220 displays the dialer interface screen 300 in the execution area 25 on the second touch panel display 210. The execution area is a designated area of the second touch panel display 210 where the mobile terminal displays images, functions or input interface associated with a function initiated through interaction with one or more of the functional icons.

The user then enters the telephone number by pressing numbers on the keypad represented by the dialer interface screen 300, and presses the "Call" button of the dialer interface screen 300 displayed on the execution area 25. When the circuitry of the mobile terminal detects the tapping or pressing of the "Call" button, the mobile terminal places a call. In this example, once the mobile terminal begins the actual call, the circuitry is configured to cause the second display panel 210 to display connecting status 300A before the call is answered and connected. Once the call is connected, the circuitry of the mobile terminal causes the second display panel to display information 300B about the contact including the name and/or the phone number and the call status while the call is connected, i.e., the parties are conversing. If a picture of the contact is stored in the mobile terminal, the second touch panel display 210 also displays the picture on the execution area 25 during the call. The dialer icon 30A now displayed on the first region 20 may also be updated to reflect the connecting status of the call by indicating, for example, person's name, phone number or by changing color.

The user may iconify the dialer interface screen 300 with the "-" button 301 in the execution area 25. When the circuitry of the mobile terminal detects the user's pressing of the "-" button 301, the mobile terminal 10 minimizes the dialer interface screen 300 and displays an iconified dialer 30A' on the first region 20. The iconified dialer may be a different icon from the dialer icon 30A or may be displayed as the same dialer icon 30A. The user may tap on the iconified dialer 30A' on the first region 20 to re-display the dialer interface screen 300 on the execution area 25. Further, when the user taps an "x" button 302 in the execution area 25 and the circuitry of the mobile terminal detects the tapping, the mobile terminal closes the dialer interface screen 300.

The user may terminate the call by pressing an "End" button 303. After terminating the call, when the user taps a "-" button 301A, the mobile terminal 10 creates and displays an extracted contact icon 32 on the first region 20, which is associated with information about the contact (in this example, John). When the user taps an "x" button 302A, the mobile terminal terminates the call and closes the displayed information on the execution area 25.

3-2. PLACE A VOICE CALL TO A PERSON'S TELEPHONE NUMBER USING A CONTACT LIST

Figure 6:
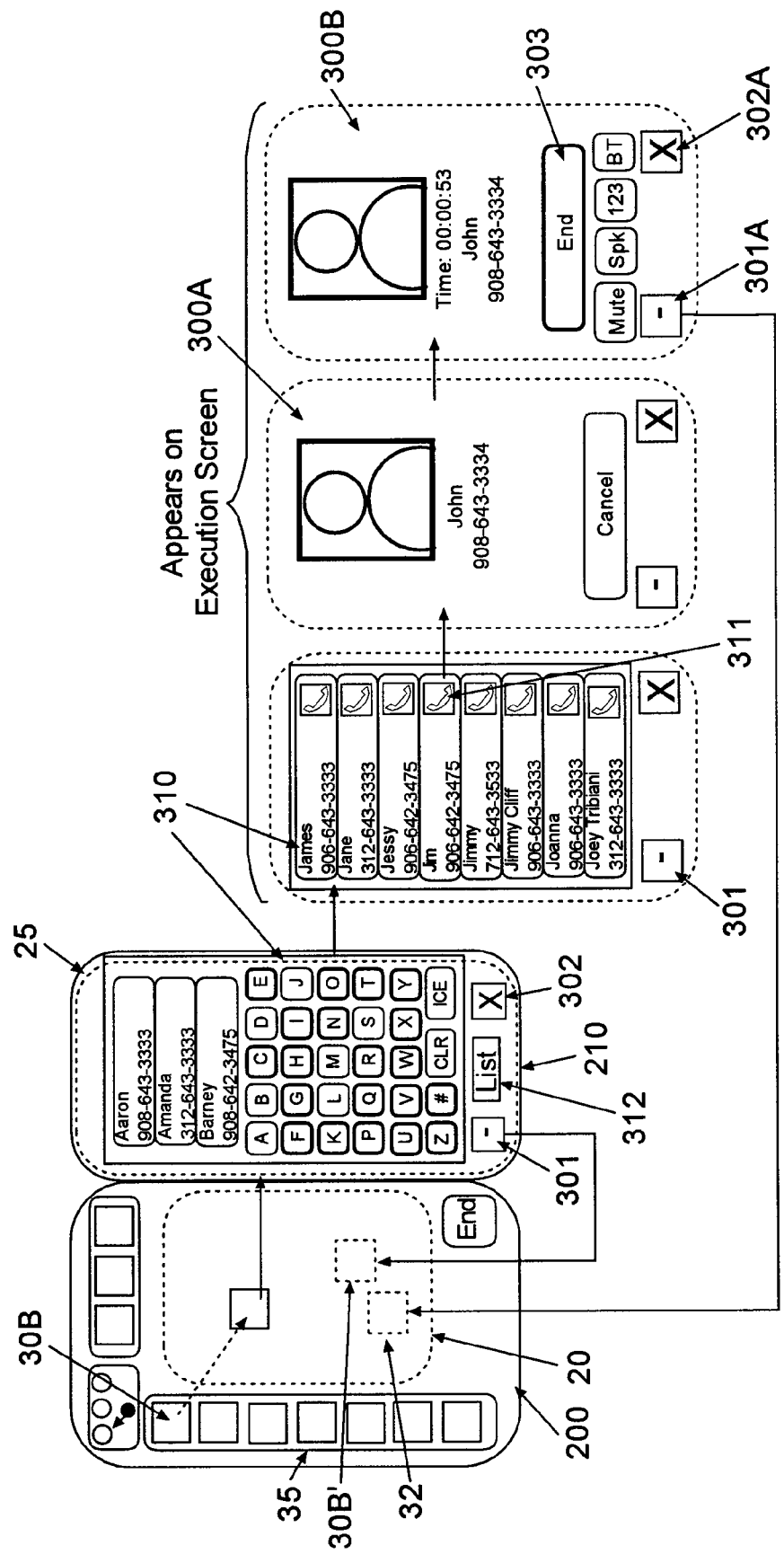
FIG. 6 is an example of an operation of placing a voice call to a person's telephone number using a contact list icon.

FIG. 6 shows an operation of placing a voice call to a person's telephone number using a contact list icon. When a user wishes to make a phone call by selecting a contact from a contact list, which may have been created by the user, the user touches the display panel and drags a contact list icon 30B from the palette 35 into the first region 20. When the user taps the contact list icon 30B, the processor activates corresponding programming; and as a result, the contact list interface screen 310 is displayed on the execution area 25.

In the example, the contact list interface screen 310 includes display areas for some contact information as well as a key pad for the user to input a letter to locate a specific contact. When the contact is found in a stored list, the user may press the phone icon 311 adjacent to the contact name to place a call to the specified contact. Upon detecting the pressing of the phone icon 311 by the user, the mobile terminal places a call to the contact specified by the user. The mobile terminal may display only the list of the contact without the key pad when the user presses a "list" button 312. The user may scroll the contact list interface screen 310 to locate a specific contact by using a scrolling bar (not shown). In a manner similar to FIG. 5, the mobile terminal 10 also displays information about the contact including the name and/or the phone number during the call. If a picture of the contact is stored in the mobile phone, the second touch panel display 210 may also display the picture on the execution area 25 during the call. The contact list icon 30B now displayed on the first region 20 may be updated to reflect the connecting status of the call by indicating, for example, person's name, phone number or by changing color.

The user may iconify the contact list interface screen 310 with the "-" button 301 in the execution area 25. When the circuitry of the mobile terminal detects the user's tapping of the "-" button 301, the mobile terminal 10 closes the contact list interface screen 310 and displays an iconified contact list 30B' on the first region 20. The iconified contact list may be a different icon from the contact list icon 30B or may be displayed as the same contact list icon 30B. The user may tap the iconified contact list 30B' on the first region 20 to re-display the contact list interface screen 310 on the execution area 25. Further, when the circuitry of the mobile terminal detects the user's tapping of an "x" button 302 in the execution area 25, the mobile terminal 10 closes the contact list interface screen 310.

The user may terminate the call by pressing an "End" button 303. After terminating the call, when the user taps a "-" button 301A, the mobile terminal 10 creates and displays an extracted contact icon 32 on the first region 20, which is associated with information about the contact (in this example, John). When the user taps an "x" button 302A, the mobile terminal terminates the call and closes the displayed information on the execution area 25.

3-3. PLACE A VOICE CALL TO A PERSON'S TELEPHONE NUMBER USING THE LIST OF RECENT CALLS

Figure 7:
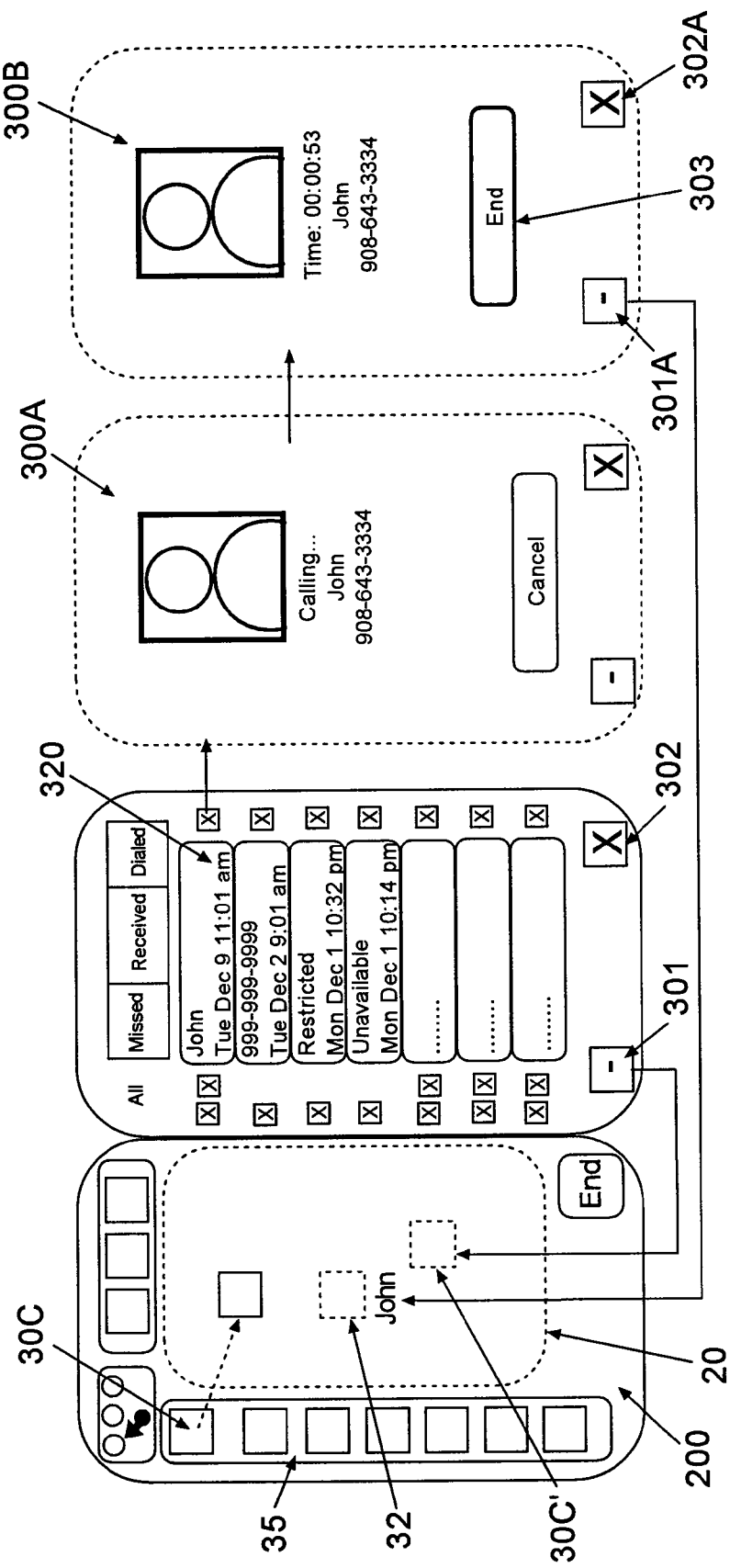
FIG. 7 is an example of an operation of placing a voice call to a person's telephone number using a recent call list icon.

FIG. 7 shows an operation of placing a voice call to a person's telephone number using a list of recent calls and associated functional icon. When a user wishes to make a phone call by using a recent call list, which may have been automatically created by the mobile phone, the user touches the display panel and drags a recent call list icon 30C from the icon palette 35 into the first region 20. When the user taps the recent call list icon 30C, the processor activates corresponding programming; and as a result, the recent call list interface screen 320 is displayed on the execution area 25. In the example, the user may filter the recent calls for "Missed" call, "Received" call, or "Dialed" call to locate a specific contact by tapping corresponding buttons. The user then taps a desired contact displayed on the recent call list interface screen 320 to place a call. Upon detecting the tapping of the specific recent call from the list 320 by the user, the mobile terminal places a call to the contact specified by the user. Similar to FIG. 5, the mobile terminal 10 also displays information about the contact including the name and/or the phone number. If a picture of the contact is stored in the mobile phone, the second touch panel display 210 also displays the picture on the execution area 25 during the call. The recent call list icon 30C now displayed on the first region 20 may be updated to reflect the connecting status of the call by indicating, for example, person's name, phone number or by changing color.

The user may iconify the recent call list interface screen 320 with the "-" button 301 in the execution area 25. When the circuitry detects the user's tapping of the "-" button 301, the mobile terminal 10 closes the recent call list interface screen 320 and displays an iconified recent call list 30C' on the first region 20. The iconified recent call list may be a different icon from the recent call list icon 30C or may be displayed as the same recent call list icon 30C. The user may tap the iconified recent call list 30C' on the first region 20 to re-display the recent call list interface screen 320 on the execution area 25. Further, when the circuitry of the mobile terminal detects the user's tapping of the "x" button 302 in the execution area 25, the mobile terminal 10 closes the recent call list interface screen 320.

The user may terminate the call by pressing the "End" button 303. After terminating the call, when the circuitry detects the user's tapping of the "-" button 301A, the mobile terminal 10 creates and displays an extracted contact icon 32 on the first region 20, which is associated with information about the contact (in this example, John). When the circuitry of the mobile terminal detects the user's tapping of the "x" button 302A, the mobile terminal terminates the call and closes the displayed information on the execution area 25.

3-4. PLACE A VOICE CALL TO A PERSON'S TELEPHONE NUMBER USING AN EXTRACTED CONTACT ICON

Figure 8:
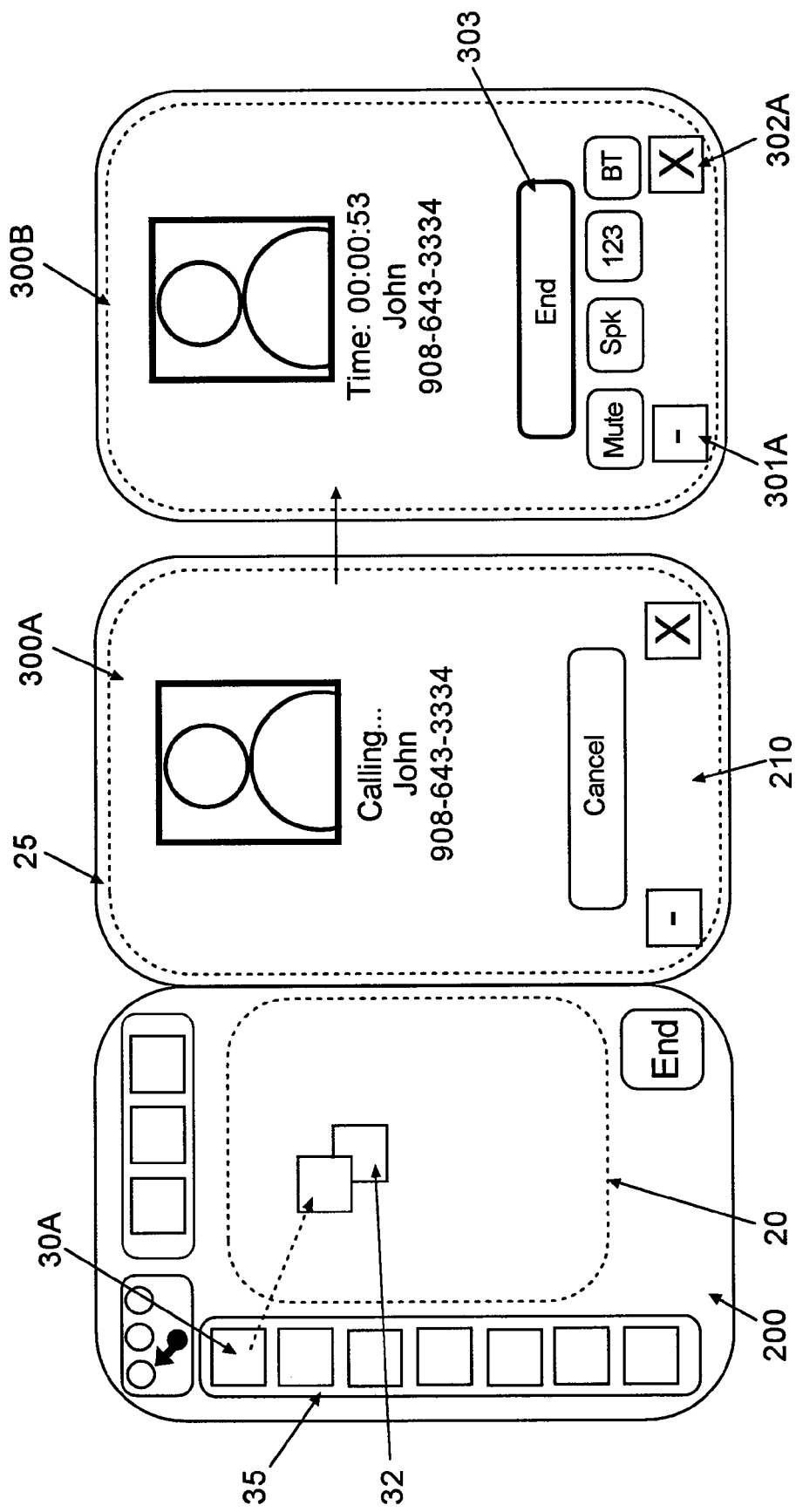
FIG. 8 is an example of an operation of placing a voice call to a person's telephone number using an extracted contact icon.

FIG. 8 shows an operation of placing a voice call to a person's telephone number using an extracted contact. In this case, the user has previously extracted a contact onto the first region 20 by, for example, placing a call to a person (see, FIGS. 5-7). This extracted contact icon 32 is displayed as a destination icon, which is another functional icon, a type of smart object. In this example, the destination icon is associated with the extracted contact information, for example, a telephone number, an e-mail address or an address for instant message. In this example, the user has previously made a phone call to John by using a dialer or contact list as explained in the sections 3-1 and 3-2 above. When the call was terminated, the user may iconify John's contact information by tapping the "-" button 301A to create the destination icon 32 associated with John on the first region (see, FIGS. 5-7). In an alternative operation, the user may cause the circuitry of the mobile terminal to create and display the destination icon 32 without making a phone call. For example, the user may open the contact list interface screen 310 and select the specific contact from the list, and then iconify the contact information as the destination icon 32 without initiating a call from the contact list interface screen 310 (see, section 3-44 below). The destination icon displayed on the first region 20 may be accompanied with the name or other information of the contact.

When the user wishes to make a phone call to the extracted contact (i.e., John in FIGS. 5-7) using a dialer function, the user touches the display panel and drags the dialer icon 30A from the palette 35 onto the destination icon 32 (i.e., extracted contact icon). When the mobile terminal detects that the dialer icon 30A overlaps with the destination icon 32, the mobile terminal initiates a call to John. At the same time, the dialer function interface screen is displayed on the execution area 25 indicating the status of the phone call in a manner similar to the earlier examples. The user may terminate the call by pressing an "End" button 303. After terminating the call, when the circuitry detects the user's tapping of the "-" button 301A, the mobile terminal 10 displays the extracted contact icon 32 on the first region 20 again. When the circuitry of the mobile terminal detects the user's tapping of the "x" button 302A, the mobile terminal terminates the call and closes the displayed information on the execution area 25.

The mobile terminal may display two or more extracted contact (destination) icons on the first touch panel display 200. The user may also choose to place the dialer icon 30A on the first region of the touch panel display 200 for future use. For example, the mobile terminal may be configured to display the dialer icon 30A on the first region without executing the dialer function when the dialer icon 30A is dragged into the first region and simply released without tapping, or when the user drags the dialer icon 30A into the first region and remains pressing the icon 30A over, for example, 500 millisecond.

3-5. END A VOICE CALL

Figure 9:
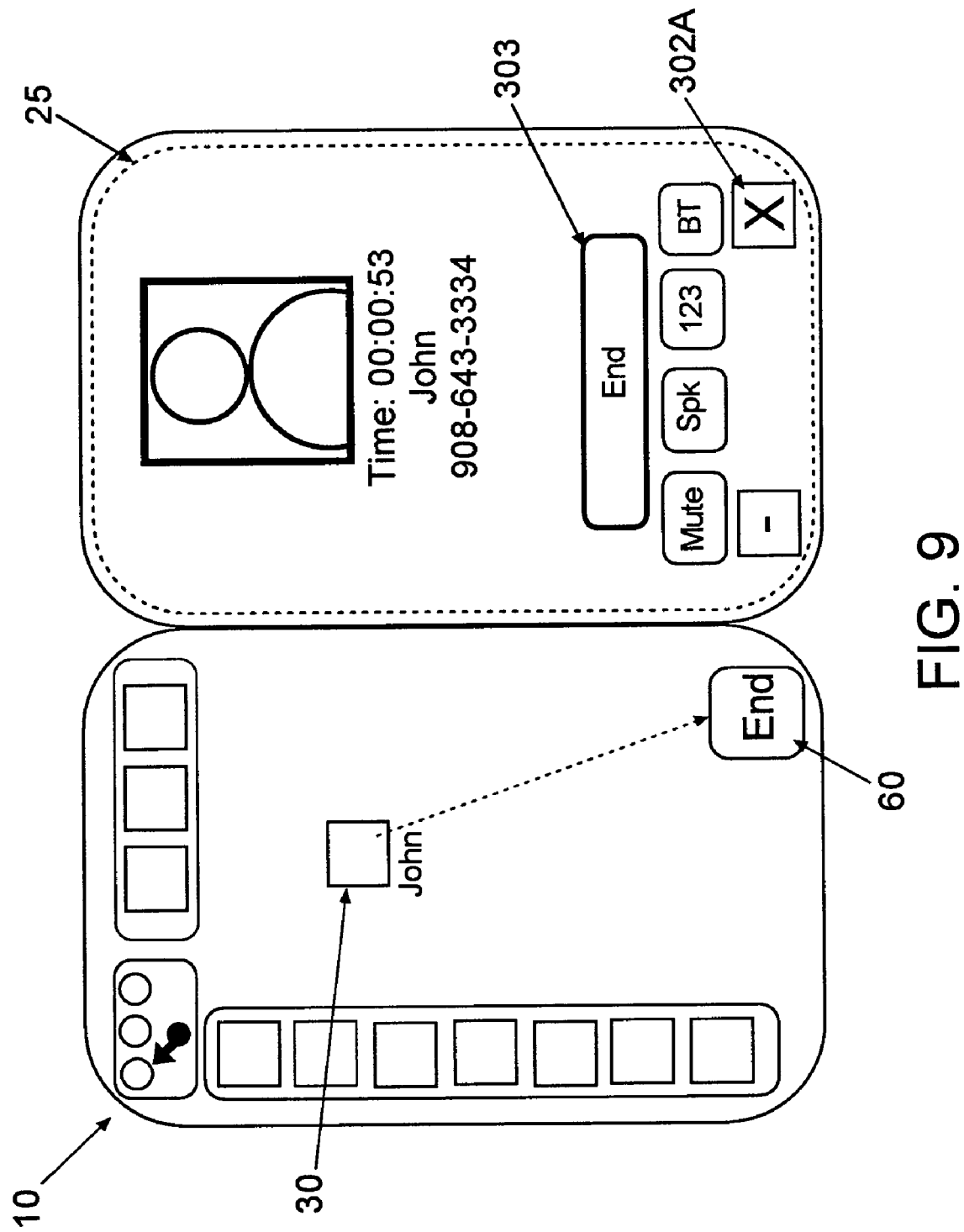
FIG. 9 is an example of an operation of ending a voice call on the mobile terminal having a touch panel display.

FIG. 9 shows an operation of ending a voice call using the mobile terminal 10 having the touch panel display. As explained above (see, FIGS. 5-8), assume that the user is calling the specific contact, John. To end a call, the user taps or presses the "End" button 303 or presses the "x" button 302A on the execution area 25. Or, to end the call, the user may drag the icon 30, which may be the dialer icon 30A, contact list icon 30B, or recent call list icon 30C, onto the termination icon 60. When the circuitry of the mobile terminal detects the pressing of the "End" button 303 by the user, the mobile terminal simply terminates the call. When the mobile terminal detects tapping of the "x" button 302A or dragging of the icon 30 onto the terminal icon 60 by the user, the mobile terminal 10 terminates the call and closes the displayed information on the execution area 25.

3-6. ANSWER A CALL FROM THE INCOMING EVENT PALETTE

When an incoming event occurs, the mobile terminal 10 detects the event and causes the touch panel display to announce the reception of the incoming event using the incoming event icon 40 associated with the incoming event. The reception of the incoming event triggers the programming of the mobile terminal to notify the user of the event by, for example, a visual indicator such as flashing on and off of the appropriate incoming event icon. The user may touch the display panel and drag the incoming event icon 40, which is flashing, into the first region 20. Upon detecting this user action, the processor in the mobile terminal 10 initiates the mobile terminal processing of the particular incoming event.

Figure 10:
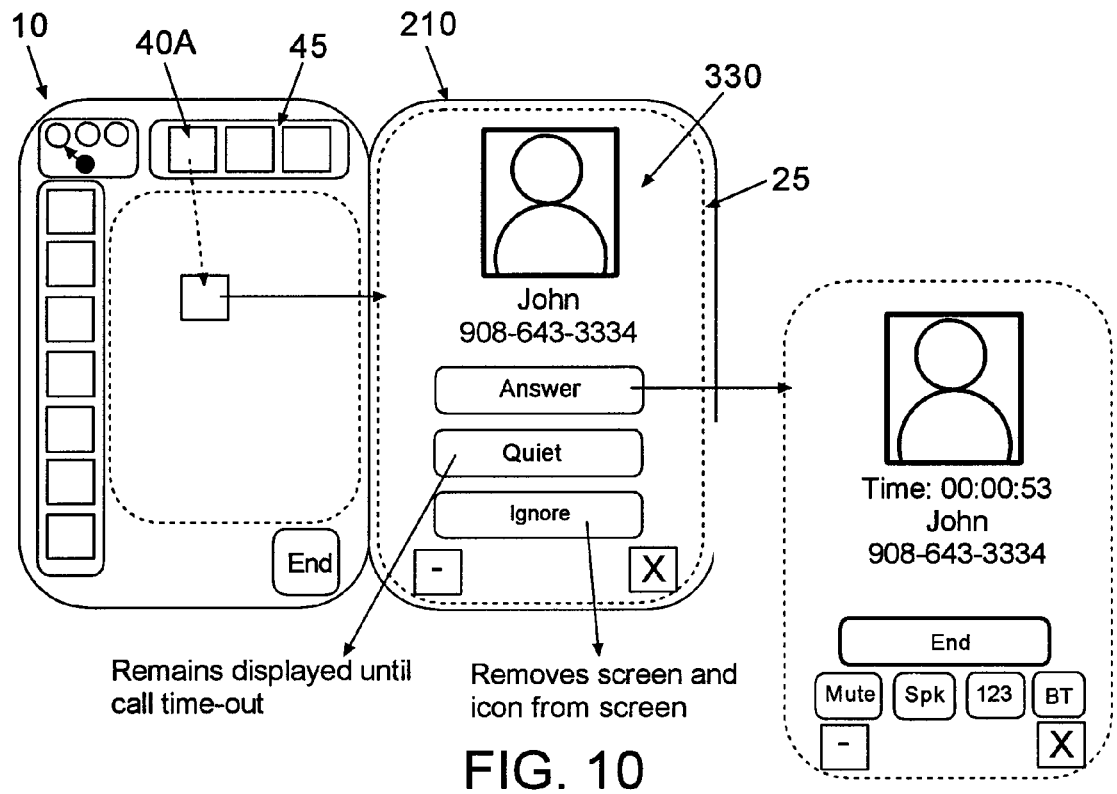
FIG. 10 is an example of an operation of answering a call from an incoming event icon palette on the touch panel display.

For example, as shown in FIG. 10, when a phone call is received, the processor of the mobile terminal causes incoming call icon 40A associated with receiving a phone call to flash on and off. If the mobile terminal is not set to a silent mode, the mobile terminal makes ringtone as well. To answer the call, the user may drag the incoming call icon 40A from icon palette 45 into the first region 20. The user may or may not need to tap the incoming call icon 40A on the first region 20 to answer the call. Upon detecting the tapping or releasing of the icon 40A by the user, the circuitry of the mobile terminal causes the touch panel display to display an answering function interface screen 330 on the execution area 25 of the second touch panel display 210. The user may then choose to "Answer," "Quiet" or "Ignore" the call by tapping one of the buttons of the answering function interface screen 330. When the mobile terminal detects tapping of the "Answer" button, the processor makes the mobile terminal for the user to answer the call. The mobile terminal then provides a call status display while the call is connected, similar to several of the earlier example (see, for example, FIG. 5). When the circuitry of the mobile terminal detects tapping of the "Quiet" button, the display controller keeps displaying the answering function interface screen 330 until the call becomes time-out, but stops the ringtone. If the mobile terminal detects tapping of the "Ignore" button, the mobile terminal closes the answering function.

3-7. ANSWER A CALL FROM AN EXTRACTED CONTACT

Figure 11:
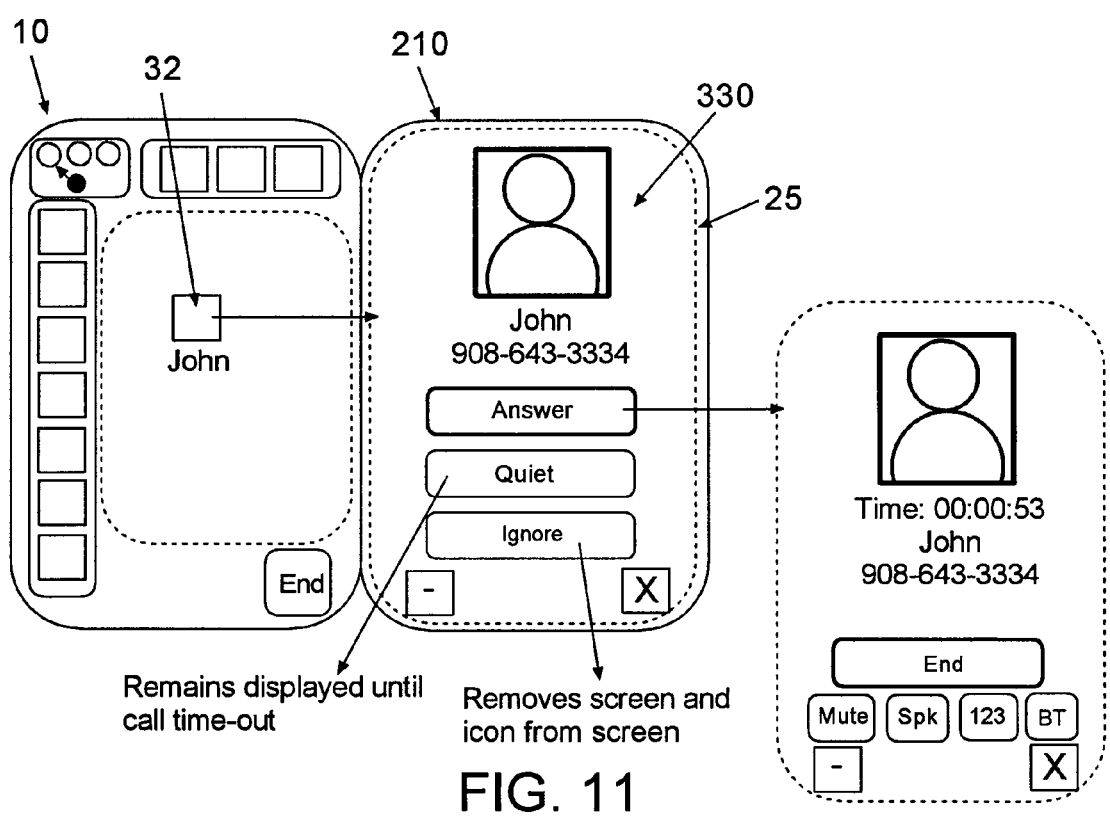
FIG. 11 is an example of an operation of answering a call from an extracted contact icon.

As shown in FIG. 11, when an extracted contact icon 32 has been displayed on the first region 20 and the incoming call is a call from the person of the extracted contract, the user may answer the call by tapping the extracted contact icon 32. When the call is received, the mobile terminal determines whether the extracted contact is displayed on the first region 20 and the call is coming from the contact of the extracted contact icon 32. The notification may be made by simply changing the color of the icon 32. If the mobile terminal determines affirmatively, the circuitry of the mobile terminal causes the touch panel display to flash the extracted contact icon 32 on and off to notify the user the reception of the call. The touch panel display then displays an answering function interface screen 330 on the execution area 25 of the second touch panel display 210. The displaying may be automatic or may be initiated by the user's tapping of the extracted contact icon 32. The user may then choose to "Answer," "Quiet" or "Ignore" the call by tapping one of the buttons of the answering function interface screen 330 as described above.

3-8. CREATE A TEXT MESSAGE USING THE COMPOSER AND SEND TO A PERSON'S TELEPHONE NUMBER USING THE DIALER

Figure 12:
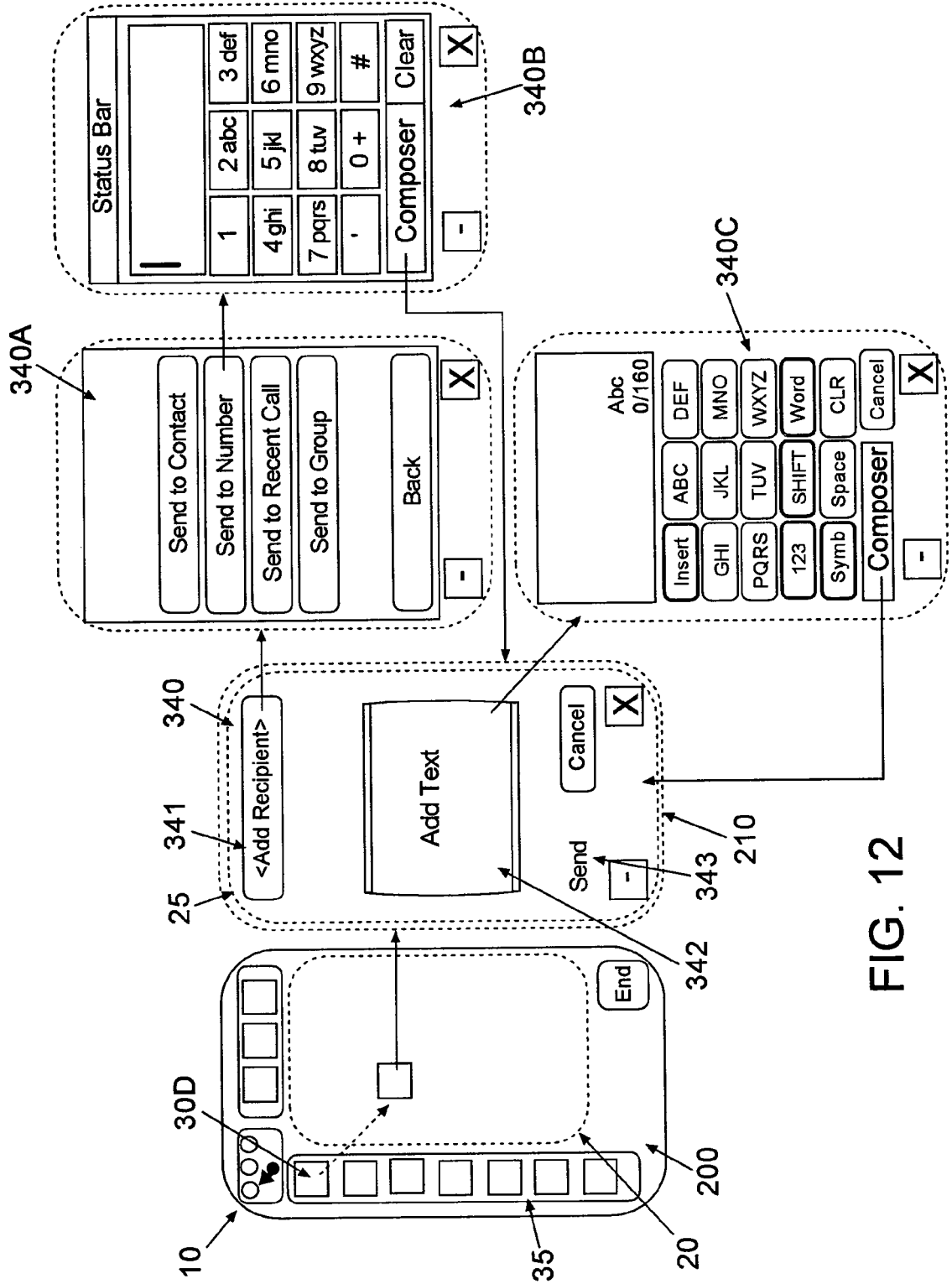
FIG. 12 is an example of an operation of creating a text message using a text message composer and sending the text message to a person's telephone number using the dialer.

FIG. 12 shows an operation of creating a text message using a text message composer and sending the message to a person's telephone number using the dialer function. When the user wishes to create a new text message and send it to a person, the user touches the display panel and drags a create message icon 30D from the icon palette 35 into the first region 20. When the circuitry of the mobile terminal detects tapping of the create message icon by the user, the circuitry of the mobile terminal causes the touch panel display to display a text message composer interface screen 340 on the execution area 25. When the user presses an "Add Recipient" button 341, the mobile terminal displays destination selection interface screen 340A. In the example, if the user selects "Send to Number," the mobile terminal displays a number key pad interface 340B for the user to enter the person's telephone number. When the processor detects that the user presses a "Composer" button on the number key pad interface 340B, the mobile terminal closes the key pad interface 340B and displays the composer interface screen 340 again. To create the text message, the user presses an "Add Text" button 342 on the composer interface screen 340. Upon detecting the tapping of the "Add Text" button 342, the circuitry of the mobile terminal causes the touch panel display to display a letter key pad interface 340C for the user to enter the text message. When the circuitry of the mobile terminal detects that the user presses the "Composer" button on the letter key pad interface 340C, the mobile terminal closes the key pad 340C and displays the composer interface screen 340 again. When the circuitry of the mobile terminal detects that the user presses a "Send" button 343, the mobile terminal sends the composed text message to the person.

3-9. CREATE A TEXT MESSAGE USING THE COMPOSER AND SEND TO A PERSON'S TELEPHONE NUMBER USING THE CONTACT LIST

Figure 13:
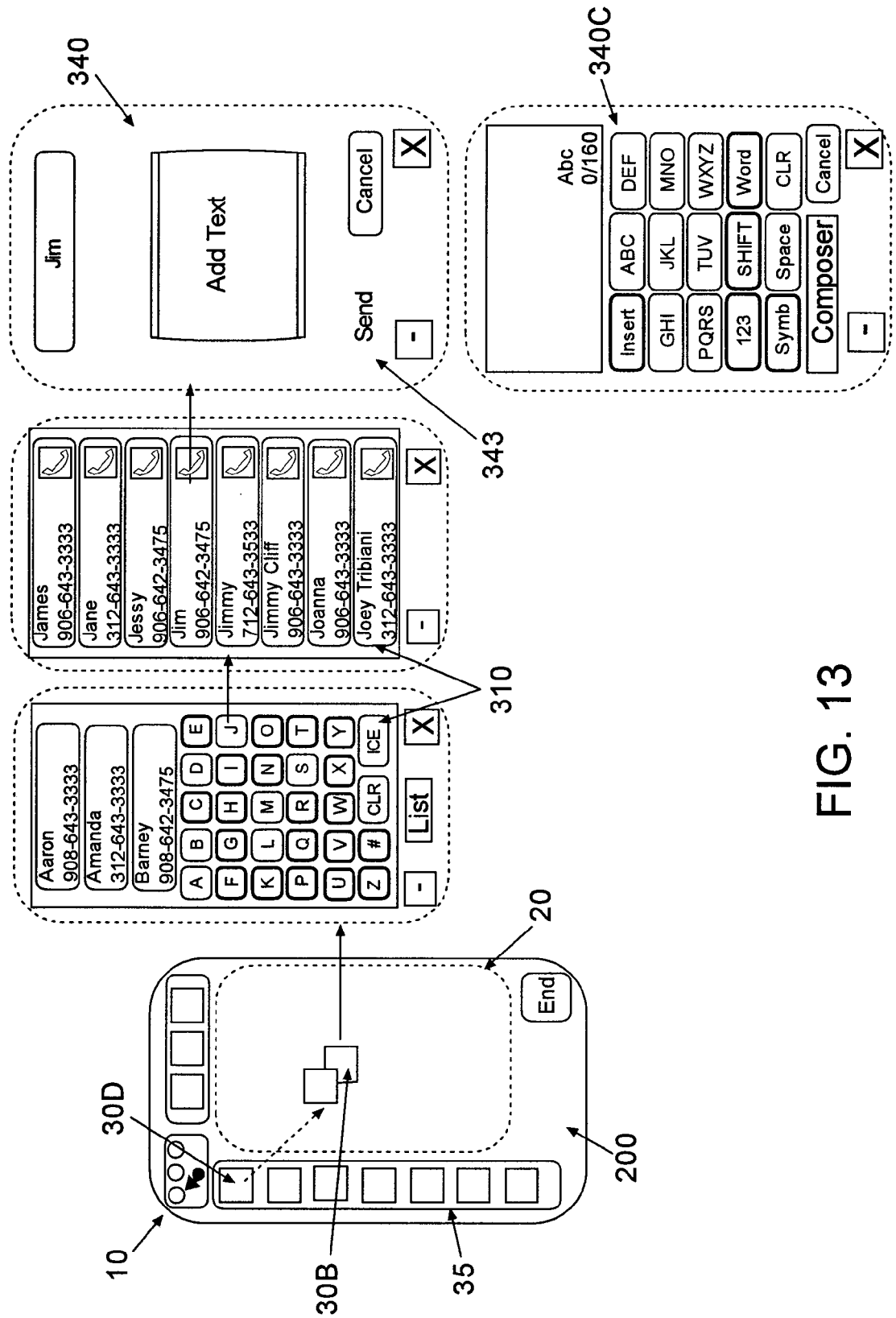
FIG. 13 is an example of an operation of creating a text message using a text message composer and sending the text message to a person's telephone number using the contact list icon.

FIG. 13 shows an operation of creating a text message using a text message composer and sending the message to a person's telephone number using the contact list and associated functional icon. To create and send a text message, the user touches the display panel and drags the create message icon 30D from the icon palette 35 onto the contact list icon 30B which has been placed previously on the first region 20 by the user. The contact list icon 30B may be dragged into and placed on the first region 20 by the user just before dragging the create message icon 30D, or may be placed on the first region by previous operation using the contact list icon 30B.

When the circuitry of the mobile terminal detects that the contact list icon 30B has been displayed in the first region 20 and the create message icon 30D overlaps with the contact list icon 30B, the circuitry of the mobile terminal causes the touch panel display to display the contact list interface screen 310 on the execution area 25. The user may select a contact as a recipient of the text message. When the circuitry of the mobile terminal detects the selection of the recipient, the mobile terminal causes the touch panel display to display the text message composer interface screen 340 on the execution area. The user composes a new text message to be sent to the recipient in the similar manner to FIG. 12 by using the letter pad 340C. When the circuitry of the mobile terminal detects that the user presses the "Send" button 343, the mobile terminal sends the text message to the person.

3-10. CREATE A TEXT MESSAGE USING THE COMPOSER AND SEND TO A PERSON'S TELEPHONE NUMBER USING THE EXTRACTED CONTACT ICON

Figure 14:
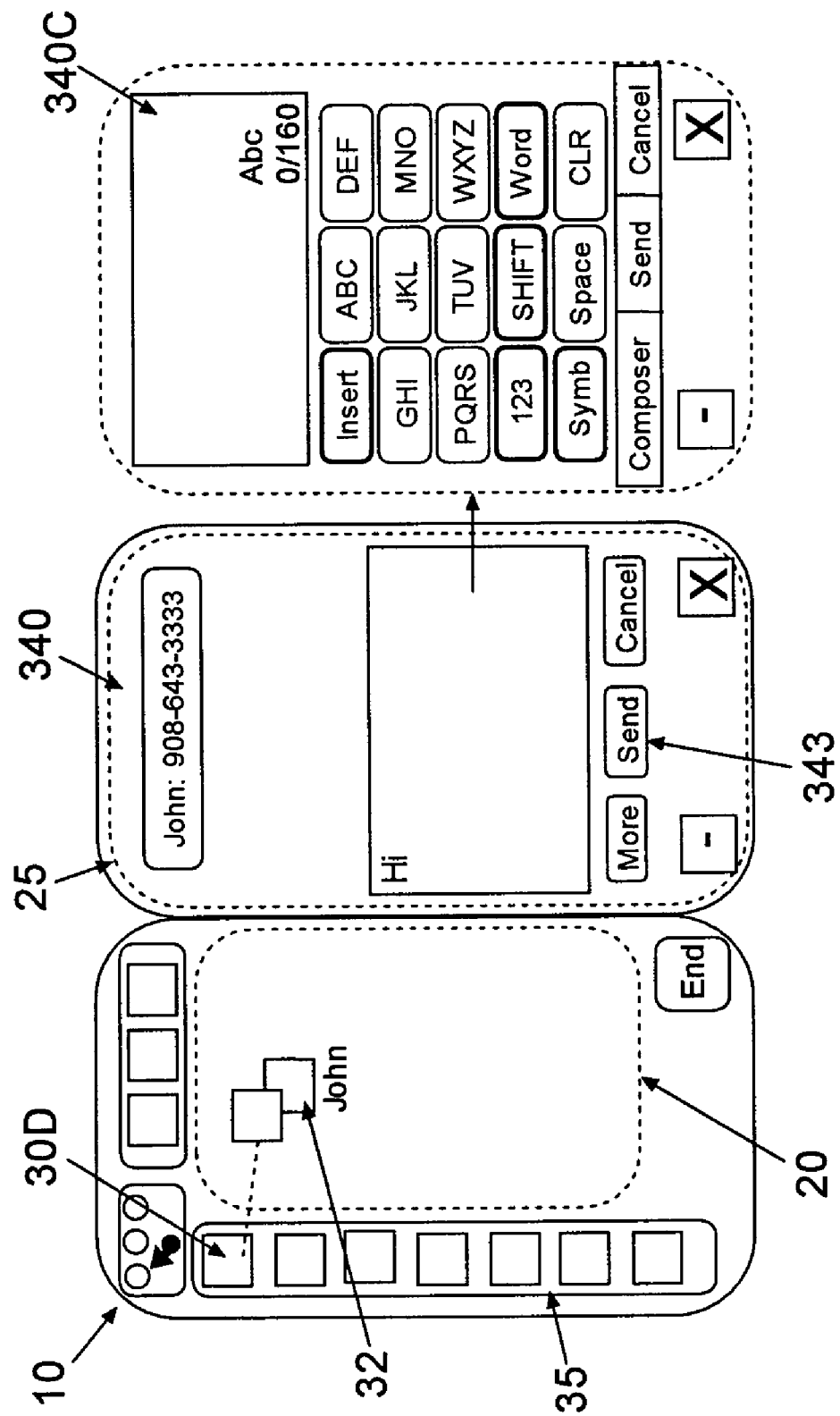
FIG. 14 is an example of an operation of creating a text message using the composer and sending the text message to a person's telephone number using the extracted contact icon.

FIG. 14 shows an operation of creating a text message using the composer and sending to a person's telephone number using the extracted contact icon. Similar to the operation of section 3-4 above, the user has previously extracted a contact onto the first region by, for example, placing a call to a person. When the user wishes to send a text message to the person displayed as the extracted contract icon 32, the user touches the touch panel display and drags the create message icon 30D from the icon palette 35 onto the extracted contact icon 32. Similar to the operation of section 3-9 above, when the circuitry of the mobile terminal detects that the extracted contact icon 32 has been displayed in the first region 20 and the create message icon 30D overlaps with the extracted contact icon 32, the circuitry of the mobile terminal causes the touch panel display to display the text message composer interface screen 340 on the execution area 25. The user composes a new text message to be sent to the recipient in the similar manner to FIG. 12 by using the letter pad interface 340C. When the mobile terminal detects that the user presses the "Send" button 343, the mobile terminal sends the text message to the person.

3-11. CREATE AN EMAIL MESSAGE USING THE EMAIL ICON AND SEND TO A PERSON'S ADDRESS USING THE CONTACT LIST

Figure 15:
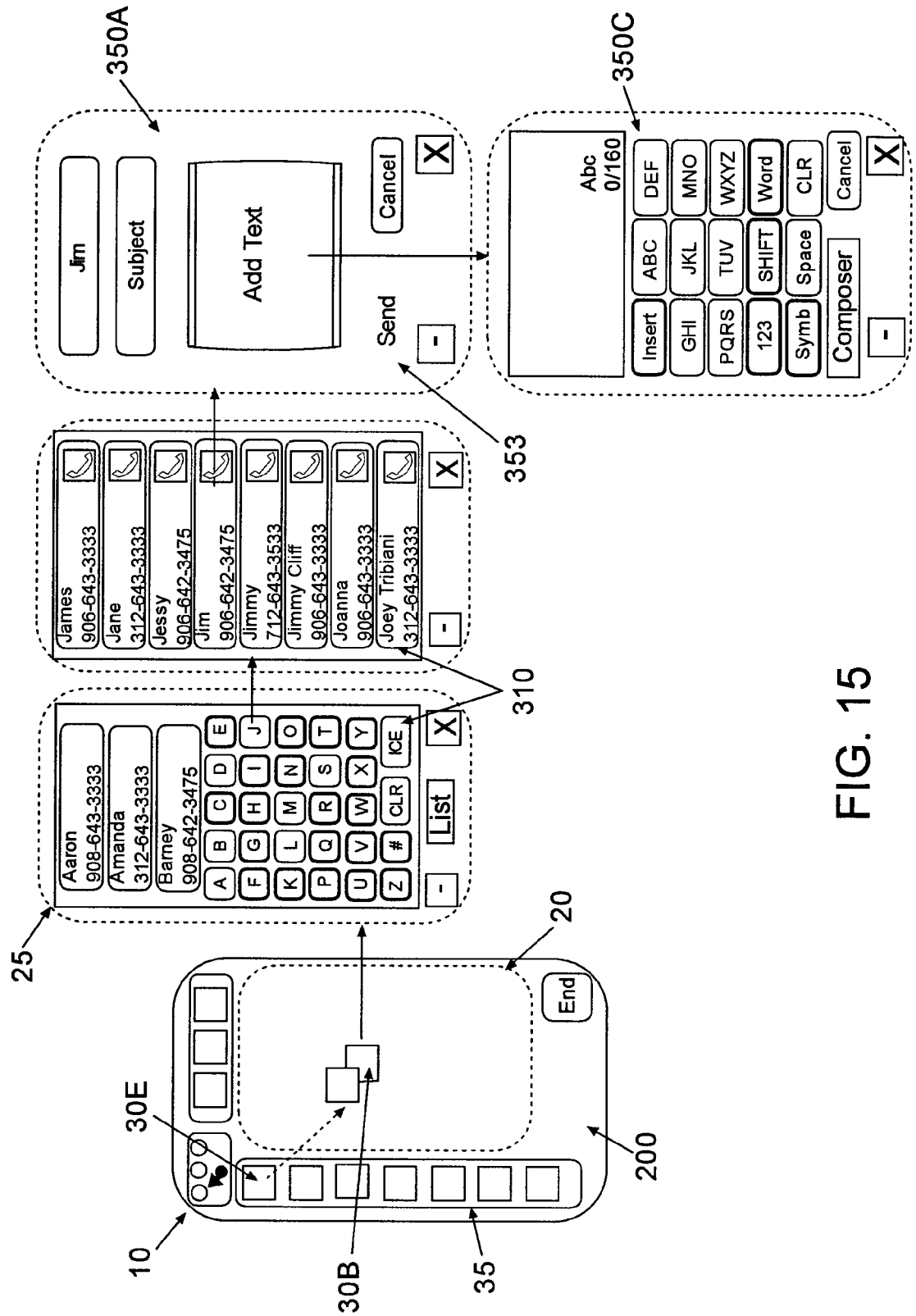
FIG. 15 is an example of an operation of creating an e-mail message using an e-mail composer and sending the e-mail message to a person's address using the contact list icon.

FIG. 15 shows an operation of creating an e-mail message by using an e-mail composer and sending e-mail to a person's email address by using the contact list and associated functional icon. To create and send an e-mail message, similar to the operation of section 3-9 above, the user touches the display panel and drags a create e-mail message icon 30E from the icon palette 35 onto the contact list icon 30B which was placed previously on the first region 20 by the user. The contact list icon 30B may be dragged into and placed on the first region 20 by the user just before dragging the create message icon, or may be placed on the first region by previous operation using the contact list icon 30B.

When the circuitry of the mobile terminal detects that the contact list icon 30B has been displayed in the first region 20 and the create e-mail message icon 30E overlaps with the contact list icon 30B, the circuitry of the mobile terminal 10 causes the touch panel display to display the contact list interface screen 310 on the execution area 25. The user may select a contact as a recipient of the e-mail message from the contact list. The contact list interface screen 310 stored in the memory 160 of the mobile terminal 10 may include not only a phone number but also an e-mail address of that person. The contact list including the e-mail addresses may be different from the contact list displaying phone numbers. When the mobile terminal detects that recipient is selected by the user's action, the mobile terminal causes the touch panel display to display the e-mail composer interface screen 350A on the execution area 25. The user composes a new email message to be sent to the recipient, similar to FIGS. 12 and 13, by using the letter pad 350C. When the mobile terminal detects that the user presses a "Send" button 353, the mobile terminal sends the text message to the person.

3-12. CREATE AN EMAIL MESSAGE USING THE EMAIL COMPOSER ICON AND SEND TO A PERSON'S EMAIL ADDRESS USING THE EXTRACTED CONTACT ICON

Figure 16:
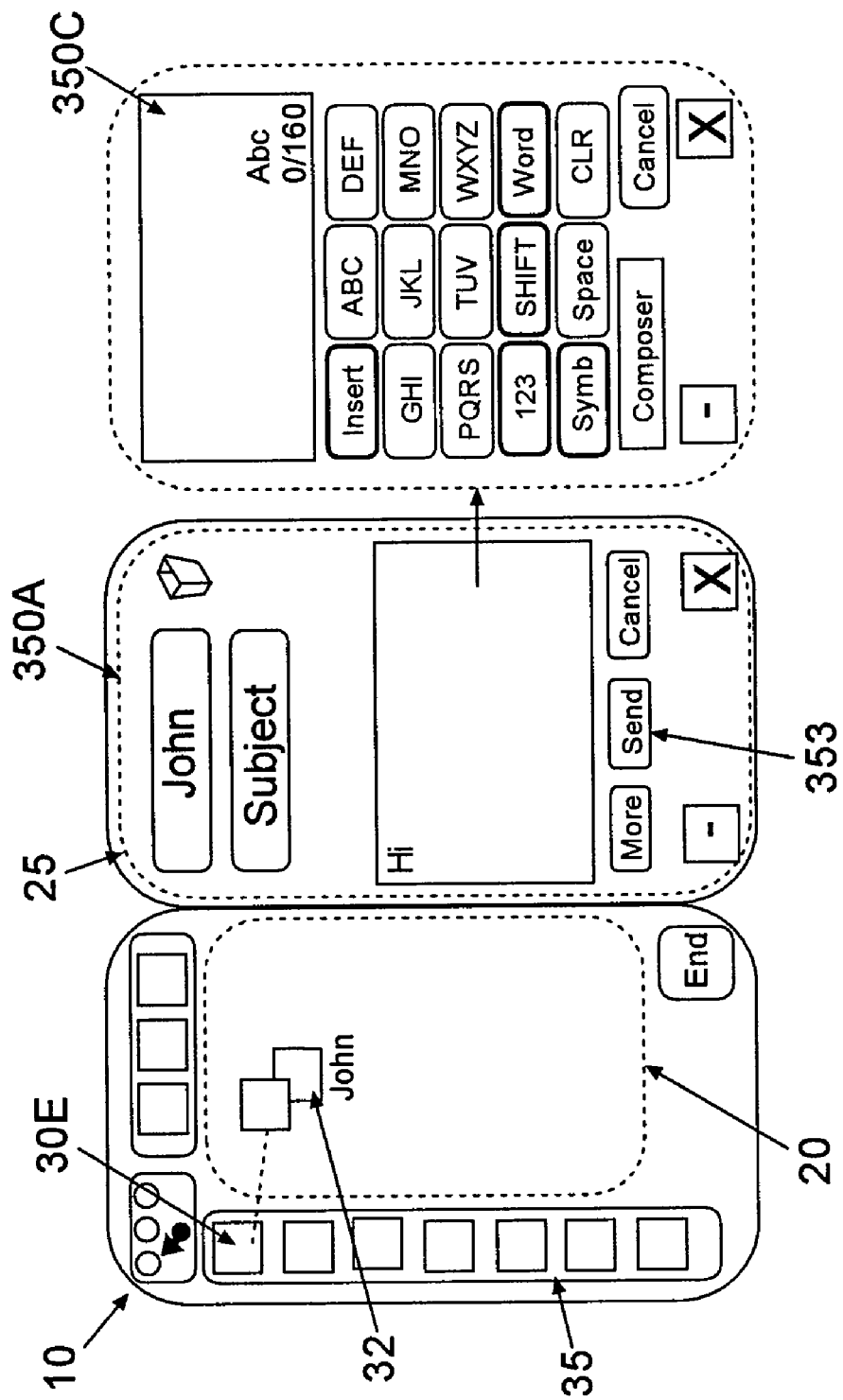
FIG. 16 is an example of an operation of creating an e-mail message using the e-mail composer icon and sending the email message to a person's e-mail address using the extracted contact icon.

FIG. 16 shows an operation of creating an e-mail message using the e-mail composer and associated functional icon and sending to a person's e-mail address by using the extracted contact. Similar to the operation of section 3-10 above, the user has previously extracted a contact onto the first region by, for example, placing a call to a person. The extracted contact icon 32 may include not only the telephone number but also the e-mail address of that person. When the user wishes to send an e-mail message to the person displayed as the extracted contract icon, the user touches the display panel and drags the create e-mail message icon 30E from the icon palette 35 onto the extracted contact icon 32.

When the circuitry of the mobile terminal detects that the extracted contact icon 32 has been displayed in the first region 20 and the create e-mail message icon 30E overlaps with the extracted contact icon 32, the circuitry of the mobile terminal causes the touch panel display to display the e-mail composer interface screen 350A on the execution area 25. The user composes a new email message to be sent to the recipient, similar to FIGS. 12 and 13, by using the letter key pad interface 350C. When the mobile terminal detects that the user presses the "Send" button 353, the mobile terminal sends the email message to the person.

3-13. CREATE AN IM MESSAGE USING THE CREATING IM ICON AND SEND TO A PERSON'S SCREEN NAME USING THE CONTACT LIST

Figure 17:
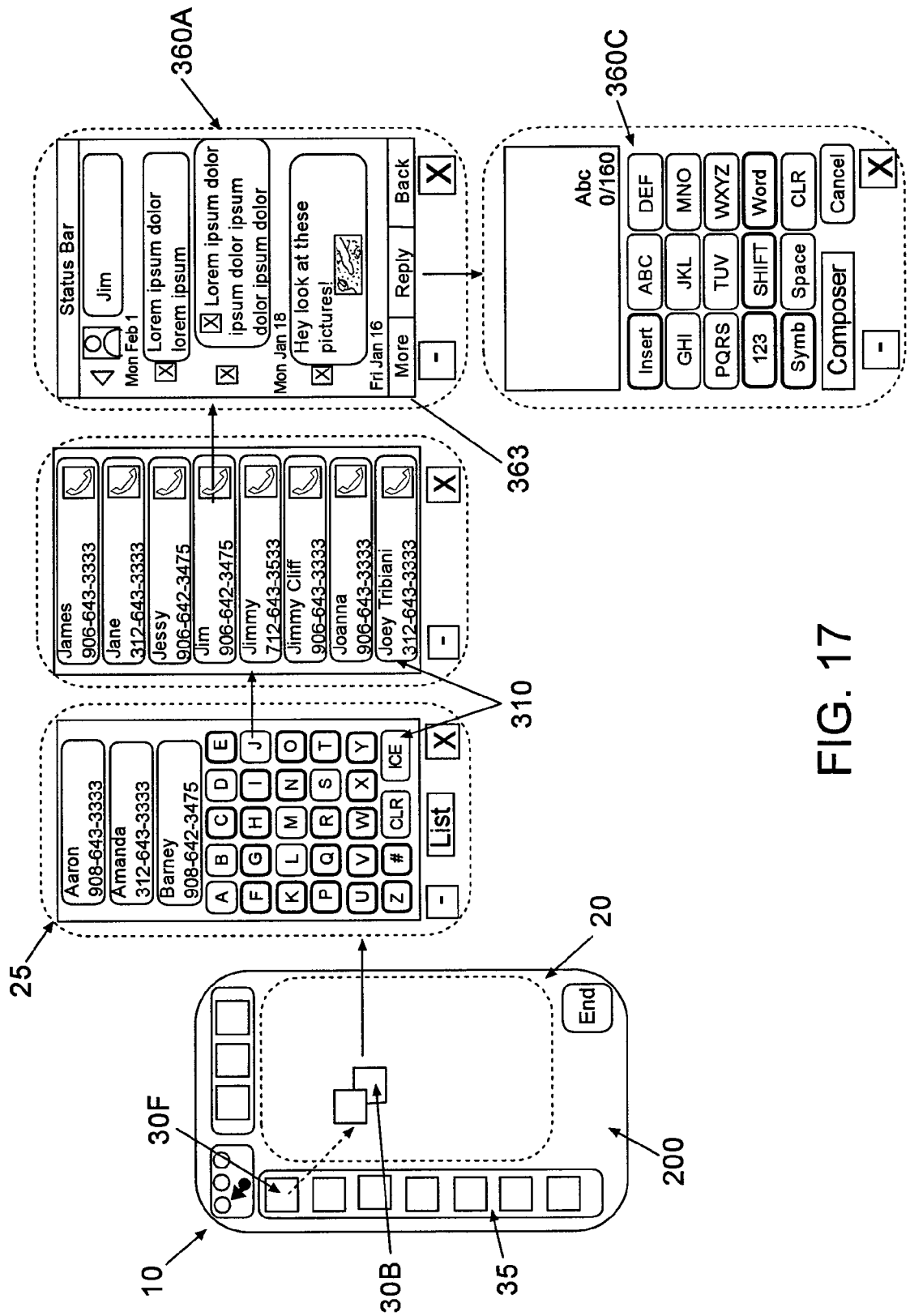
FIG. 17 is an example of an operation of creating an IM (instant messaging) message using an IM message composer and sending the IM message to a person's screen name using the contact list icon.

FIG. 17 shows an operation of creating an IM (instant messaging) message using an IM message composer and sending the IM message to a person's screen name using the contact list and associated functional icon. To create and send an IM message, the user touches the display panel and drags a create IM message icon 30F from the icon palette onto the contact list icon 30B which has been placed previously on the first region 20 by the user. The contact list icon 30B may be dragged into and placed on the first region 20 by the user just before dragging the create IM message icon, or may be placed on the first region by previous operation using the contact list icon 30B.

When the circuitry of the mobile terminal detects that the contact list icon 30B has been displayed in the first region 20 and the create IM message icon 30E overlaps with the contact list icon 30B, the mobile terminal causes the touch panel display to display the contact list interface screen 310 on the execution area. The user may select a contact as a recipient of the text message. The contact list interface screen 310 stored in the memory of the mobile terminal 10 may include not only a phone number but also a screen name of that person. The contact list including the screen names may be different from the contact list displaying phone numbers. When the circuitry of the mobile terminal detects that a recipient is selected, the mobile terminal causes the touch panel display to display the IM composer interface screen 360A on the execution area 25. The user composes a new IM message to be sent to the recipient by using the letter key pad interface 360C. When the circuitry of the mobile terminal detects that the user presses a "Send" button 363, the mobile terminal sends the IM message to the person.

3-14. CREATE AN IM MESSAGE USING THE IM COMPOSER ICON AND SEND TO A PERSON'S SCREEN NAME USING THE EXTRACTED CONTACT

Figure 18:
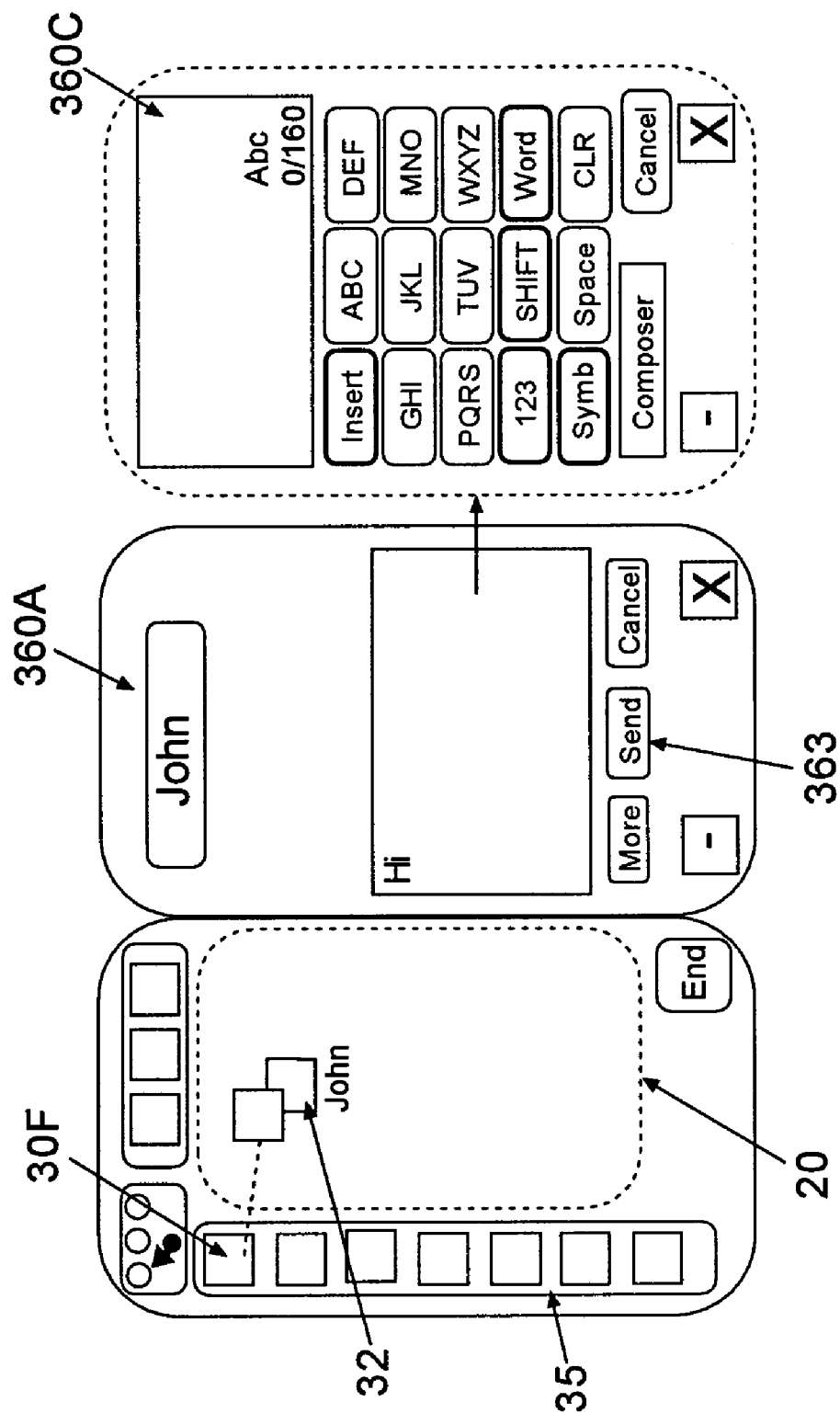
FIG. 18 is an example of an operation of creating an IM message using the IM composer icon and sending to a person's IM screen name using the extracted contact icon.

FIG. 18 shows an operation of creating an IM message using the IM composer and associated functional icon and sending to a person's IM screen name by using the extracted contact. Similar to the operation of section 3-10 above, the user has previously extracted a contact onto the first region 20 by, for example, placing a call to a person. The extracted contact icon 32 may include not only the telephone number(s) but also screen name(s) of that person. When the user wishes to send an IM message to the person displayed as the extracted contract, the user touches the display panel and drags the create IM message icon 30F from the icon palette 35 onto the extracted contact icon 32.

When the circuitry of the mobile terminal detects that the extracted contact icon 32 has been displayed in the first region 20 and the create IM message icon 30F overlaps with the extracted contact icon 32, the circuitry of the mobile terminal causes the touch panel display to display the IM composer interface screen 360A on the execution area 25. The user composes a new IM message to be sent to the recipient, similar to the operation of section 3-12 above, by using the letter key pad interface 360C. When the circuitry of the mobile terminal detects that the user presses the "Send" button 363, the mobile terminal sends the IM message to the person.

3-15. REPLY TO A TEXT MESSAGE FROM THE INCOMING EVENT PALETTE USING THE COMPOSER

Figure 19:
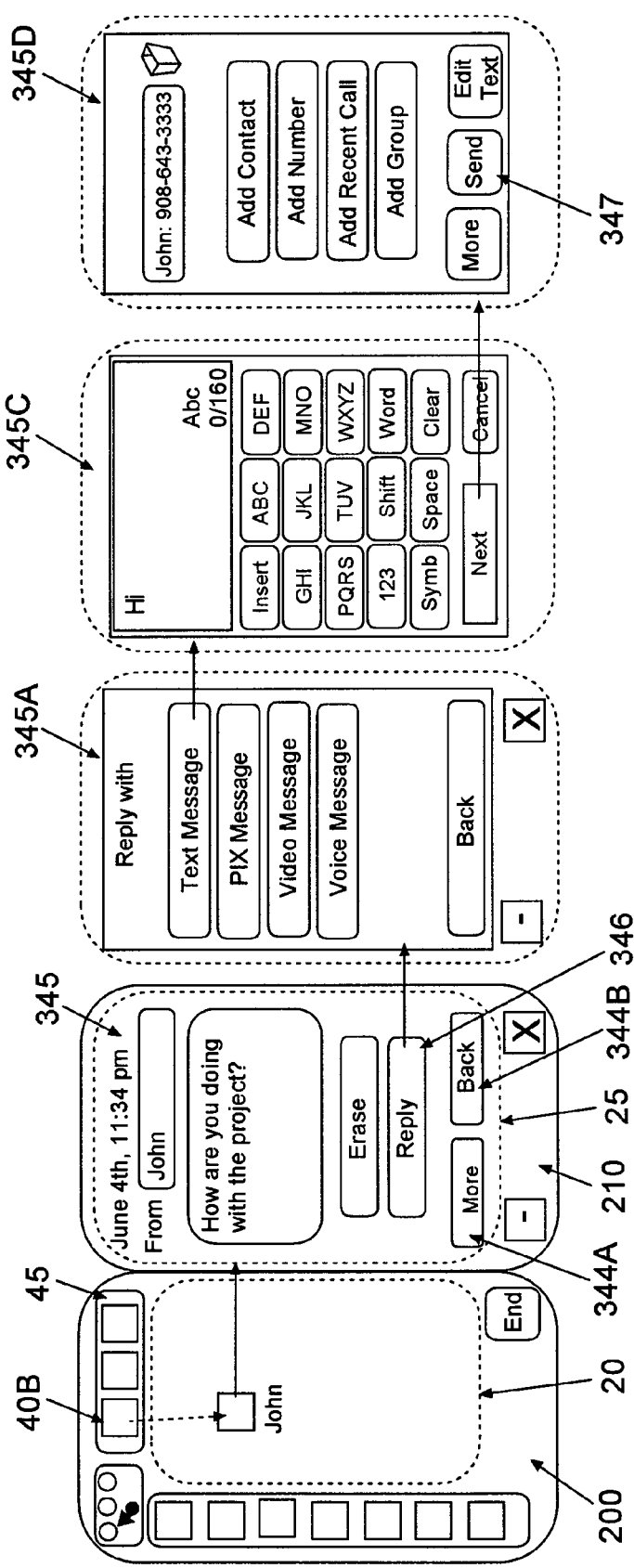
FIG. 19 is an example of an operation of replying to a text message from the incoming event icon palette using the text message composer.

FIG. 19 shows an operation of replying to a text message from the incoming event icon palette using the text message composer. Similar to the operation of section 3-6 above, when the mobile terminal detects that a text message is received, the display controller makes the incoming text message icon 40B associated with receiving a text message to flash on and off. To see the text message, the user touches the display panel and drags the incoming text message icon 40B from the incoming event icon palette 45 into the first region 20 of the first touch panel display 200. The user may or may not need to tap the incoming event icon on the first region 20 to open the message. When the circuitry of the mobile terminal detects the dragging and releasing or dragging and tapping of the icon 40B, the circuitry of the mobile terminal causes the touch panel display to display the text message viewer screen 345 on the execution area 25 of the second touch panel display 210.

Then, if the user wishes to reply to the text message, the user taps a "Reply" button 346. When the circuitry of the mobile terminal detects the tapping of the "Reply" button 346, the circuitry of the mobile terminal causes the touch panel display to display a replay selection screen 345A on the execution area. In the example, the mobile terminal 10 enables the user to reply with other types of message such as a picture message, a video message or a voice message. The "More" button 344A allows the user to access additional functionality that can be performed with respect to the message. The "Back" button 344B transitions to the previous page. Then, if the user selects "Text Message" by tapping for replying to the incoming text message and the circuitry of the mobile terminal detects the tapping for the selection, the circuitry of the mobile terminal causes the touch panel display to display the letter key pad interface 345C on the execution area 25. Then, the user may create a new text message replying to the incoming text message. When the circuitry of the mobile terminal detects that the user taps a "Next" button in a letter pad 345C, the circuitry of the mobile terminal displays a next action selection screen 345D. In the example, the user may select "Add Contact," "Add Number," "Add Recent Call," or "Add Group." When the circuitry of the mobile terminal detects that the user presses a "Send" button 347, the mobile terminal sends the composed message to the person.

3-16. REPLY TO A TEXT MESSAGE FROM THE EXTRACTED CONTACT

Figure 20:
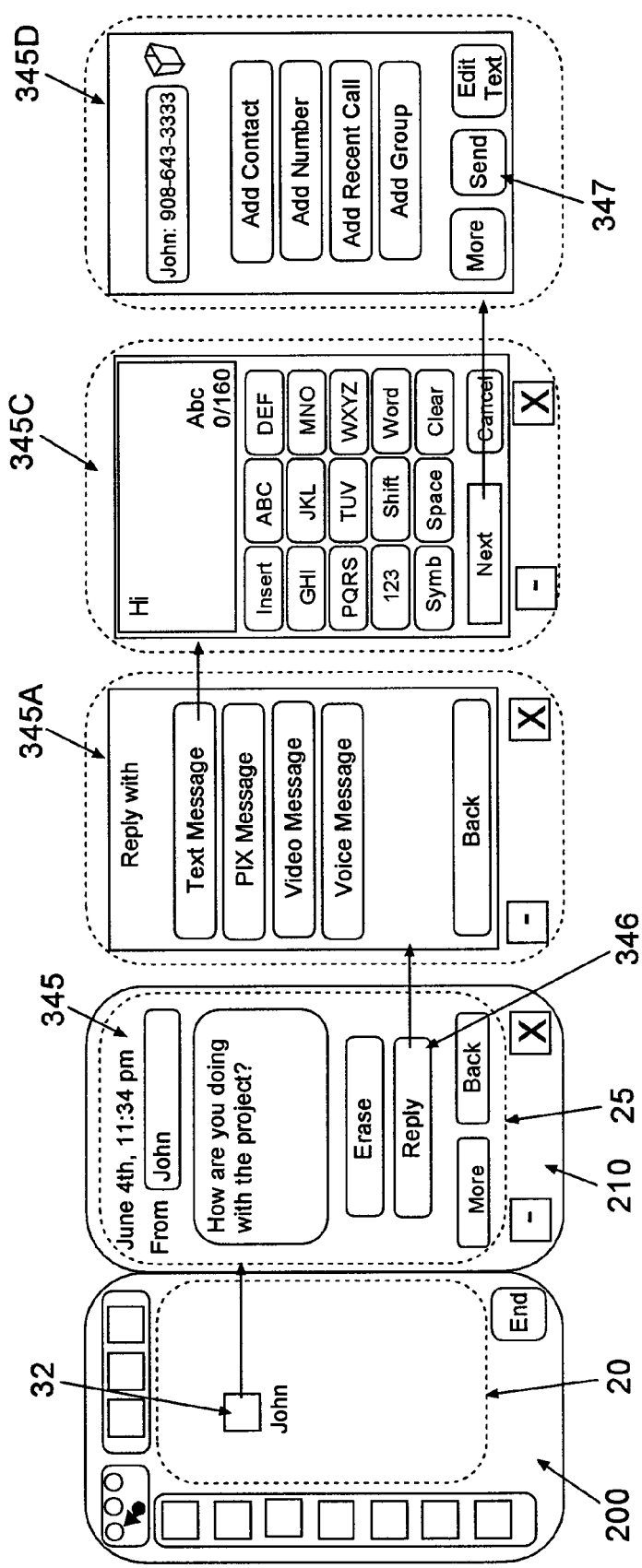
FIG. 20 is an example of an operation of replying to an incoming text message from the extracted contact icon.
Figure 21:
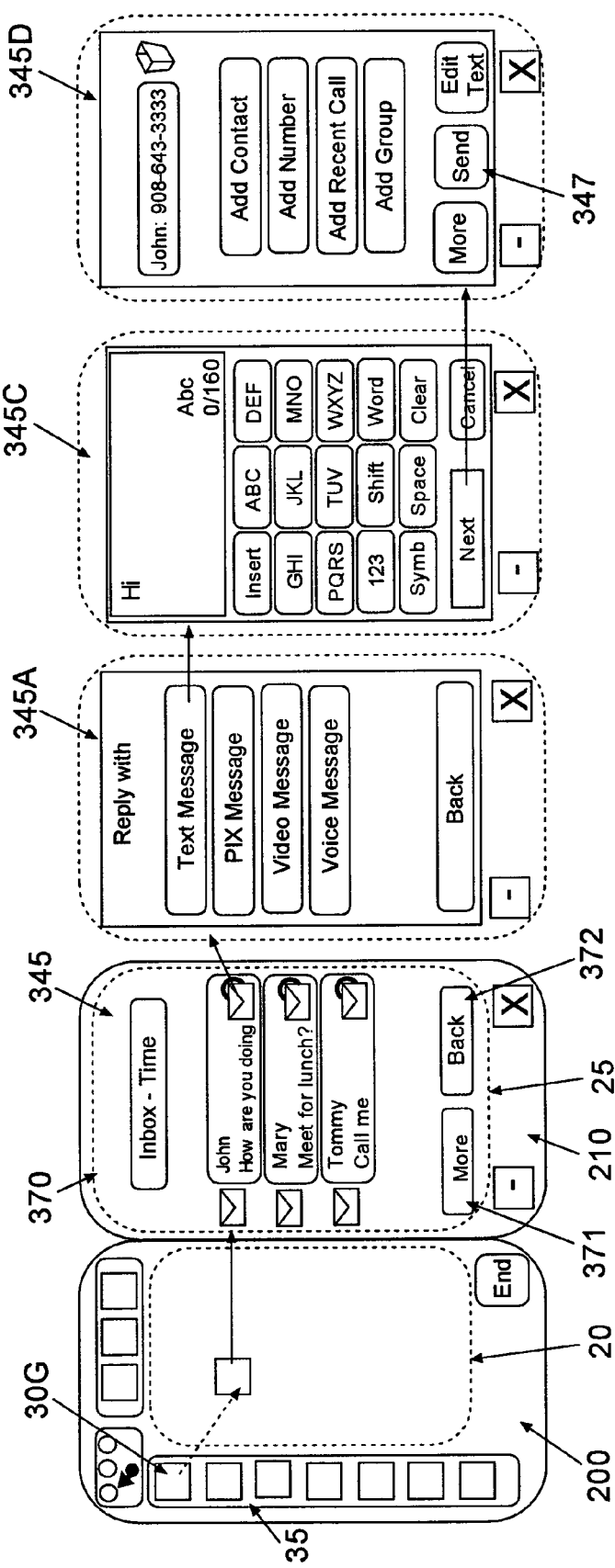
FIG. 21 is an example of an operation of replying to a text message from the message inbox using message inbox icon.

FIG. 20 shows an operation of replying to an incoming text message from the extracted contact icon. Similar to the operation of section 3-10 above, the user had previously extracted a contact onto the first region 20 by, for example, placing a call to a person. When the mobile terminal detects the reception of a text message, the mobile terminal determines if the extracted contact icon 32 is displayed on the first region 20 and the sender of the text message corresponds to the person of the extracted contact icon 32. If the mobile terminal determines affirmatively, the circuitry of the mobile terminal causes the touch panel display to flash on and off the extracted contact icon 32 for notifying the user of the reception of the message. When the circuitry of the mobile terminal detects that the user taps the icon 32, the circuitry of the mobile terminal causes the touch panel display to display the text message viewer screen 345 on the execution area 25. To reply to the text message, the user taps the extracted contact icon 32. When the circuitry of the mobile terminal detects the tapping, the circuitry of the mobile terminal causes the touch panel display to display the text message composer interface screen 345 on the execution area 25 of the second touch panel display 210. Similar to the operation of section 3-15 above, the user may create a new text message replying to the incoming text message by selecting the type of message in the reply selection screen 345A, composing a reply message by the composer interface screen 345C and sending the composed message in the next action selection screen 345D. Using this feature, the user can converse with the contact using both voice and text message concurrently 3-17. REPLY TO A TEXT MESSAGE FROM THE MESSAGE INBOX FIG. 21 shows an operation of replying to a text message from the message inbox using message inbox and associated functional icon. When the user wishes to reply to a text message already received and stored in a message inbox of the mobile terminal, the user touches the display panel and drags a message inbox icon 30G from the icon palette 35 into the first region 20. The user taps the message inbox icon 30G on the first region to open the message inbox interface screen 370. The user may not need to tap the icon 30G; instead, the user may simply release the dragged icon 30G in the first region to display the message inbox.

When the circuitry of the mobile terminal detects the tapping or releasing of the icon 30G, the circuitry of the mobile terminal causes the touch panel display to display a message inbox interface screen 370 on the execution area 25. Then, the user selects the message by tapping one of the displayed messages, to which the user wishes to reply. When there are too many messages to be displayed on the execution area 25, the "More" button 371 allows the user to access the next page of the message list in the message inbox. The "Back" button 372 transitions to the previous page. When the circuitry of the mobile terminal detects the tapping for the selection, the circuitry of the mobile terminal causes the touch panel display to display the reply selection screen 345A on the execution area. Similar to the operations of sections 3-15 and 3-16 above, the mobile terminal enables the user to select the type of message in the reply selection screen 345A, to create a new text message replying to the incoming text message by the composer interface screen 345C and to send the composed message in the next action selection screen 345D.

3-18. VIEW A LIST OF CONTACTS USING THE CONTACT LIST ICON

Figure 22:
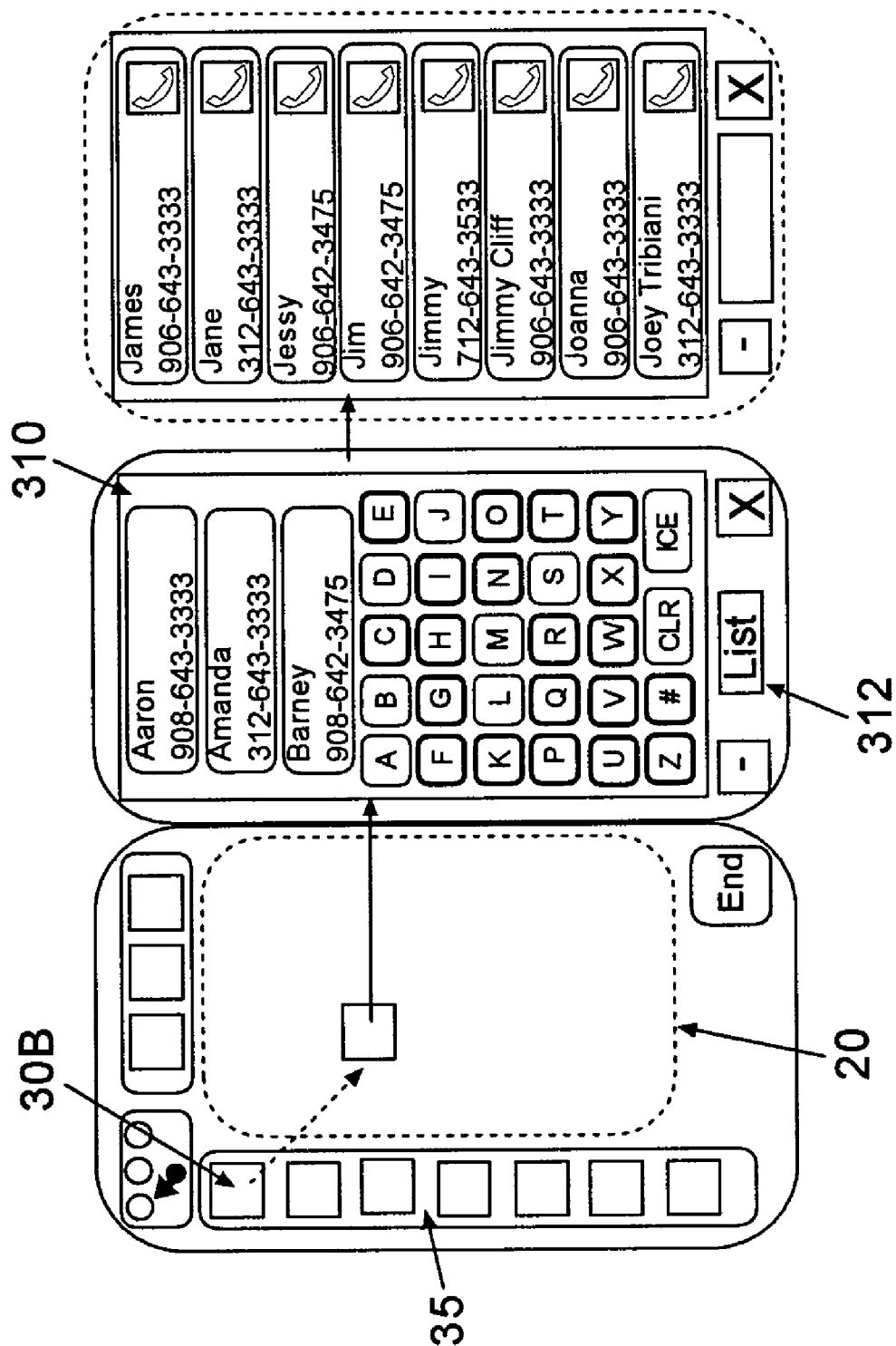
FIG. 22 is an example of an operation of viewing the contact list using the contact list icon.

FIG. 22 shows an operation of viewing the contact list by using the contact list and associated functional icon. When the user wishes to view the contact list (and to edit the contact list), the user touches the display panel and drags the contacts list icon 30B from the icon palette 35 into the first region 20. Then, the user taps the contacts list icon 30B to open the contact list. The user may not need to tap the icon 30B to open the list; instead, the user may simply release the dragged icon in the first region 20. When the circuitry of the mobile terminal detects the tapping (or releasing) of the icon 30B in the first region, the circuitry of the mobile terminal causes the touch panel display to display the contact list interface screen 310. The display controller may display only the list of the contact when the user presses "list" button 312. In this case, the user may scroll the contact list interface screen 310 to locate a specific contact by using a scrolling bar (not shown). The mobile terminal enables the user to view the contact list interface screen 310 and edit the list.

3-19. VIEW A LIST OF TEXT MESSAGES USING THE MESSAGE INBOX ICON

Figure 23:
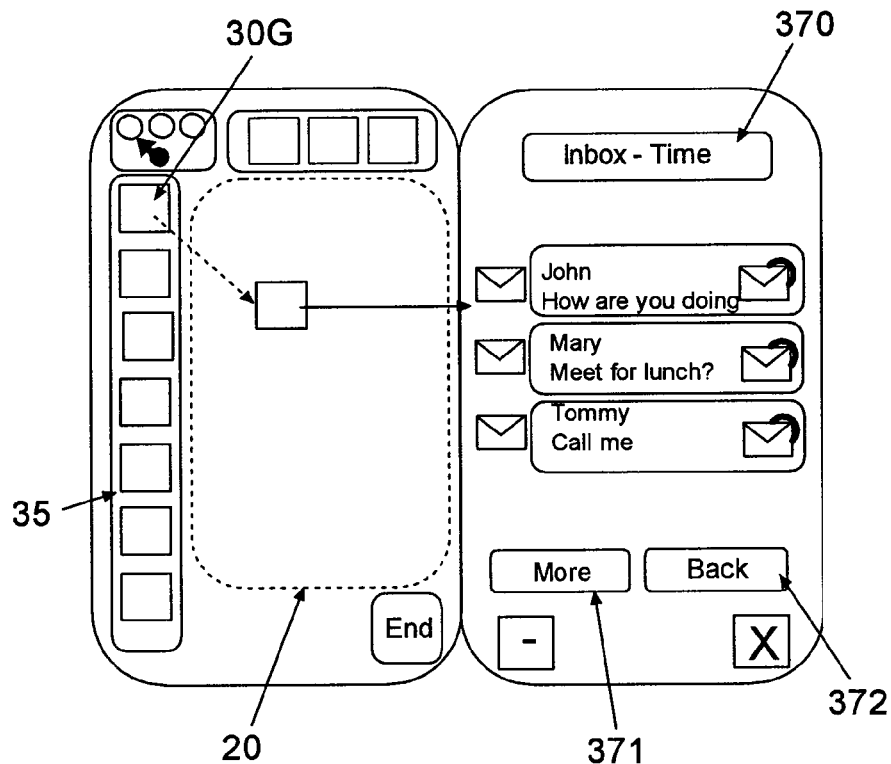
FIG. 23 is an example of an operation of viewing the text messages stored in the incoming text message inbox using the message inbox icon.

FIG. 23 shows an operation of viewing the text messages stored in the incoming text message inbox by using the message inbox and associated functional icon. When the user wishes to view the text message in the message inbox, the user touches the display panel and drags the message inbox icon 30G from the icon palette 35 into the first region 20. Then, the user taps the message inbox icon 30G to open the message inbox interface screen 370. The user may not need to tap the icon 30G to open the inbox; instead, the user may simply release the dragged icon 30G in the first region 20. When the circuitry of the mobile terminal detects the tapping (or releasing) of the icon 30G, the circuitry of the mobile terminal causes the touch panel display to display the message inbox interface screen 370. When there are too many messages to be displayed on the execution area 25, the touch panel display displays the "More" button 371 or the "Back" button 372 for displaying the next or previous page of the list.

3-20. VIEW A LIST OF RECENT CALLS USING THE RECENT CALL LIST ICON

Figure 24:
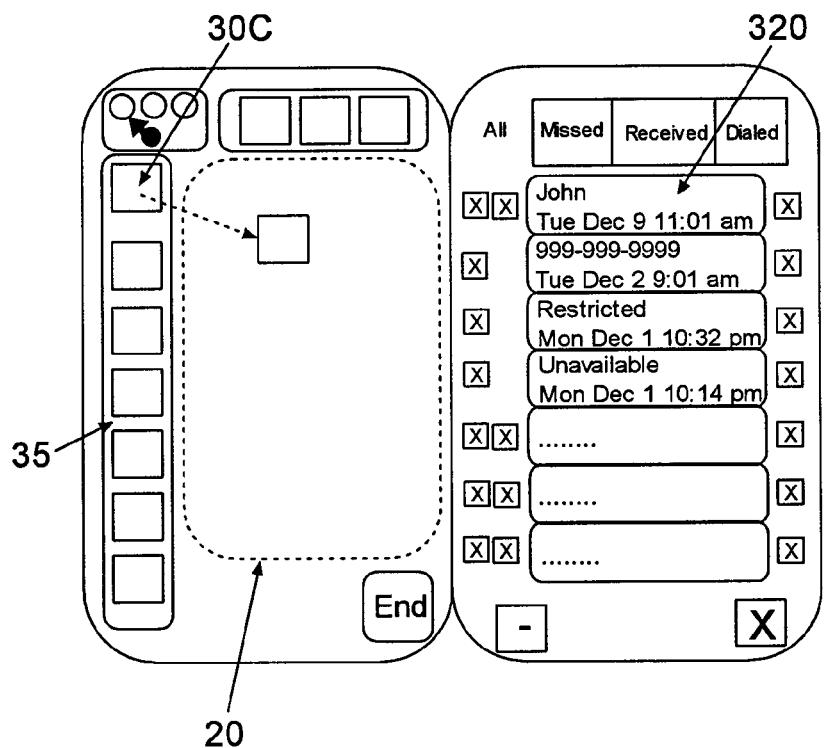
FIG. 24 is an example of an operation of viewing the recent call list using the recent call list icon.

FIG. 24 shows an operation of viewing the recent call list by using the recent call list and associated functional icon. When the user wishes to view the list of the recent call, the user touches the display panel and drags the recent call list icon 30C from the icon palette 35 into the first region 20. Then, the user taps the recent call list icon 30C to open the recent call list interface screen 320. The user may not need to tap the icon 30C to open the recent call list; instead, the user may simply release the dragged icon 30C in the first region 20. When the circuitry of the mobile terminal detects the tapping (or releasing) of the icon 30C, the circuitry of the mobile terminal causes the touch panel display to display the recent call list interface screen 320.

3-21. VIEW A LIST OF EMAIL MESSAGES USING THE EMAIL LIST ICON

Figure 25:
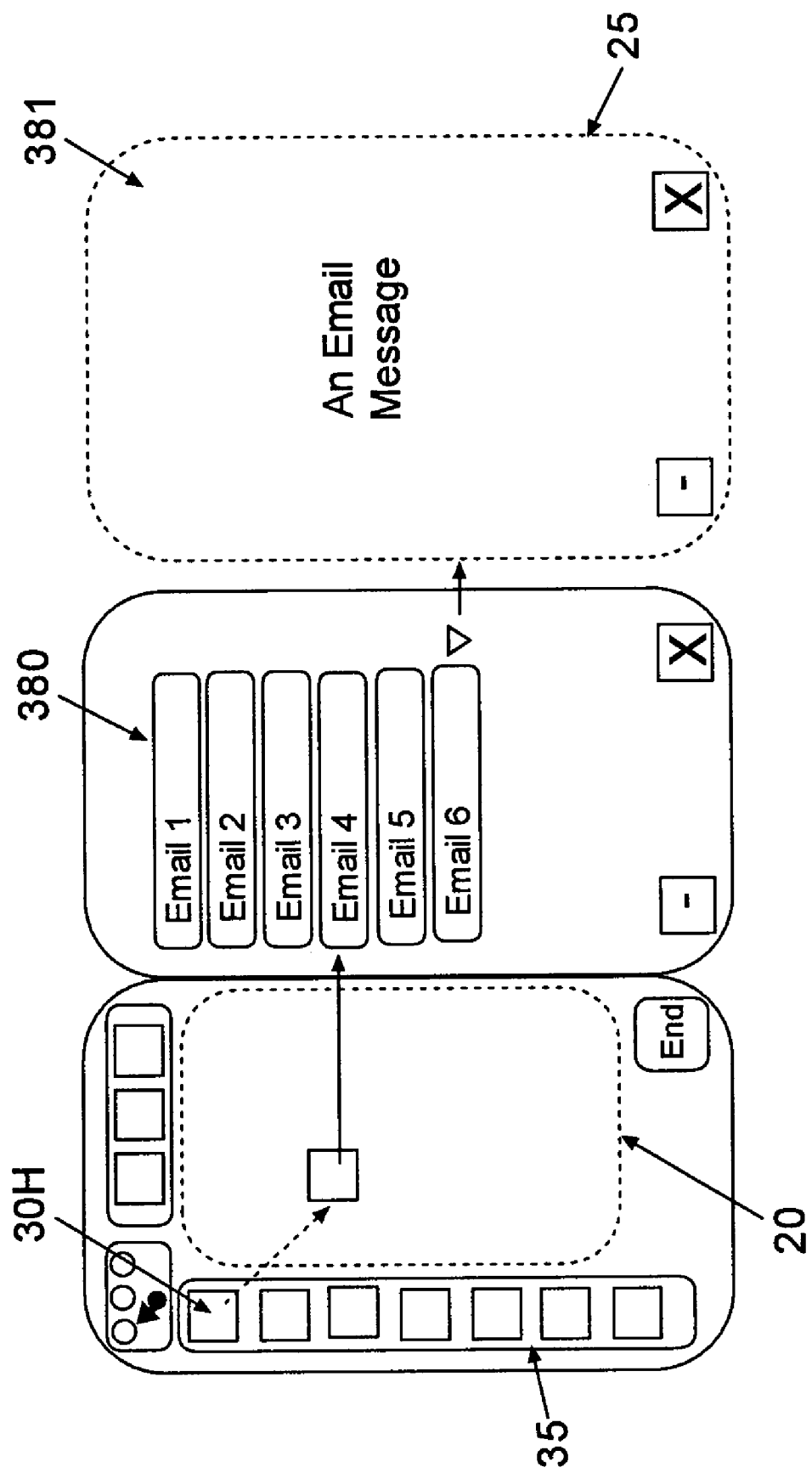
FIG. 25 is an example of an operation of viewing a received e-mail list using an e-mail list icon.

FIG. 25 shows an operation of viewing a received e-mail list by using an e-mail list and associated functional icon. When the user wishes to view the list of the e-mail, the user touches the display panel and drags an e-mail list icon 30H into the first region 20. Then, the user taps the e-mail list icon 30H to open the list of e-mail 380. The user may not need to tap the icon 30H to open the e-mail list; instead, the user may simply release the dragged icon 30H in the first region 20. When the circuitry of the mobile terminal detects the tapping (or releasing) of the icon 30H, the circuitry of the mobile terminal causes the touch panel display to display the e-mail list interface screen 380. When the circuitry of the mobile terminal detects that the user selects one of the email messages from the list by tapping on the touch panel display, the circuitry of the mobile terminal causes the touch panel display to display the selected email message 381 on the execution area 25.

3-22. VIEW A LIST OF PICTURES USING THE PICTURE PLAYER

Figure 26:
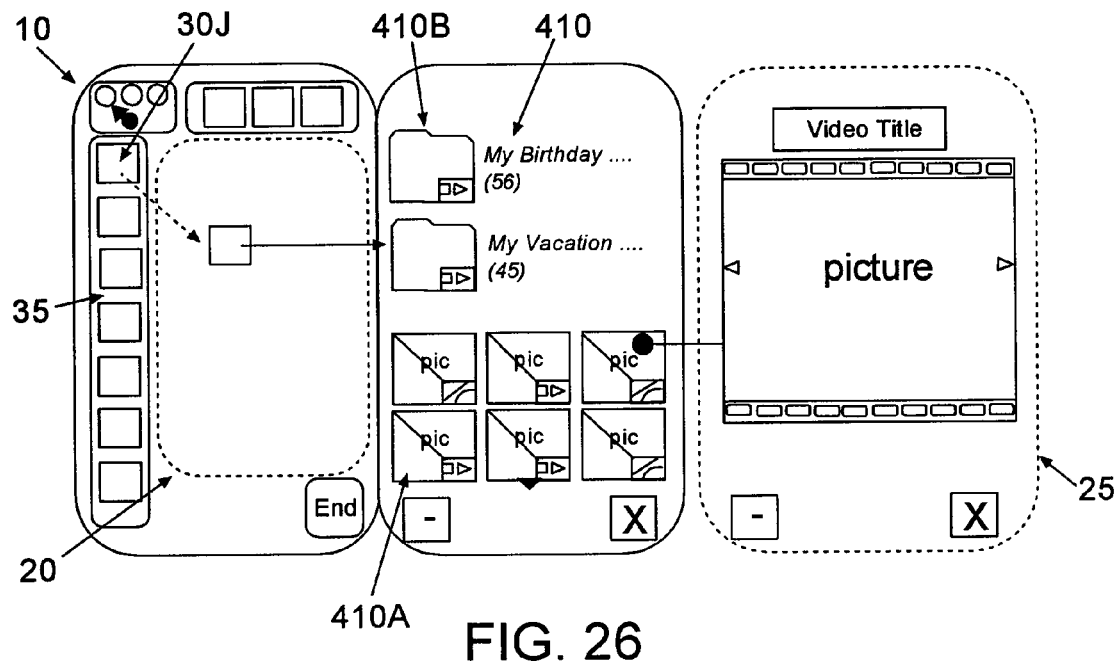
FIG. 26 is an example of an operation of viewing a list of pictures using a picture player icon.

FIG. 26 shows an operation of viewing a list of pictures stored in the mobile terminal using a picture player and associated functional icon. When the user wishes to view the list of pictures stored in the mobile terminal and the pictures, the user touches the display panel and drags a picture player icon 30J into the first region 20. Then, the user taps the picture player icon 30J to open the list of pictures stored in the mobile terminal. The user may not need to tap the icon 30J to open the picture list; instead, the user may simply release the dragged icon 30J in the first region 20. When the circuitry of the mobile terminal detects the tapping or releasing of the icon 30J, the circuitry of the mobile terminal causes the touch panel display to display the list of pictures 410, for example as thumbnails 410A. If the pictures are stored in folders, the mobile terminal also displays one or more folder icons 410B. When the circuitry of the mobile terminal detects tapping of a folder icon 410B by the user, the mobile terminal displays a new set the thumbnails of the pictures. When the circuitry of the mobile terminal detects that the user selects one of the thumbnails from the list by tapping, the circuitry of the mobile terminal causes the touch panel display to display the picture corresponding to the selected thumbnail on the execution area 25.

3-23. VIEW A LIST OF VIDEOS USING THE VIDEO PLAYER

Figure 27:
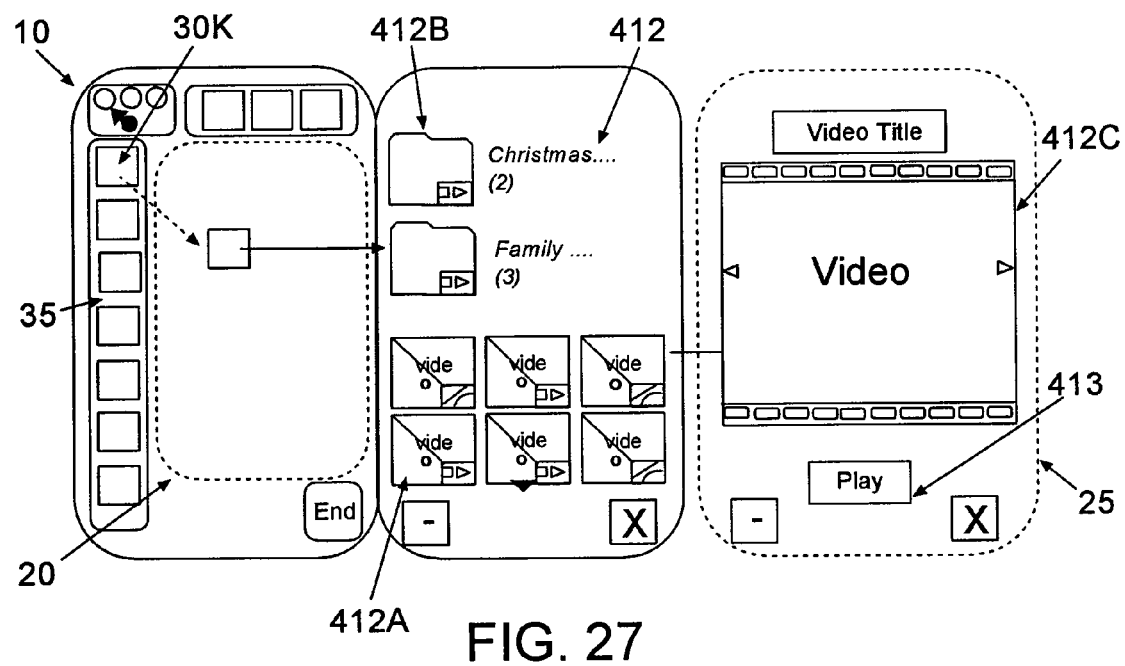
FIG. 27 is an example of an operation of viewing a list of videos using a video player icon.

FIG. 27 shows an operation of viewing a list of videos stored in the mobile terminal using a video player and associated functional icon. When the user wishes to view the list of videos stored in the mobile terminal and the videos, the user touches the display panel and drags a video player icon 30K into the first region 20. Then, the user taps the video player icon 30K to open the list of videos stored in the mobile terminal. The user may not need to tap the icon 30K to open the video list; instead, the user may simply release the dragged icon 30K in the first region 20. When the circuitry of the mobile terminal detects the tapping or releasing of the icon 30K, the circuitry of the mobile terminal causes the touch panel display to display the list of videos 412, for example as thumbnails 412A. If the videos are stored in folders, the mobile terminal also displays one or more folder icons 412B. When the circuitry of the mobile terminal detects tapping of a folder icon 412B by the user, the circuitry of the mobile terminal displays a new set the thumbnails of the videos. When the circuitry of the mobile terminal detects that the user selects one of the thumbnails from the list by tapping, the circuitry of the mobile terminal causes the touch panel display to display the video player interface screen 412C on the execution area 25. Further, when the circuitry of the mobile terminal detects the tapping of a "Play" button 413 by the user, the mobile terminal begins to play the selected video.

3-24. VIEW A LIST OF SONGS USING THE MUSIC PLAYER WITH SEARCH

Figure 28:
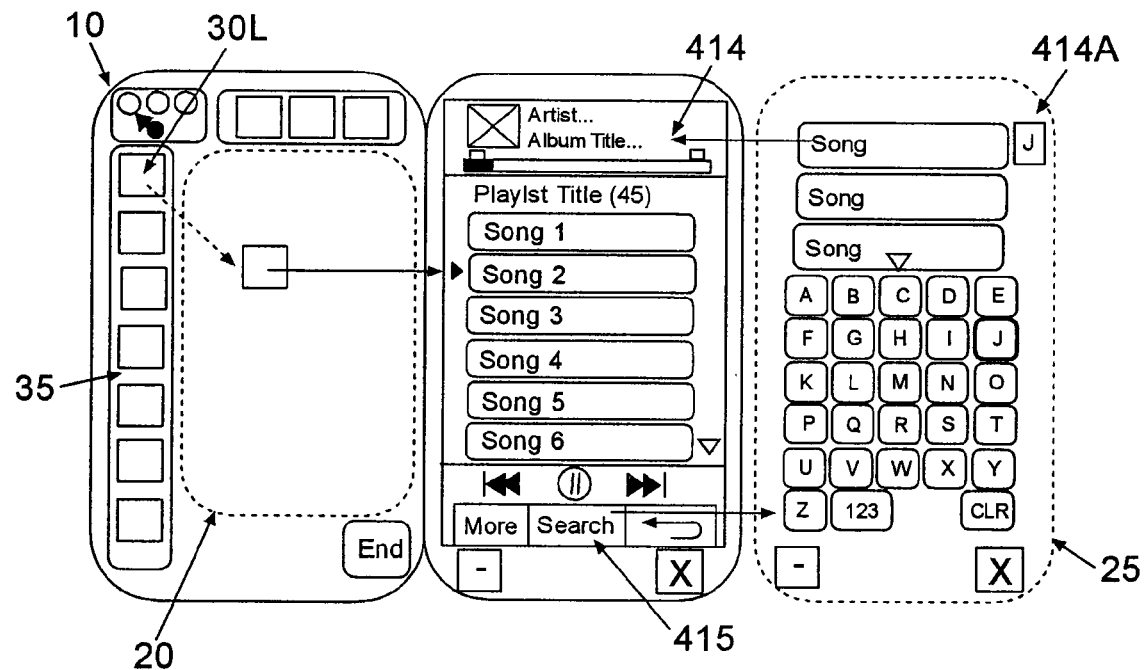
FIG. 28 is an example of an operation of viewing a list of songs using a music player icon.

FIG. 28 shows an operation of viewing a list of songs stored in the mobile terminal using a music player and associated functional icon. When the user wishes to view the list of songs or other audio data stored in the mobile terminal and to listen to a song, the user touches the display panel and drags the music player icon 30L from the icon palette 35 into the first region 20. Then, the user taps the music player icon 30L to open the list of music stored in the mobile terminal. The user may not need to tap the icon 30L to open the music list; instead, the user may simply release the dragged icon 30L in the first region 20. When the circuitry of the mobile terminal detects the tapping or releasing of the icon 30L, the circuitry of the mobile terminal causes the touch panel display to display the list of songs interface screen 414. When the circuitry of the mobile terminal detects the tapping of one of the songs listed in the song list interface screen 414, the mobile terminal causes a music player circuitry to play the song. The user may select a song to listen to from the list or press a "Search" button 415 to look for a song. When the circuitry of the mobile terminal detects the pressing of the "Search" button 415, the circuitry of the mobile terminal causes the touch panel display to display a search function interface screen 414A on the execution area 25.

3-25. VIEW A LIST OF VOICE MAILS

Figure 29:
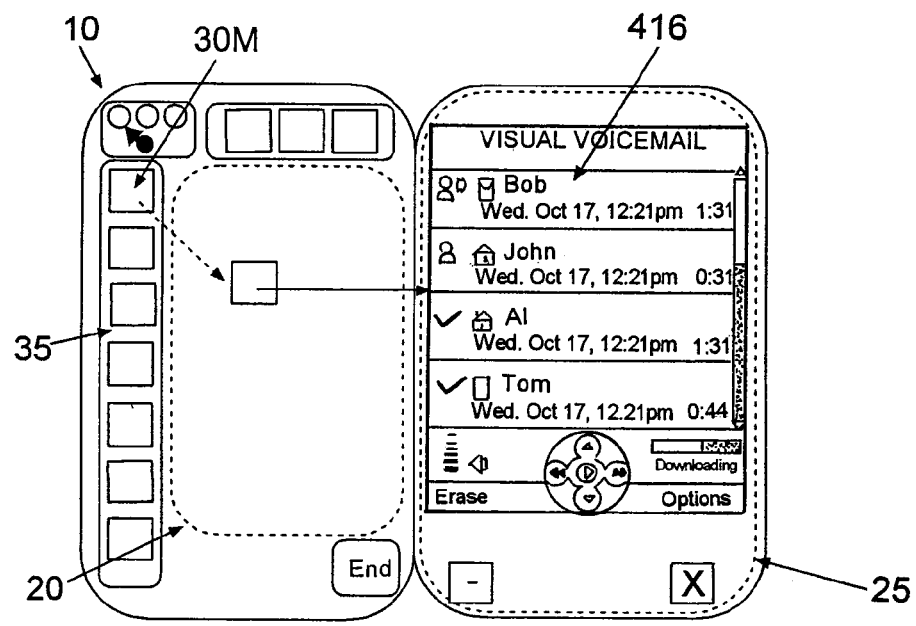
FIG. 29 is an example of an operation of viewing a list of voice mails using a view voice mail icon.

FIG. 29 shows an operation of viewing a list of voice mails using a view voice mail function and associated functional icon. When the user wishes to view the list of voice mails received and to listen to a voice mail, the user touches the display panel and drags the view voice mail icon 30M into the first region 20. Then, the user taps the view voice mail icon 30M to open the list of voice mails received. The user may not need to tap the icon 30M to open the voice mail list; instead, the user may simply release the dragged icon 30M in the first region 20. When the circuitry of the mobile terminal detects the tapping or releasing of the icon 30M, the circuitry of the mobile terminal causes the touch panel display to display a list of voice mails interface screen 416 on the execution area 25. The user may select one of the voice mails in the list to listen to the voice mail. When the circuitry of the mobile terminal detects the tapping of one of the voice mails listed in the voice mail list interface screen 416, the mobile terminal replays the voice mail.

3-26. VIEW A LIST OF GAMES

Figure 30:
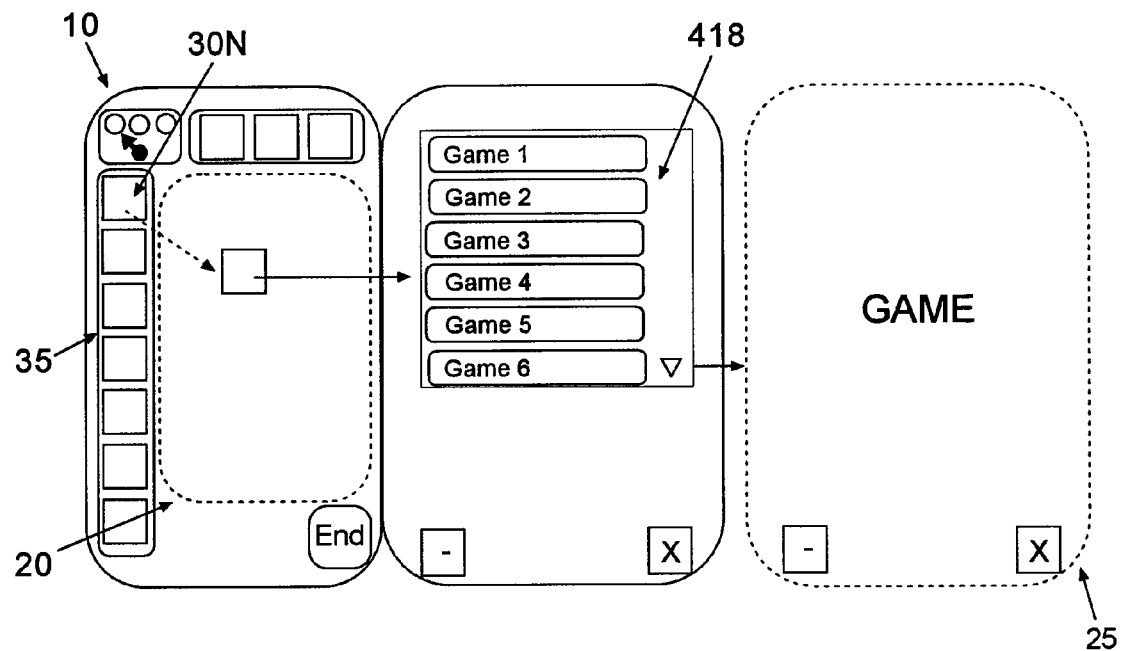
FIG. 30 is an example of an operation of viewing a list of games using a game list icon.

FIG. 30 shows an operation of viewing a list of games using a game list and associated functional icon. When the user wishes to view the list of games and to play a game, the user touches the display panel and drags the game list icon 30N into the first region 20. Then, the user taps the game list icon 30N to open the list of games. The user may not need to tap the icon 30N to open the game list; instead, the user may simply release the dragged icon 30N in the first region 20. When the circuitry of the mobile terminal detects the tapping or releasing of the icon 30N, the circuitry of the mobile terminal causes the touch panel display to display a list of games interface screen 418. The user can drag and leave a game icon onto the first region 20 without launching the game so the user can gain easy and one touch access to the game in the future. For example, the mobile terminal may be configured to display the game list icon 30N on the first region without beginning the game when the game list icon 30N is dragged into the first region and simply released without tapping, or when the user drags the game list icon 30N into the first region and remains pressing the icon 30N over, for example, 500 millisecond. Also, the user can drag a game onto the extracted icon of a contact to initiate a game with the contact person. The user may select one of the games to play. When the circuitry of the mobile terminal detects the tapping of one of the games listed in the game list interface screen 418, the mobile terminal reads out the selected game program and begins the game on the execution area 25.

3-27. VIEW STREAMING VIDEO FROM THE INCOMING EVENT PALETTE

Figure 31:
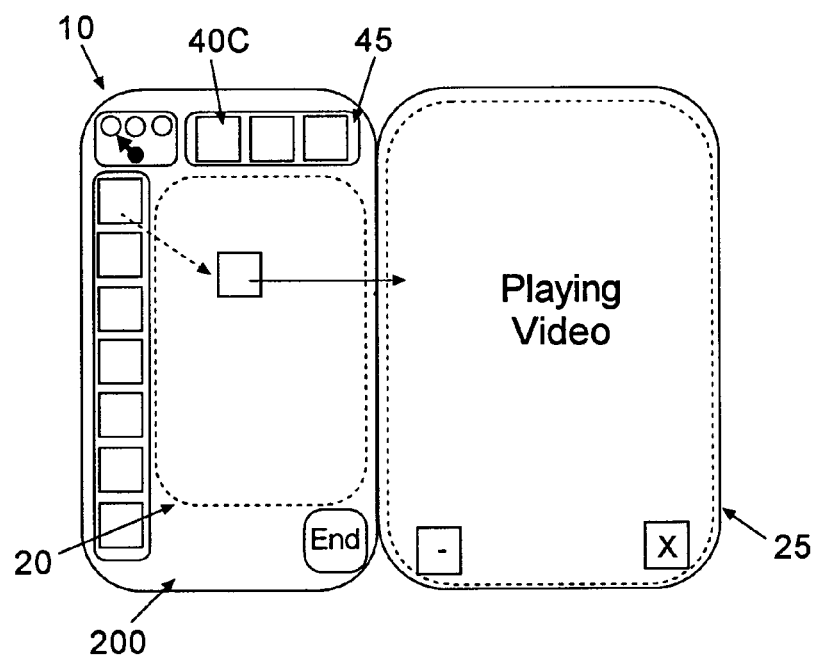
FIG. 31 is an example of an operation of viewing a streaming video using an incoming video notification icon.

FIG. 31 shows an operation of viewing a streaming video using an incoming video notification function and associated functional icon. When the mobile terminal detects that a streaming video is received from outside the mobile terminal, the circuitry of the mobile terminal makes the incoming video notification icon 40C associated with receiving a streaming video to flash on and off. To view the streaming video, the user touches the display panel and drags the incoming video notification icon 40C from icon palette 45 into the first region 20 of the first touch panel display 200. The user may or may not need to tap the incoming video notification icon 40C on the first region 20 to view the video. When the circuitry of the mobile terminal detects the dragging and releasing the icon 40C, the mobile terminal plays the streaming video on the execution area 25 by using a video player.

3-28. MODIFY A CONTACT'S INFORMATION USING THE CONTACT LIST

Figure 32:
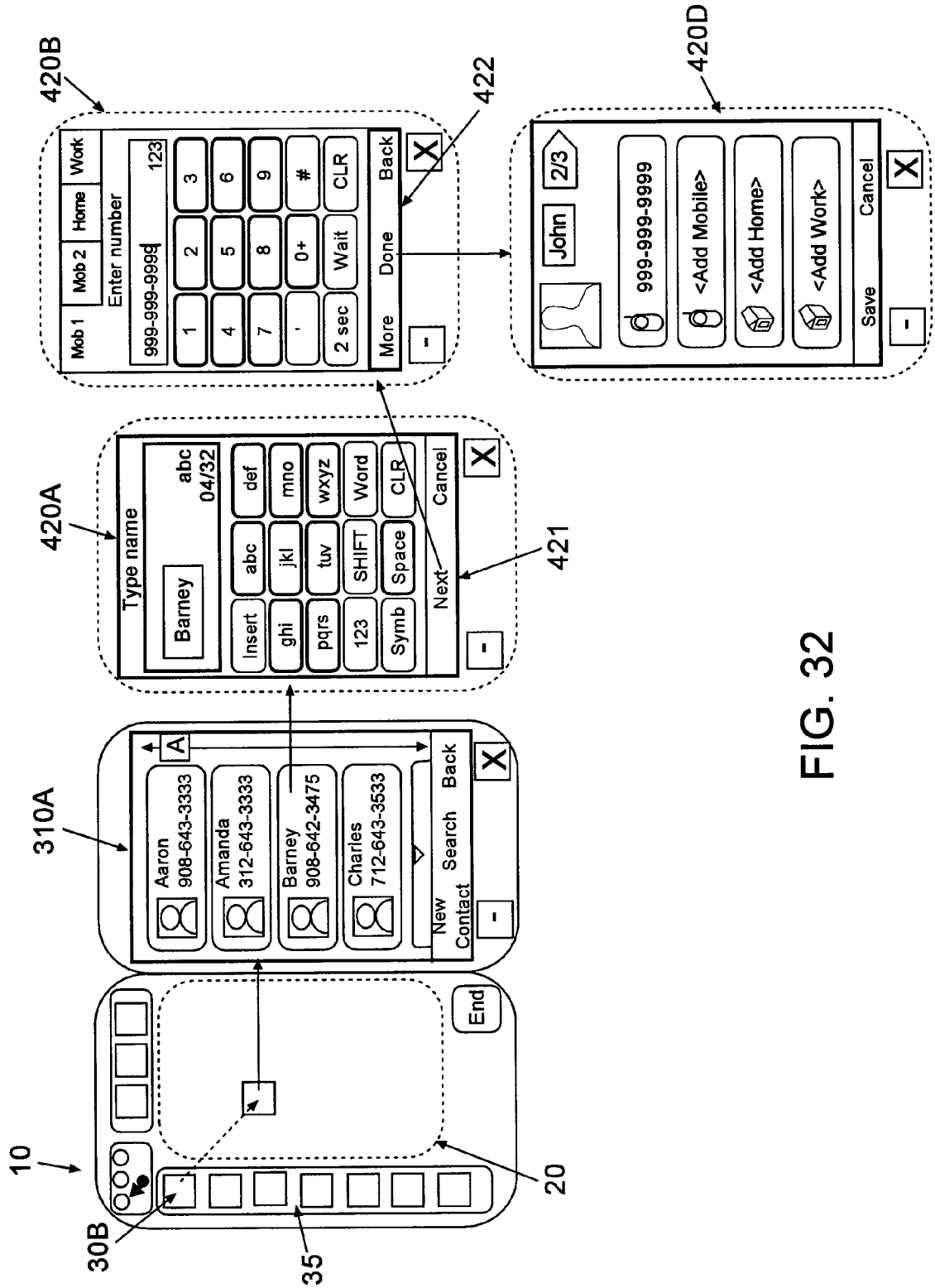
FIG. 32 is an example of an operation of modifying contact's information using a contact list icon.

FIG. 32 shows an operation of modifying contact's information using a contact list and associated functional icon. When the user wishes to modify the contact's information, the user touches the display panel and drags the contact list icon 30B from the icon palette into the first region 20. Then, the user taps the icon to open the contact list interface screen 310A. The user may not need to tap the icon 30B to open the contact list interface screen 310A; instead, the user may simply release the dragged icon 30B in the first region 20. When the circuitry of the mobile terminal detects the tapping or releasing of the icon 30B, the circuitry of the mobile terminal causes the touch panel display to display the contact list interface screen 310A on the execution area 25. The user selects the contact of which information is to be modified from the contact list interface screen 310A and presses the contact, for example for over 500 milliseconds. When the circuitry of the mobile terminal detects the pressing, the circuitry of the mobile terminal causes the touch panel display to display an edit screen 420A. When the circuitry of the mobile terminal detects the pressing of a "Next" button 421 in the edit screen 420A, the mobile terminal causes the touch panel display to display a number key pad interface 420B. The user enters, for example, the new number and presses a "Done"

button 422. The mobile terminal allows the user to modify other information by the similar manner from the next screen 420D.

3-29. DELETE A CONTACT FROM THE CONTACT LIST

Figure 33:
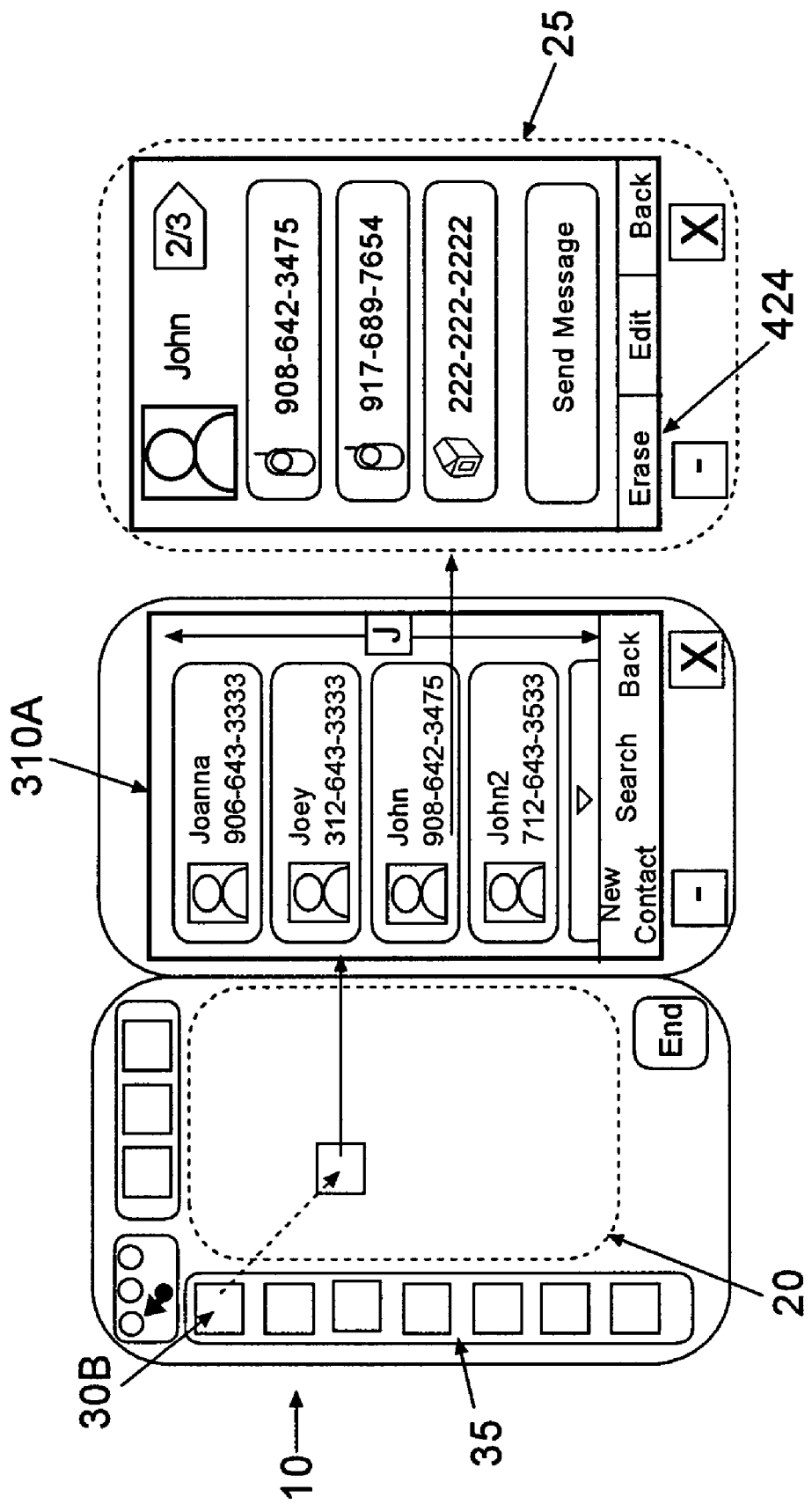
FIG. 33 is an example of an operation of deleting a contact from the contact list using a contact list icon.

FIG. 33 shows an operation of deleting a contact from the contact list using a contact list and associated functional icon. Similar to the modifying the contact list, when the user wishes to delete a specific contact, the user touches the display panel and drags the contact list icon 30B from the icon palette 35 into the first region 20. Then, the user taps the icon to open the contact list interface screen 31A. The user may not need to tap the icon 30B to open the contact list interface screen 310A; instead, the user may simply release the dragged icon 30B in the first region 20. When the circuitry of the mobile terminal detects the tapping or releasing of the icon 30B, the circuitry of the mobile terminal causes the touch panel display to display the contact list interface screen 310A on the execution area 25. The user selects the contact of which information is to be deleted. When the circuitry of the mobile terminal detects the tapping of an "Erase" button 424, the mobile terminal deletes the contact from the contact list interface screen 310A.

3-30. DELETE A VOICE CALL FROM THE RECENT CALL LIST

Figure 34:
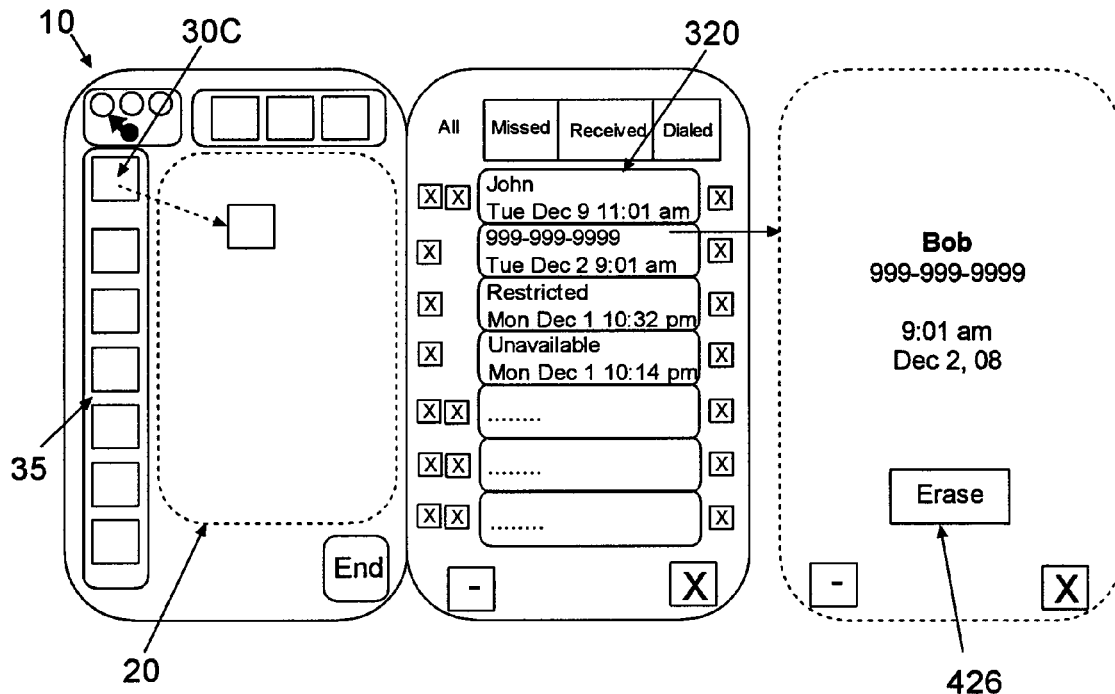
FIG. 34 is an example of an operation of deleting a voice call history from the recent call list using a recent call list icon.

FIG. 34 shows an operation of deleting a voice call history from the recent call list using a recent call list and associated functional icon. Similar to the deleting the contact, when the user wishes to delete a specific voice call from the recent call list, the user touches the display panel and drags the recent call list icon 30C from the icon palette 35 into the first region 20. Then, the user taps the icon to open the recent call list interface screen 320. The user may not need to tap the icon 30C to open the recent call list interface screen 320; instead, the user may simply release the dragged icon 30C in the first region 20. When the circuitry of the mobile terminal detects the tapping or releasing of the icon 30C, the circuitry of the mobile terminal causes the touch panel display to display the recent call list interface screen 320 on the execution area 25. The user selects the voice call to be deleted, for example a missed call. When the circuitry of the mobile terminal detects the tapping of an "Erase" button 424, the mobile terminal deletes the voice call from the recent call list interface screen 320.

3-31. DELETE A TEXT MESSAGE FROM MESSAGING INBOX

Figure 35:
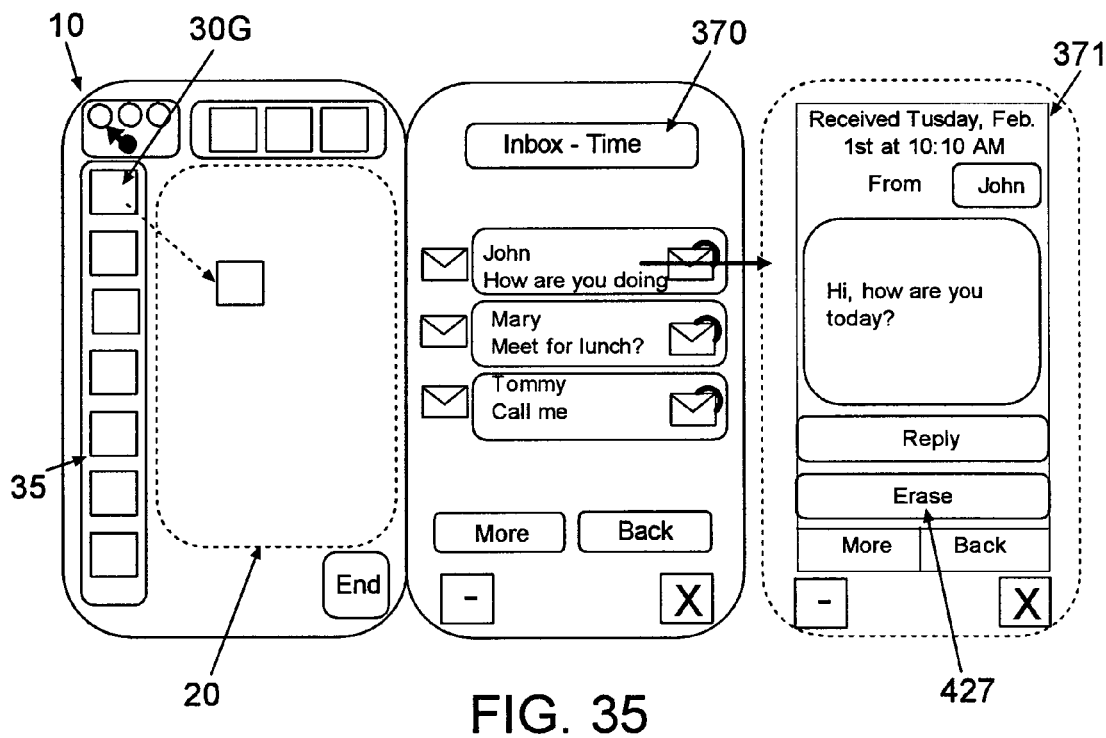
FIG. 35 is an example of an operation of deleting a text message from the text message inbox using a message inbox icon.

FIG. 35 shows an operation of deleting a text message from the text message inbox using a message inbox and associated functional icon. Similar to the deleting the contact, when the user wishes to delete a specific text message from the message inbox, the user touches the display panel and drags the message inbox icon 30G from the icon palette 35 into the first region 20. Then, the user taps the icon to open the message inbox interface screen 370. The user may not need to tap the icon 30G to open the message box 370, instead, the user may simply release the dragged icon 30G in the first region 20. When the circuitry of the mobile terminal detects the tapping or releasing of the icon 30G, the circuitry of the mobile terminal causes the touch panel display to display the message inbox 370 on the execution area 25. The user selects the text message to be deleted. When the circuitry of the mobile terminal detects the selecting of the text message by user's tapping, the circuitry of the mobile terminal causes the touch panel display to display the text message 371. Further, when the circuitry of the mobile terminal detects of the tapping of an "Erase" button 427, the mobile terminal deletes the text message from the message inbox interface screen 370.

3-32. DELETE A PICTURE FROM THE PICTURE PLAYER

Figure 36:
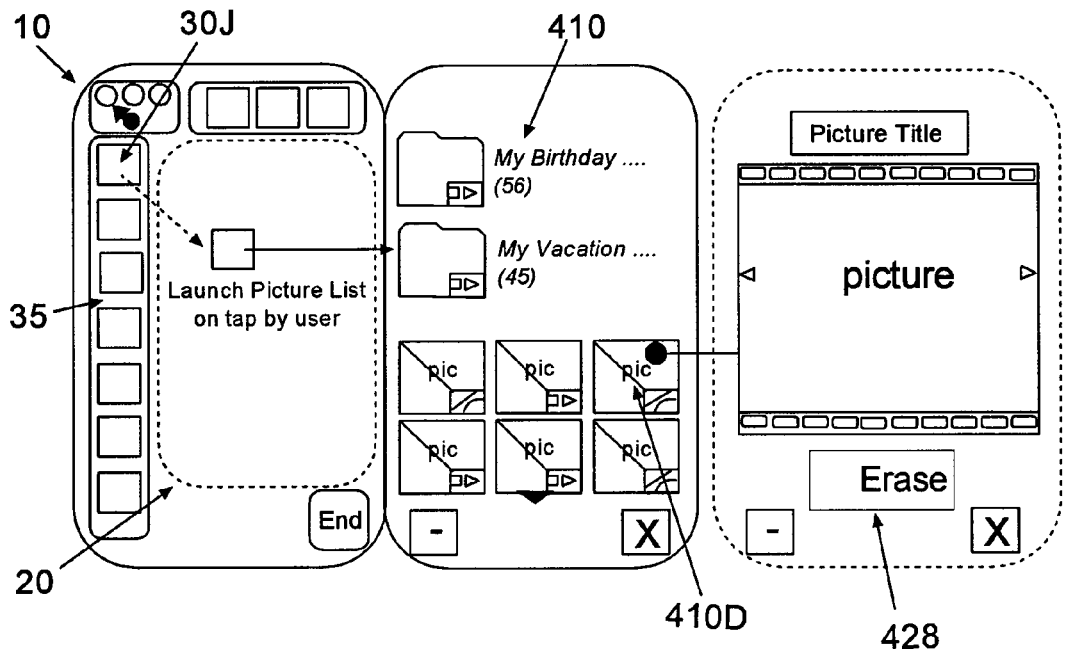
FIG. 36 is an example of an operation of deleting a picture from the list of pictures using a picture player icon.

FIG. 36 shows an operation of deleting a picture from the list of pictures using a picture player and associated functional icon. Similar to the deleting the contact, when the user wishes to delete a specific picture from the memory of the mobile terminal, the user touches the display panel and drags the picture player icon 30J from the icon palette 35 into the first region 20. Then, the user taps the icon to open the picture player 410. The user may not need to tap the icon 30J to open the picture player 410; instead, the user may simply release the dragged icon 30J in the first region 20. When the circuitry of the mobile terminal detects the tapping or releasing of the icon 30J, the circuitry of the mobile terminal causes the touch panel display to display the picture player 410 on the execution area 25. The user selects the thumbnail 410D corresponding to the picture to be deleted. When the circuitry of the mobile terminal detects the selecting of the thumbnail by user's tapping, the circuitry of the mobile terminal causes the touch panel display to display the picture on the execution area 25. Further, when the circuitry of the mobile terminal detects of the tapping of an "Erase" button 428, the mobile terminal deletes the picture from the memory.

3-33. DELETE A VIDEO FROM THE VIDEO PLAYER

Figure 37:
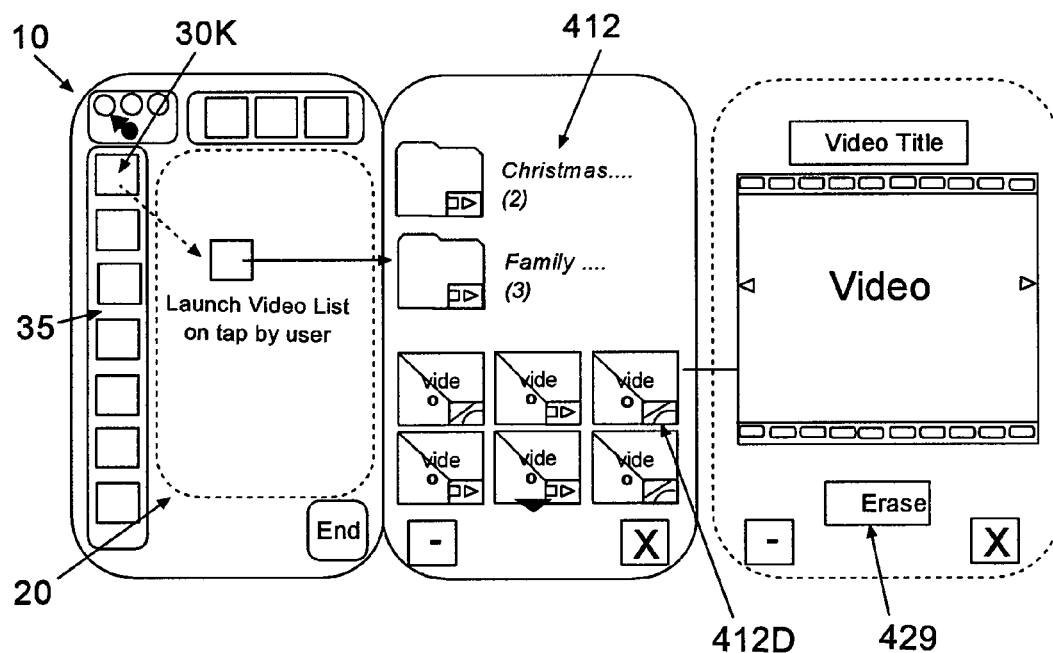
FIG. 37 is an example of an operation of deleting a video from the list of videos using a video player icon.

FIG. 37 shows an operation of deleting a video from the list of videos using a video player and associated functional icon. Similar to the deleting the picture, when the user wishes to delete a specific video from the memory of the mobile terminal, the user touches the display panel and drags the video player icon 30K from the icon palette 35 into the first region 20. Then, the user taps the icon to open the video player 412. The user may not need to tap the icon 30K to open the video player 412; instead, the user may simply release the dragged icon 30K in the first region 20. When the circuitry of the mobile terminal detects the tapping or releasing of the icon 30K, the circuitry of the mobile terminal causes the touch panel display to display the video player 412 on the execution area 25. The user selects the thumbnail 412D corresponding to the video to be deleted. When the circuitry of the mobile terminal detects the selecting of the thumbnail by user's tapping, the circuitry of the mobile terminal causes the touch panel display to display the video on the execution area 25. Further, when the circuitry of the mobile terminal detects of the tapping of an "Erase" button 429, the mobile terminal deletes the video from the memory.

3-34. DELETE A VOICE MAIL FROM THE VOICE MAIL LIST

Figure 38:
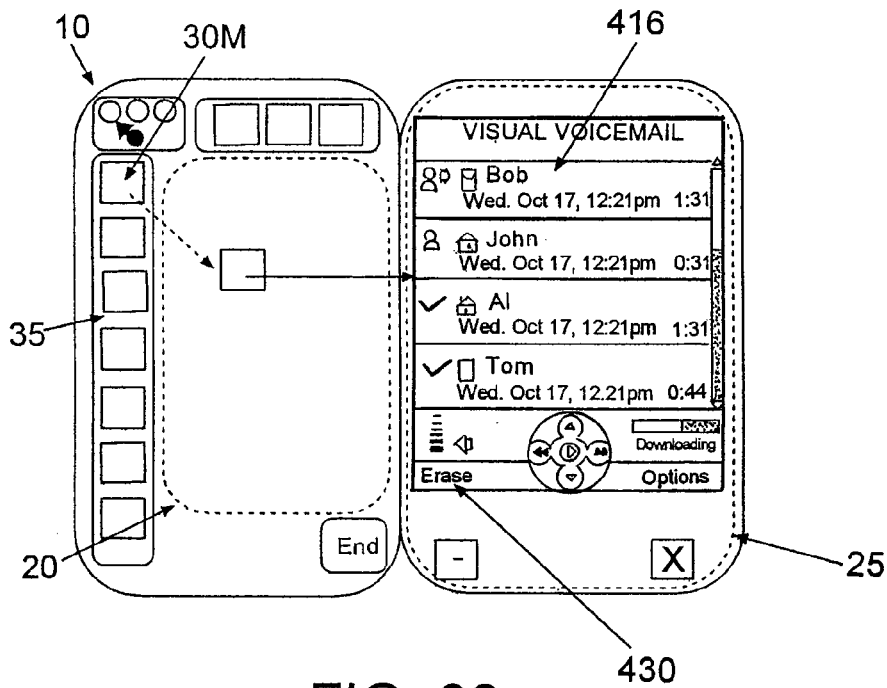
FIG. 38 is an example of an operation of deleting a voice mail from the list of voice mails using a voice mail icon.

FIG. 38 shows an operation of deleting a voice mail from the list of voice mails using a voice mail function and associated functional icon. Similar to deleting the contact, when the user wishes to delete a specific voice mail from the list of voice mails, the user touches the display panel and drags the voice mail icon 30M from the icon palette 35 into the first region 20. Then, the user taps the icon to open the list of voice mails 416. The user may not need to tap the icon 30M to open the list of voice mails 416; instead, the user may simply release the dragged icon 30M in the first region 20. When the circuitry of the mobile terminal detects the tapping or releasing of the icon 30M, the circuitry of the mobile terminal causes the touch panel display to display the list of voice mails 416 on the execution area 25. The user selects the voice mail to be deleted. When the circuitry of the mobile terminal detects the tapping of an "Erase" button 430, the mobile terminal deletes the voice mail from the list of voice mails 416.

3-35. DELETE A GAME FROM THE GAME LIST

Figure 39:
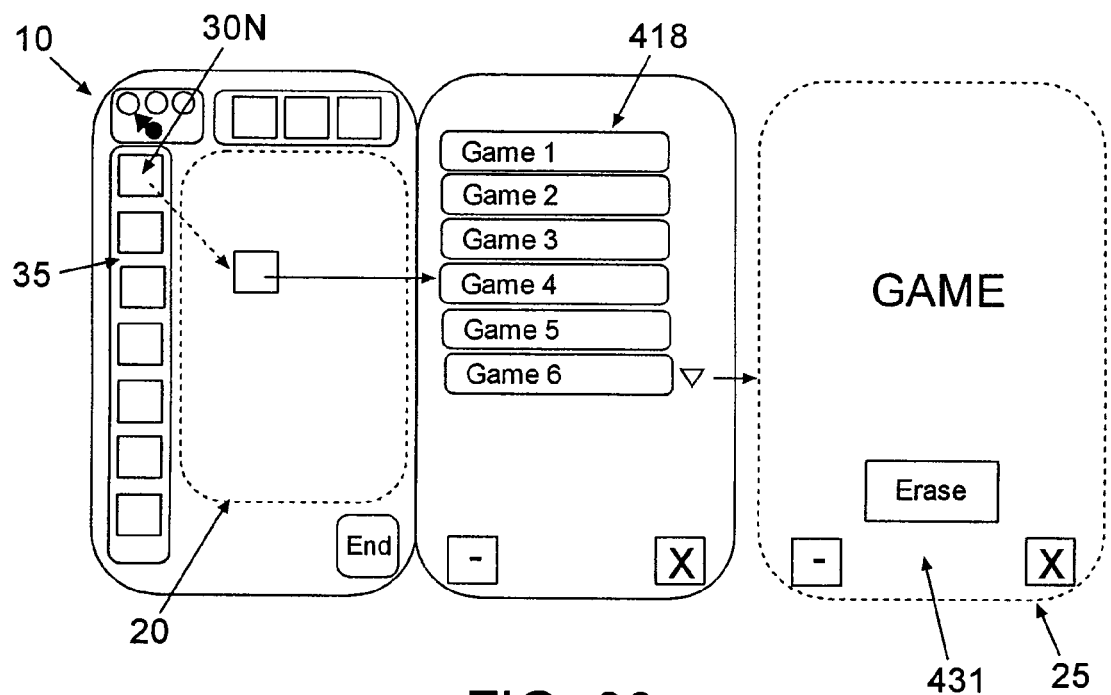
FIG. 39 is an example of an operation of deleting a game from the list of games using a game list icon.

FIG. 39 shows an operation of deleting a game from the list of games using a game list and associated functional icon. Similar to the deleting the contact, when the user wishes to delete a specific game from the list of games, the user touches the display panel and drags the game list icon 30N from the icon palette 35 into the first region 20. Then, the user taps the icon to open a list of games 418. The user may not need to tap the icon 30N to open the list of games 418; instead, the user may simply release the dragged icon 30N in the first region 20. When the circuitry of the mobile terminal detects the tapping or releasing of the icon 30N, the circuitry of the mobile terminal causes the touch panel display to display the list of games 418 on the execution area 25. The user selects the game to be deleted. When the mobile terminal detects the selecting of the game by user's tapping, the circuitry of the mobile terminal causes the touch panel display to display the game on the execution area 25. When the circuitry of the mobile terminal detects the tapping of an "Erase" button 431, the mobile terminal deletes the game from the game list 418.

3-36. DELETE AN EMAIL MESSAGE FROM A LIST OF EMAIL MESSAGES

Figure 40:
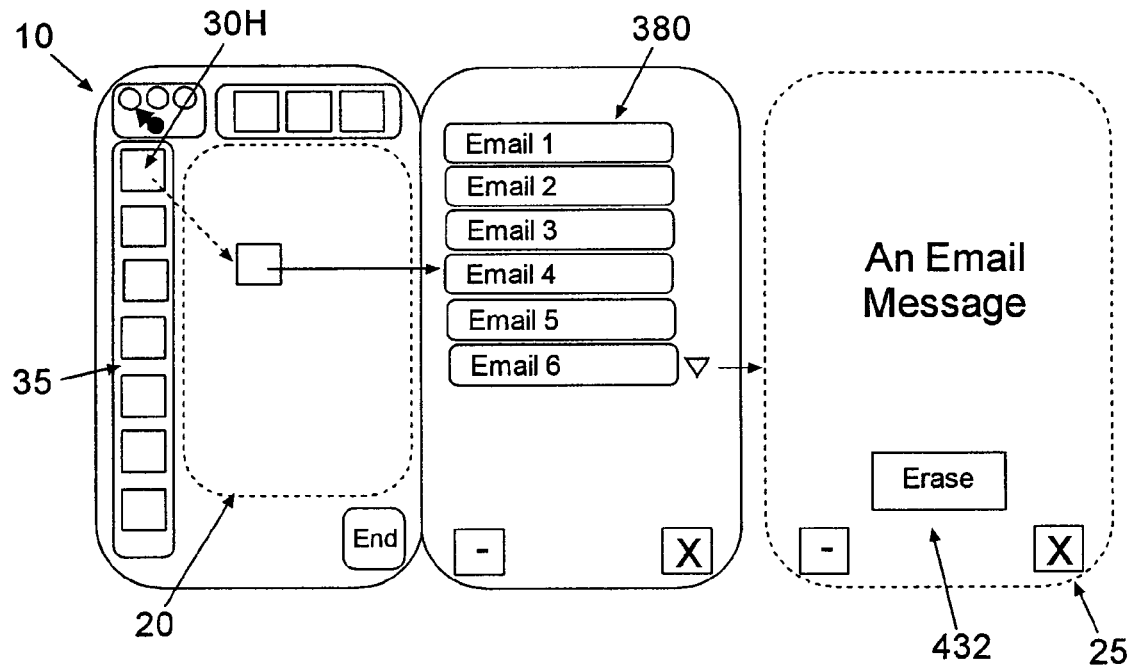
FIG. 40 is an example of an operation of deleting an email message from the list of emails using an email message list icon.

FIG. 40 shows an operation of deleting an email message from the list of emails using an email message list and associated functional icon. Similar to the deleting the contact, when the user wishes to delete a specific email from the list of emails, the user touches the display panel and drags the e mail list icon 30H from the icon palette 35 into the first region 20. Then, the user taps the icon to open the list of emails 380. The user may not need to tap the icon 30H to open the list of emails 380; instead, the user may simply release the dragged icon 30H in the first region 20. When the circuitry of the mobile terminal detects the tapping or releasing of the icon 30H, the circuitry of the mobile terminal causes the touch panel display to display the list of emails 380 on the execution area 25. The user selects the email to be deleted. When the mobile terminal detects the selecting of the email by user's tapping, the mobile terminal causes the touch panel display to display the email on the execution area 25. When the circuitry of the mobile terminal detects the tapping of an "Erase" button 432, the mobile terminal deletes the email from the list of emails 380.

3-37. GET DIRECTIONS TO A CONTACT'S LOCATION USING AN EXTRACTED CONTACT

Figure 41:
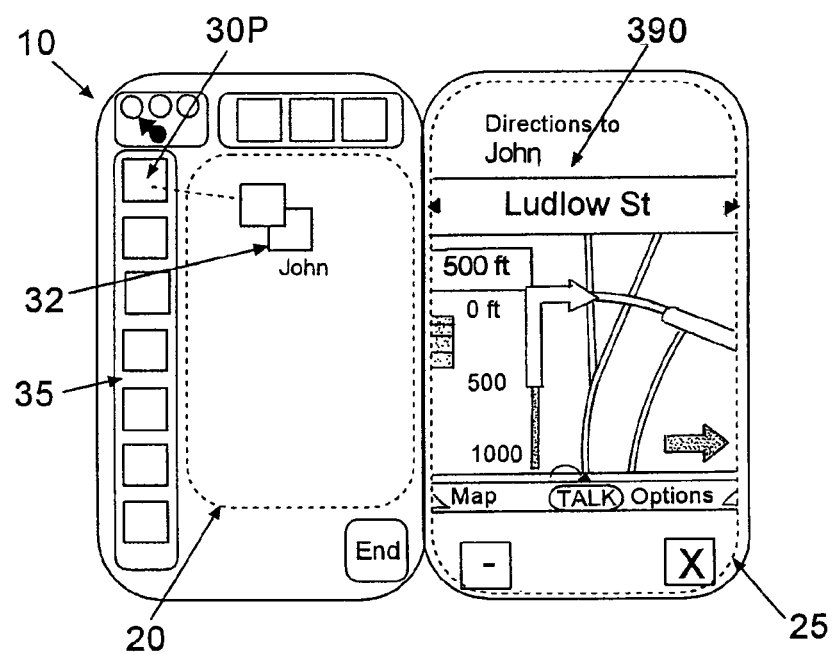
FIG. 41 is an example of an operation of getting directions to a contact's location using a navigator icon and an extracted contact icon.

FIG. 41 shows an operation of getting directions to a contact's location using a navigator and associated functional icon and an extracted contact icon. Similar to FIG. 14, the user had previously extracted a contact onto the first region 20 by, for example, placing a call to a person. The extracted contact icon 32 may include not only the telephone number(s) but also the address of that person. When the user wishes to get directions to the address of the person of the extracted contract, the user touches the display panel and drags the navigator icon 30P from the icon palette 35 onto the extracted contact icon 32. When the circuitry of the mobile terminal detects that the extracted contact icon is displayed in the first region and the navigator icon 30P overlaps the extracted contact icon 32, the circuitry of the mobile terminal causes the touch panel display to display the navigator 390 together with a map on the execution area 25. The mobile terminal reads out the address of the contact and calculates the direction from the present position of the user (i.e., the position of the mobile terminal) obtained by the GPS 115 to the address of the contact, and then causes the touch panel display to display the direction on the navigator 390. If the mobile terminal does not have a GPS or the GPS data are unavailable, the mobile terminal may display a map around the contact's address on the navigator 390. The extracted contact in this example may be replaced with an extracted webpage. As explained section 3-42 below, a webpage may be extracted onto the first region. If the webpage includes an address, the circuitry of the mobile terminal causes the touch panel display to display the direction to the address included in the webpage or the map around the address as explained above. If neither extracted icon nor extracted webpage contains the address, then the circuitry of the mobile terminal prompts the user to input the address information.

3-38. STREAM VIDEO TO AN EXTRACTED CONTACT

Figure 42:
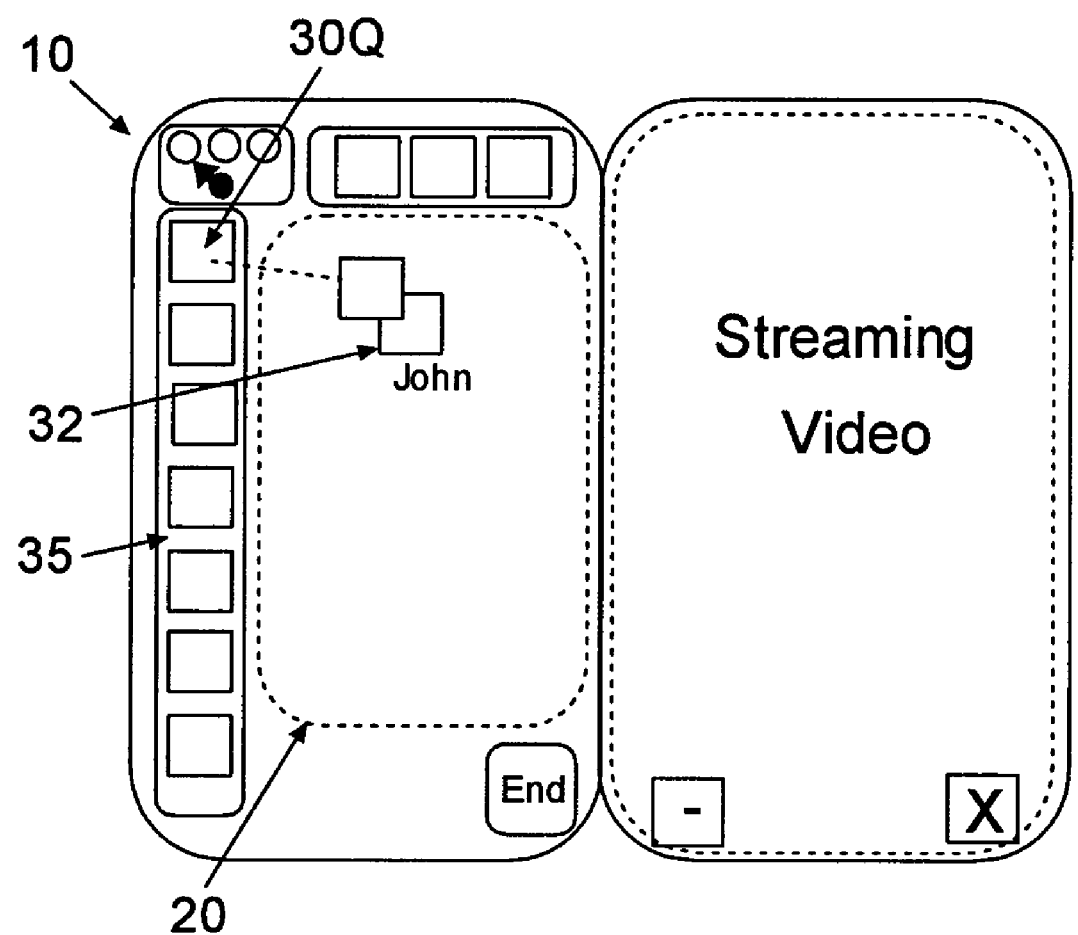
FIG. 42 is an example of an operation of streaming a video to the extracted contact using the extracted contact icon.

FIG. 42 shows an operation of streaming a video to an extracted contact using the extracted contact icon. The user had previously extracted a contact onto the first region 20 by, for example, placing a call to a person. The extracted contact icon 32 may include address information that can receive the streaming video (e.g., a mobile telephone number). When the user wishes to stream a video to the address of the person of the extracted contract, the user touches the display panel and drags the streaming video icon 30Q from the icon palette 35 onto the extracted contact icon 32. When the circuitry of the mobile terminal detects that the extracted contact icon is displayed in the first region and the streaming video icon 30Q overlaps the extracted contact icon 32, the circuitry of the mobile terminal causes the touch panel display to display a list of videos that have been stored in the mobile terminal and can be streamed on the execution area 25. The user selects the video which is to be streamed. When the circuitry of the mobile terminal detects the selecting of the video by user's tapping, the mobile terminal sends the video to the person's address as a streaming video. If the mobile terminal has a video camera 195, the video which is being taken may be streamed to the address instead of the video which has been stored in the mobile terminal. Alternatively, the user may first extract a video as an extracted video icon and drag the extracted video icon onto the extracted contact (or drag the extracted contact icon onto the extracted video icon) to stream the video. In a similar manner, a song or music may be streamed to the contact.

3-39. TAKE A PICTURE AND SEND IT TO AN EXTRACTED CONTACT

Figure 43:
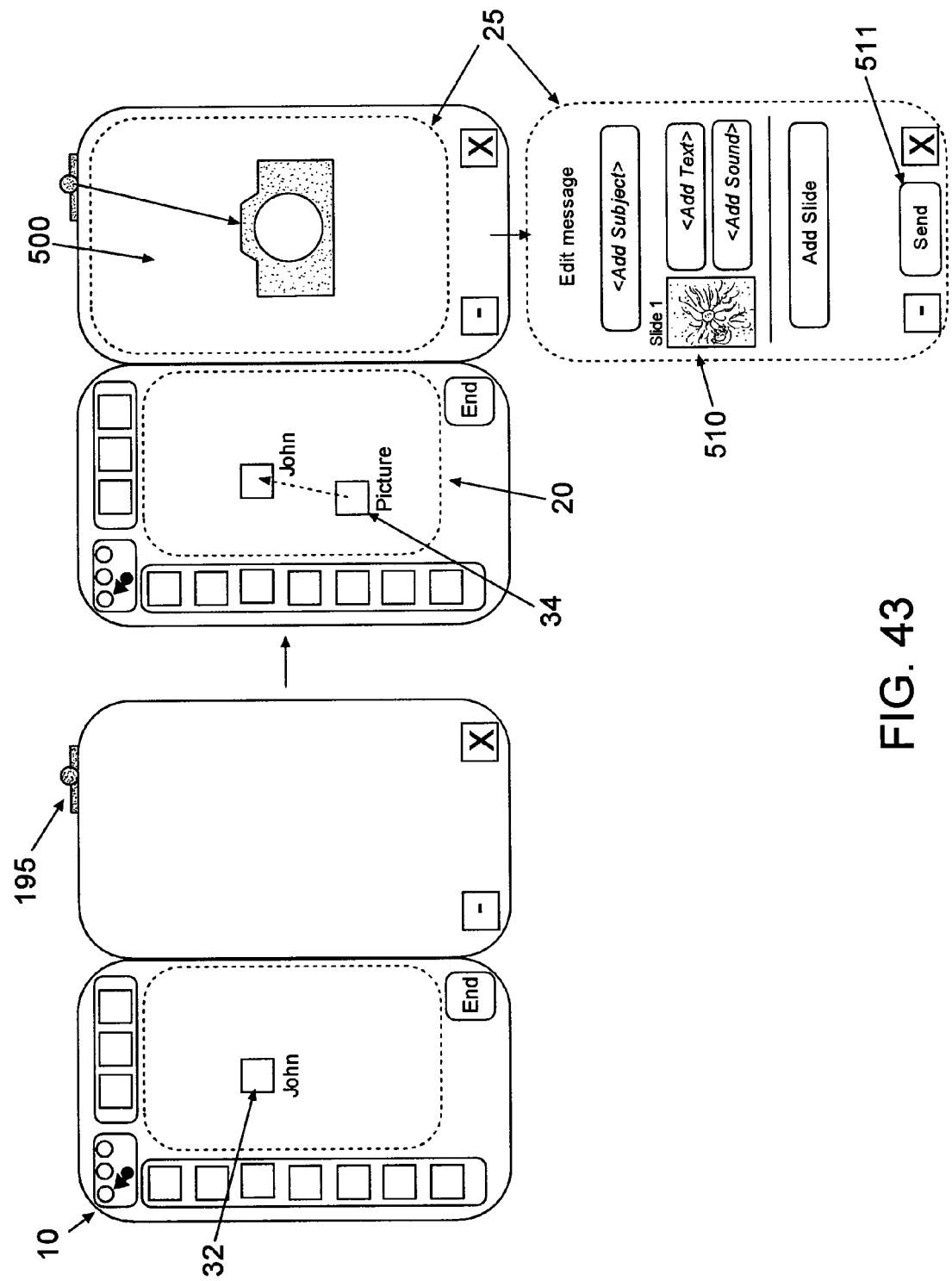
FIG. 43 is an example of an operation of taking a picture and sending it to an extracted contact using the extracted contact icon.

FIG. 43 shows an operation of taking a picture and sending it to an extracted contact using the extracted contact icon. The user may take a picture with a camera 195 of the mobile terminal. The circuitry of mobile terminal displays the picture 500 in the execution area 25 and a thumbnail icon 34 of the picture on the first region 20. The user had previously extracted a contact and placed the extracted contact icon 32 on the first region 20. The user drags the thumbnail icon 34 of the picture 500 onto the previously extracted contact icon 32. When the circuitry of the mobile terminal detects that the extracted contact icon 32 is displayed in the first region and the thumbnail icon 34 overlaps the extracted contact icon 32, the circuitry of the mobile terminal causes the touch panel display to display a messaging template screen 510 on the execution area 25, in which the user can add information and send the picture 500 to the address of the extracted contact icon 32. Upon detecting the tapping of a "Send" button 511, the mobile terminal sends the picture to the corresponding contact address of the icon 32.

3-40. TAKE A PICTURE AND UPLOAD TO SOCIAL NETWORKING SITE

Figure 44:
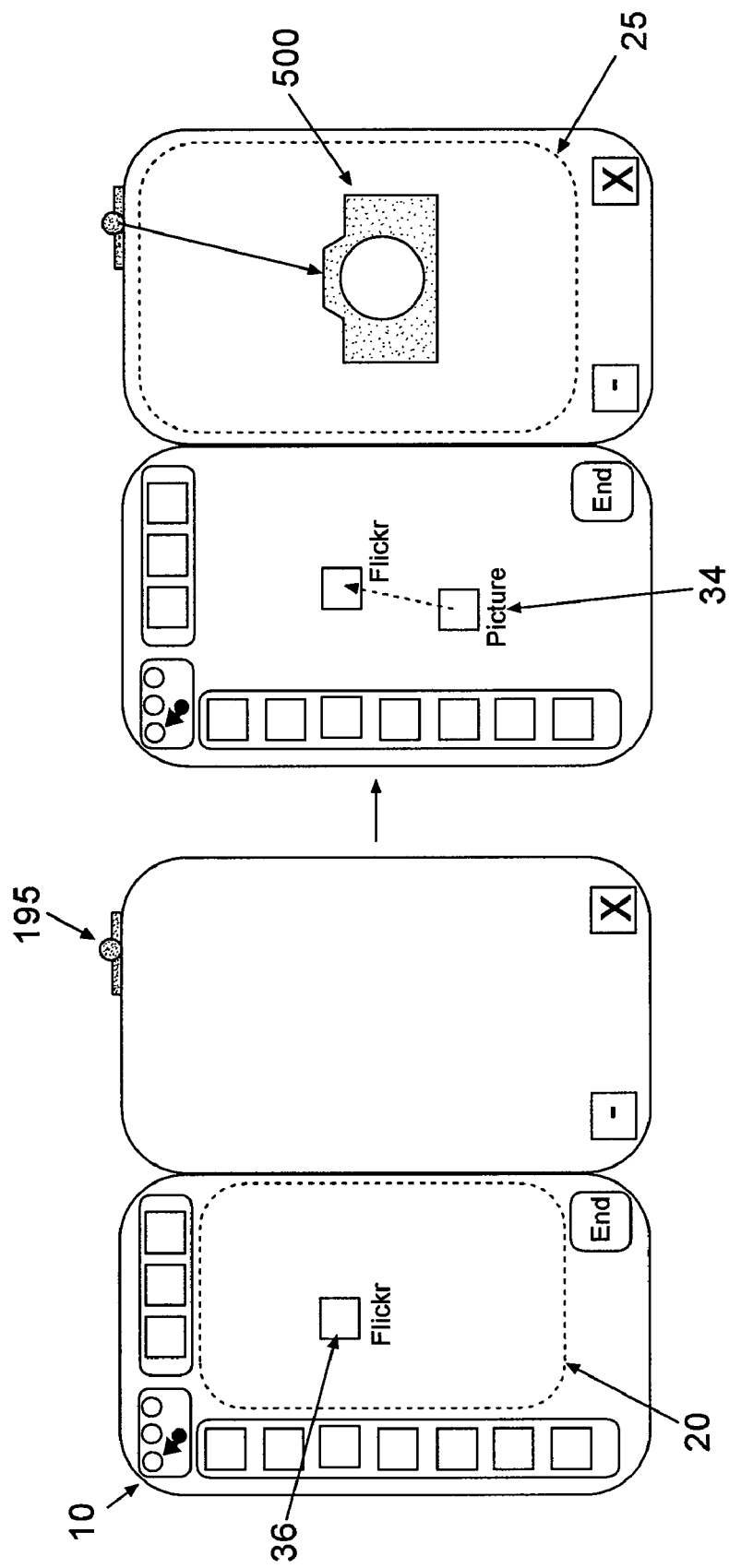
FIG. 44 is an example of an operation of taking a picture and uploading it to a social networking site.

A picture taken by the mobile terminal may also be sent to a social networking site. FIG. 44 shows an operation of taking a picture and uploading it to a social networking site. Similar to the operation of section 3-39 above, the user may take a picture with a camera 195 of the mobile terminal. The circuitry of mobile terminal causes the touch panel display to display the picture 500 in the execution area 25 and a thumbnail icon 34 of the picture on the first region 20. The user had previously extracted a social networking site and placed the extracted social networking site icon 36 on the first region 20. The user drags the thumbnail icon 34 of the picture 500 onto the previously extracted social networking site icon 36. When the circuitry of the mobile terminal detects that the extracted social networking site icon 36 is displayed in the first region and the thumbnail icon 34 overlaps the extracted social networking site icon 36, the circuitry of the mobile terminal causes the touch panel display to display a messaging template on the execution area 25, in which the user can add information and send the picture 500 to the address of the extracted social networking site icon 36.

3-41. RECORD A VIDEO AND SEND TO AN EXTRACTED CONTACT

Figure 45:
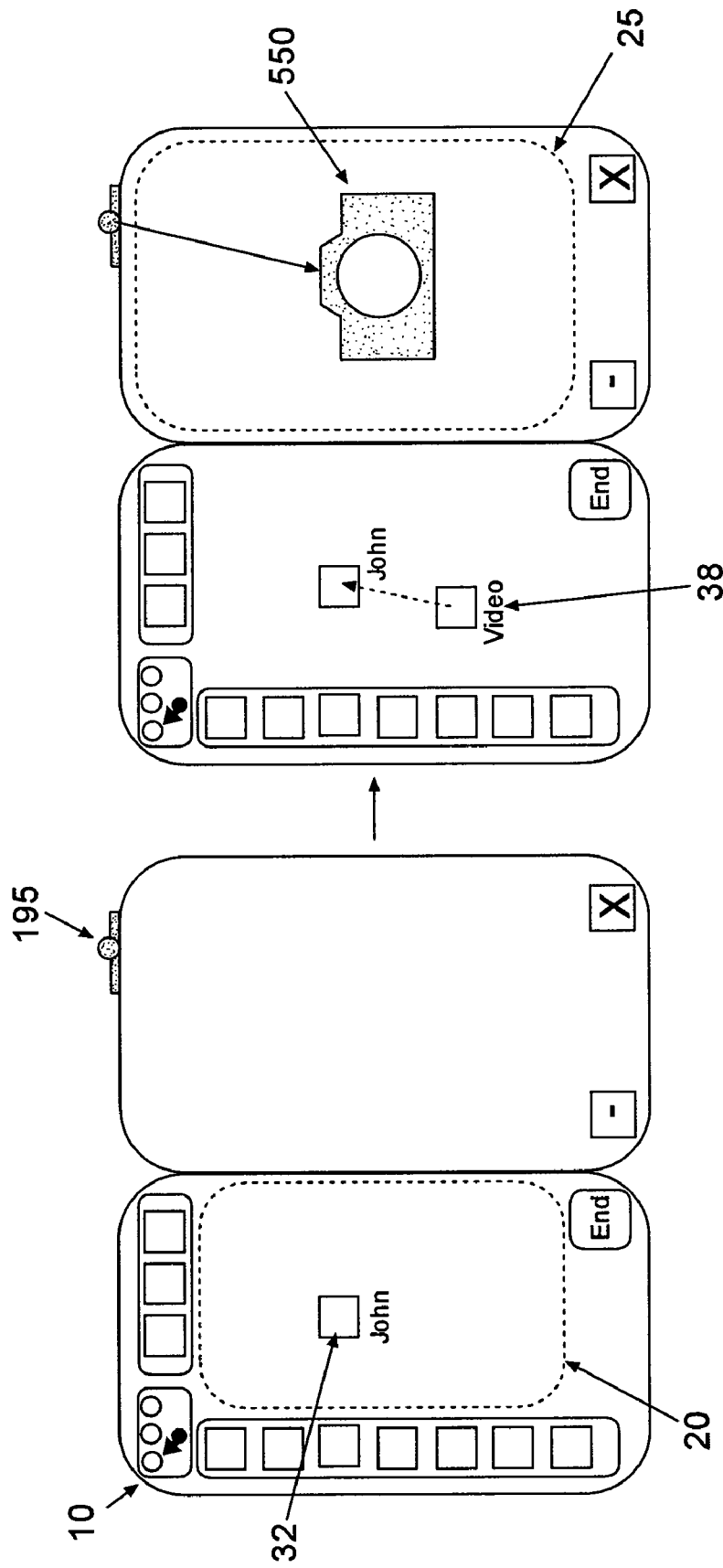
FIG. 45 is an example of an operation of taking a video and sending it to an extracted contact using the extracted contact icon.

A video taken by the mobile terminal may also be sent to an extracted contact. FIG. 45 shows an operation of taking a video and sending it to an extracted contact using the extracted contact icon. The user may take a video with a camera 195 of the mobile terminal. The circuitry of mobile terminal causes the touch panel display to display a screen shot of a video 550 in the execution area 25 and a thumbnail icon 38 of the video on the first region 20. The user had previously extracted a contact and placed the extracted contact icon 32 on the first region 20. The user drags the thumbnail icon 38 of the video 550 onto the previously extracted contact icon 32. When the circuitry of the mobile terminal detects that the extracted contact icon 32 is displayed in the first region and the thumbnail icon 38 overlaps the extracted contact icon 32, the circuitry of the mobile terminal causes the touch panel display to display a messaging template on the execution area, in which the user can add information and send the video 500 to the address of the extracted contact icon 32. The video can also be streamed in real time to the extracted contact.

3-42. BROWSE THE INTERNET

Figure 46:
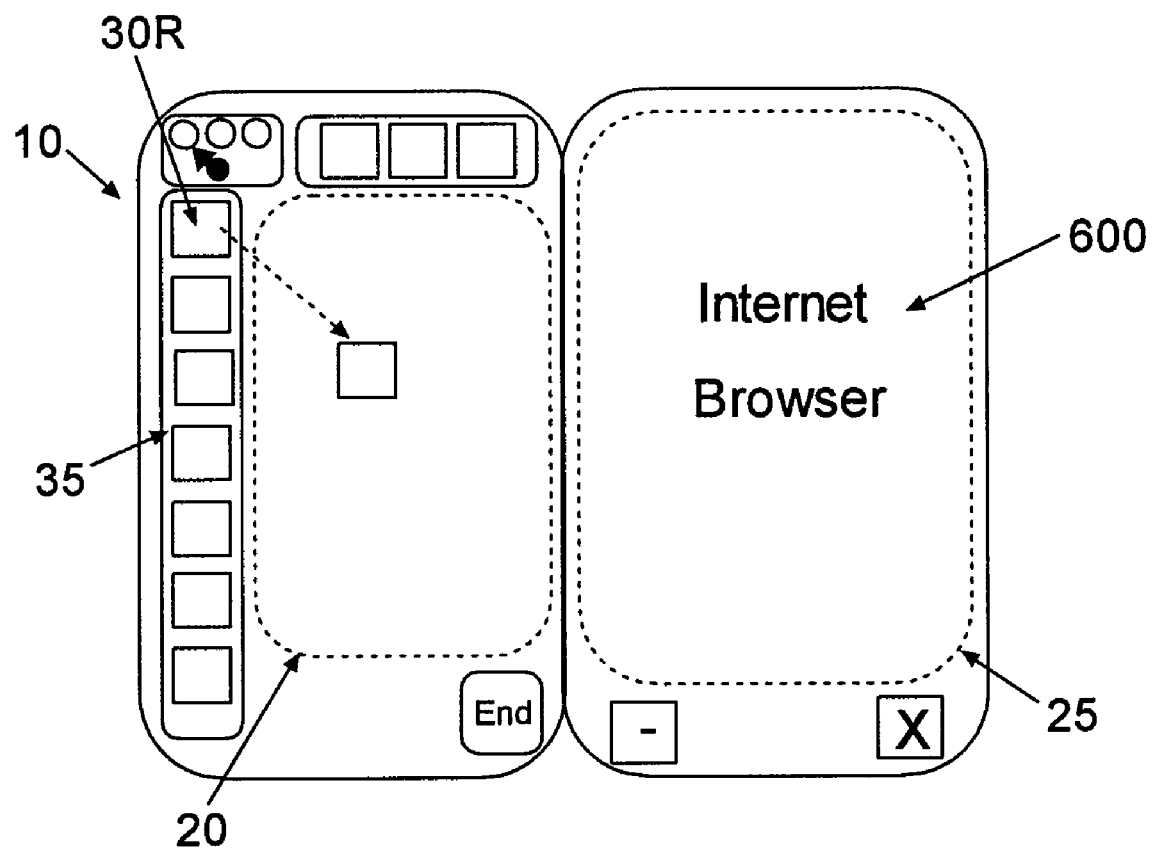
FIG. 46 is an example of an operation of launching an Internet browser using a browser icon.

FIG. 46 shows an operation of launching an Internet browser using a browser and associated functional icon. When a user wishes to browse the Internet, the user touches the display panel and drags a browser icon 30R from the icon palette 35 into the first region 20. Then, the user taps the browser icon 30R to launch the Internet browser 600. The user may not need to tap the icon 30R to launch the browser; instead, the user may simply release the dragged icon 30R in the first region 20. When the circuitry of the mobile terminal detects the tapping (or releasing) of the icon 30R, the circuitry of the mobile terminal causes the touch panel display to display the Internet browser 600 on the execution area. By tapping the "-" button, the webpage may be iconified as an extracted webpage onto the first region 20.

3-43. EXTRACT A CONTACT FROM THE CONTACT LIST

Figure 47:
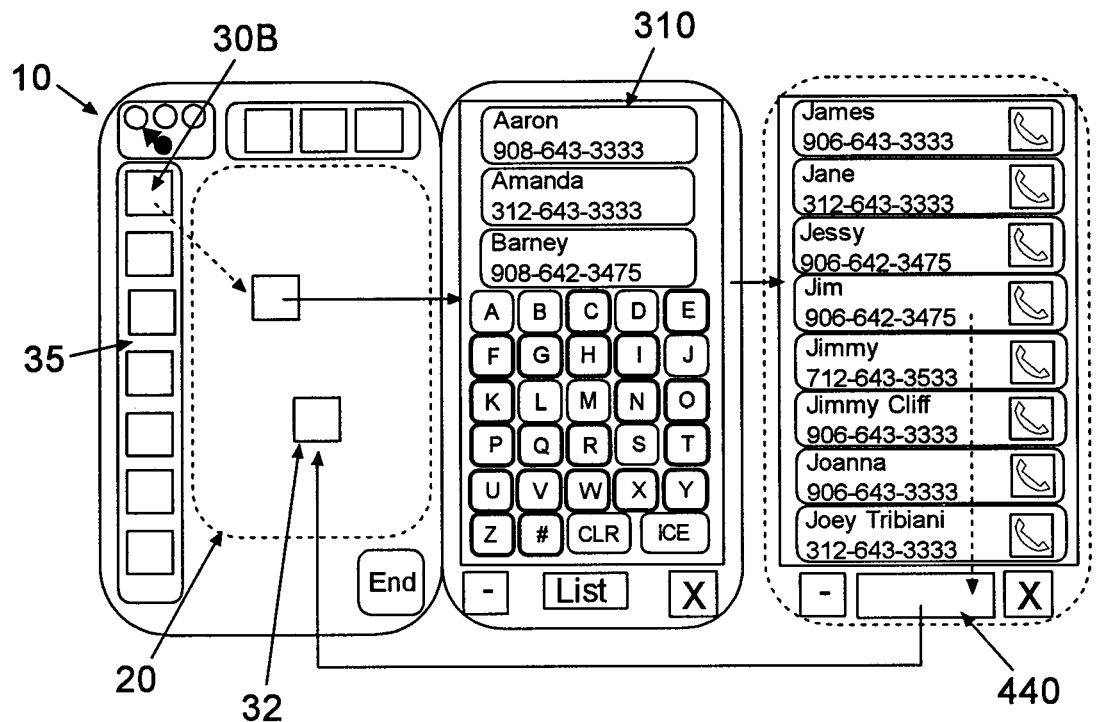
FIG. 47 is an example of an operation of extracting a contact from the contact list.

FIG. 47 shows an operation of extracting a contact from the contact list and associated functional icon. The user may place the extracted contact icon 32 by, for example, placing a call to a person. The user may also place the extracted contact icon 32 by using contact list icon 30B. The user touches the display panel and drags the contact list icon 30B from the icon palette 35 into the first region 20 and taps the icon 30B to open the contact list interface screen 310. The user may not need to tap the icon 30B to display the contact list interface screen 310; instead, the user may simply release the dragged icon 30B in the first region 20. When the circuitry of the mobile terminal detects the tapping (or releasing) of the icon 30B, the circuitry of the mobile terminal causes the touch panel display to display the contact list interface screen 310 on the execution area. The user then searches for a contact from the list 310 and drags the specific contact onto an area 440. When the circuitry of the mobile terminal detects the dragging and releasing of the contact in the area 440, the circuitry of the mobile terminal causes the touch panel display to display the extracted contact icon 32 associated with the specific contact. It is noted that the user may not necessarily have to drag the contact into the area 440 on the execution area 25 to create the extracted icon 32. The user may drag the contact directly into the first region 25 to create the extracted contact icon 32.

3-44. EXTRACT A CONTACT FROM THE RECENT CALL LIST

Figure 48:
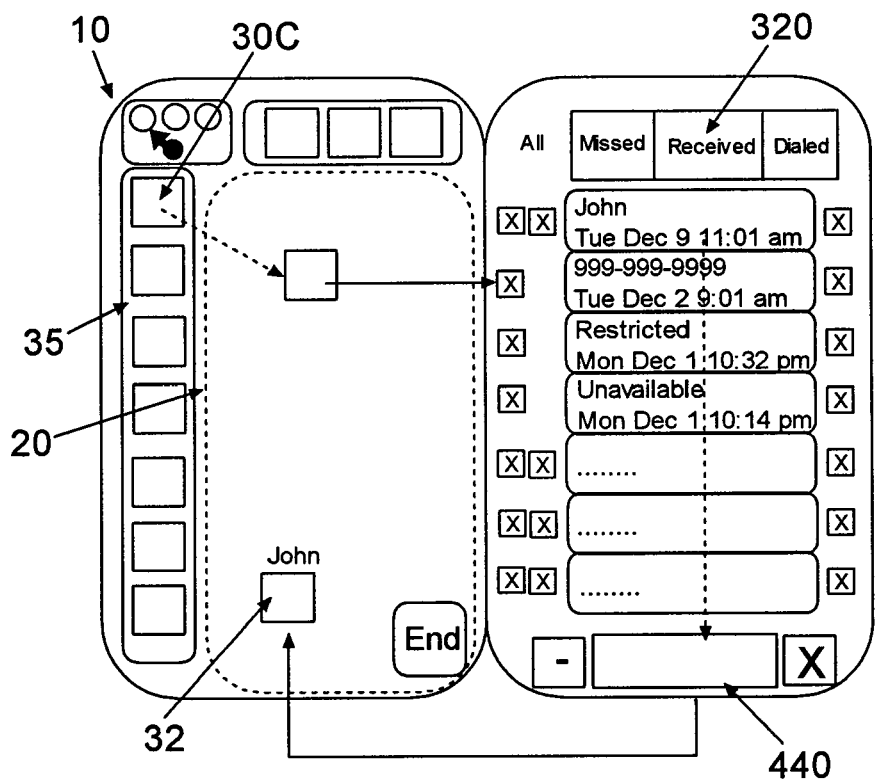
FIG. 48 is an example of an operation of extracting a contact from the recent call list.

FIG. 48 shows an operation of extracting a contact from the recent call list and associated functional icon. The user may place the extracted contact icon 32 by using recent call list icon 30C. The user touches the display panel and drags the recent call list icon 30C from the icon palette 35 into the first region 20 and taps the icon 30C to open the recent call list interface screen 320. The user may not need to tap the icon 30C to display the recent call list interface screen 320; instead, the user may simply release the dragged icon 30C in the first region 20. When the circuitry of the mobile terminal detects the tapping (or releasing) of the icon 30C, the circuitry of the mobile terminal causes the touch panel display to display the recent call list interface screen 320 on the execution area. The user then searches for a contact from the list 320 and drags the specific contact onto the area 440. When the circuitry of the mobile terminal detects the dragging and releasing of the contact in the area 440, the circuitry of the mobile terminal causes the touch panel display to display the extracted contact icon 32 associated with the specific contact. It is noted that the user may not necessarily have to drag the contact into the area 440 on the execution area 25 to create the extracted icon 32. The user may drag the contact directly into the first region 25 to create the extracted contact icon 32.

3-45. EXTRACT A CONTACT FROM THE TEXT MESSAGE INBOX AND ADD TO CONTACT LIST

Figure 49:
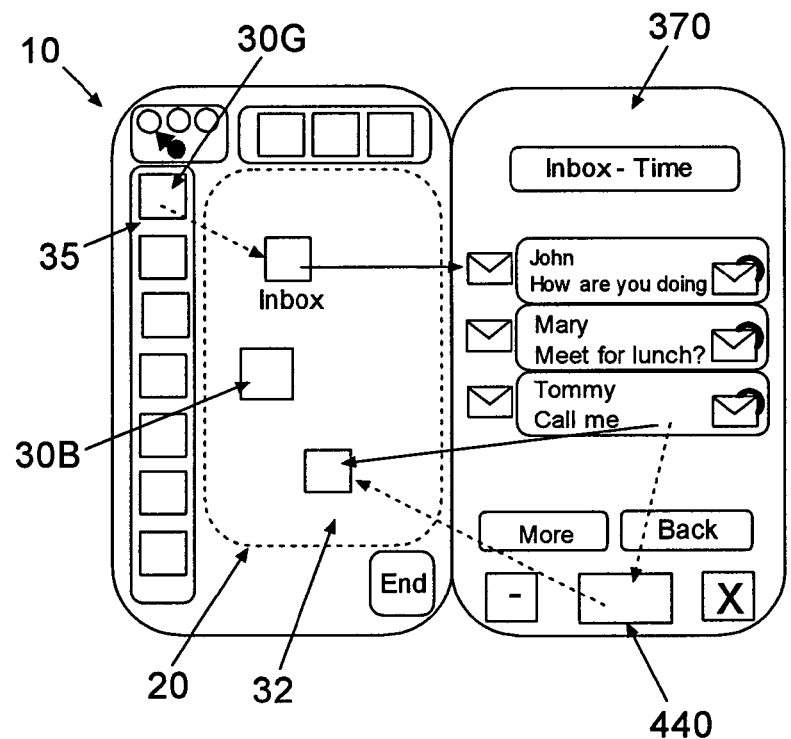
FIG. 49 is an example of an operation of extracting a contact from the text message inbox and adding it to the contact list.

FIG. 49 shows an operation of extracting a contact from the text message inbox and adding it to the contact list. The user previously placed the contact list icon 30B on the first region 20. The user touches the display panel and drags the message inbox icon 30G from the icon palette 35 into the first region 20 and taps the icon 30G to open the message inbox interface screen 370. Similar to FIGS. 47 and 48, the mobile terminal can place the iconified contact as the extracted contact icon 32 in the first region. The user then drags the extracted contact icon 32 onto the contact list icon 30B previously placed on the first region to add the contact information of the icon 32 to the contact list. When the circuitry of the mobile terminal detects that the extracted contact icon 32 overlaps with the contact list icon 30B, the mobile terminal adds the contact information associated with the extracted contact 32 to the contact list.

3-46. EXTRACT A SONG FROM THE PLAY LIST

Figure 50:
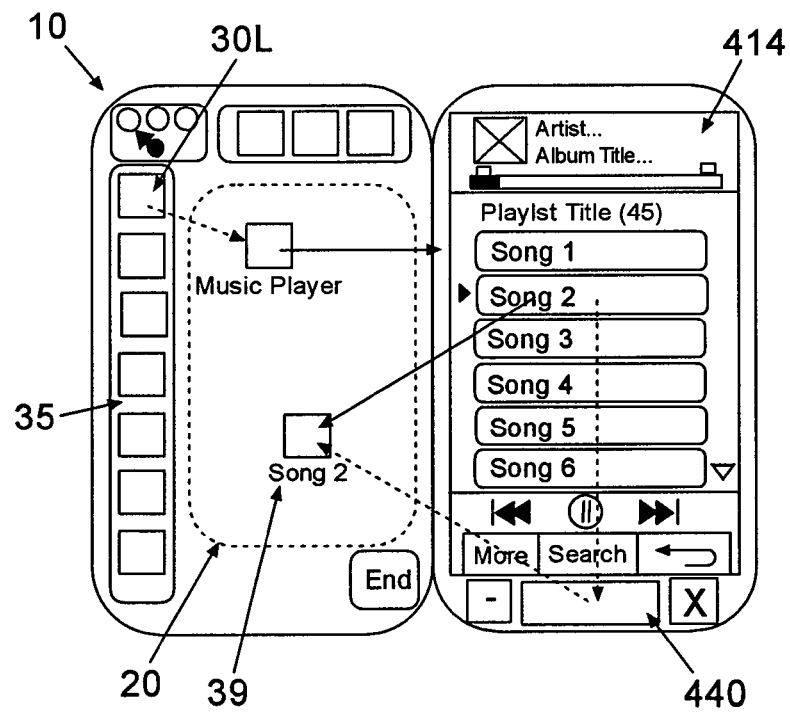
FIG. 50 is an example of an operation of extracting a song from the song list.

FIG. 50 shows an operation of extracting a song from the song list and associated functional. The user may place the extracted song icon 39 by using song list 414. The user touches the display panel and drags the music player icon 30L from the icon palette 35 into the first region 20. The user taps the music player icon 30L to open the list of music stored in the mobile terminal. The user may not need to tap the icon 30L to open the music list; instead, the user may simply release the dragged icon 30L in the first region 20. When the circuitry of the mobile terminal detects the tapping or releasing of the icon 30L, the circuitry of the mobile terminal causes the touch panel display to display the list of songs interface screen 414. The user then searches for a song and drags the specific song onto an area 440 that results in the song being displayed on the first region 20 as the extracted song icon 39. When the circuitry of the mobile terminal detects the dragging and releasing of the song in the area 440, the mobile terminal causes the touch panel display to display the extracted song icon 39 associated with the specific song. Similarly, a video, picture or game may be placed on the first region 20 as an extracted icon. It is noted that the user may not necessarily have to drag the song into the area 440 on the execution area 25 to create the extracted icon 32. The user may drag the song directly into the first region 25 to create the extracted song icon 32.

3-47. END ANY PROCESS OR REMOVE AN ICON

Figure 51:
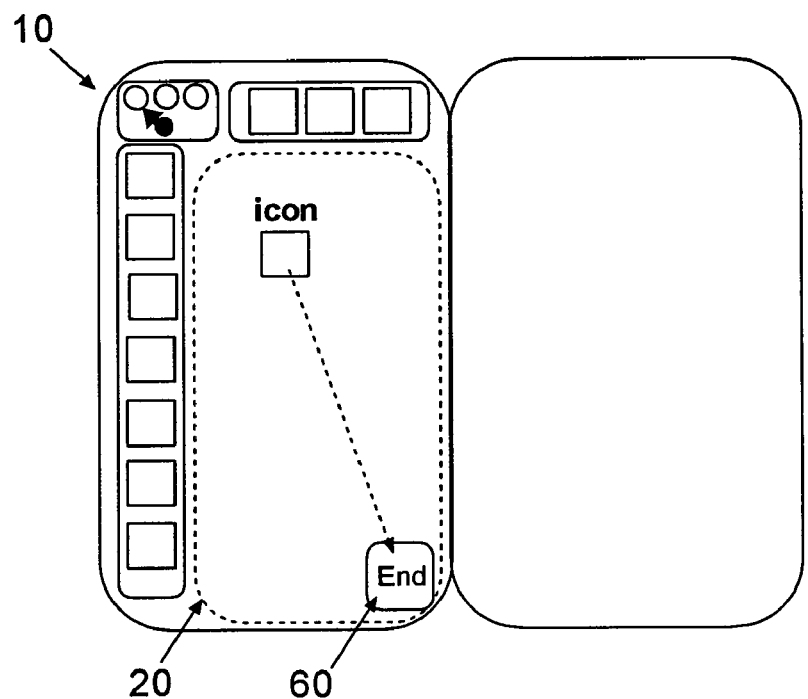
FIG. 51 is an example of an operation of ending any process or removing an icon.

FIG. 51 shows an operation of ending any process or removing an icon from the first region. To end any process or remove an icon from the first region 20, the user drags the icon onto the termination icon "End" 60. When the circuitry of the mobile terminal detects that the icon overlaps the termination icon 60, the mobile terminal terminates the process associated with the icon and being executed, and erases the icon from the display 200.

3-48. CUSTOMIZE SMART OBJECT PALETTE AND STAGE

Figure 52:
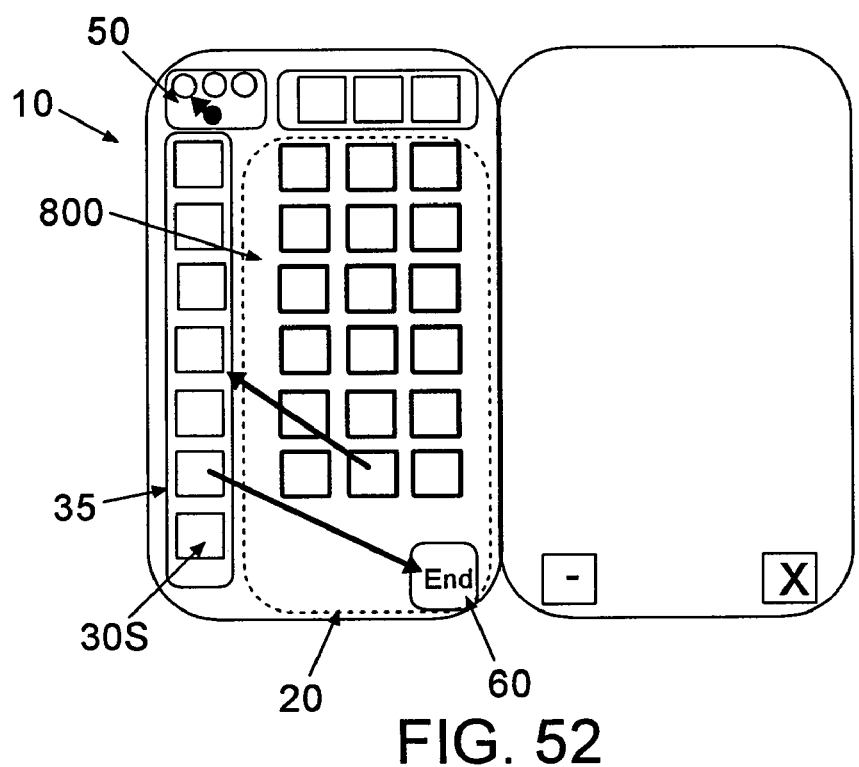
FIG. 52 is an example of an operation of customizing the palette of functional icons.

The user may customize the mobile terminal by adding/removing the functional icons from the functional icon palette. The toggle switch icon 50 allows users to switch between different views of the palette. For example, a user may want to have three different palettes including: 1) Communication—for voice, texting and contacts; 2) Multimedia—for music, pictures and videos; and 3) Widgets—for real-time information such as weather, news and stocks. The mobile terminal of the present embodiment would have predefined palettes, but the users may customize the palette according to their needs FIG. 52 shows the operation of customizing the palette 35. First, when the circuitry of the mobile terminal detects that the user taps the customizer icon 30S on the icon palette 35. The user may drag the icon 32S into the first region in a similar manner as disclosed above to activate the customize function. Then, the circuitry of the mobile terminal causes the touch panel display to display a list of functional icons 800 on the first region 20. The user may drag icons from the first region onto the palette 35 to add the icons to the palette. When the circuitry of the mobile terminal detects the icon being dragged onto the palette 35, the circuitry of the mobile terminal causes the touch panel display to display the icon within the icon palette 35. The user may drag an icon off the palette onto the termination icon "End" 60 to remove the icons from the palette 35. When the circuitry of the mobile terminal detects the icon being dragged from the palette 35, the circuitry of the mobile terminal causes the touch panel display to erase the icon from the icon palette 35. Another example of the palette may be a dedicated palette to a specific contact person. When the dedicated palette is chosen, the information about the contact is always displayed along with his/her favorite song icon(s), his/her picture being displayed as the wallpaper, a weather/time widgets based on his/her location contained in the information, or a list of text message icon, a list of email message icon relating to the contact. Upon adding a specific contact icon (e.g., from the extracted contact icon) into the palette, the circuitry of the mobile terminal may search other information associated with the contact and add icons associated with the information. Further, if a weather icon is added to the palette, the mobile terminal may set the location obtained by the GPS as the default location for the weather. Of course, the mobile terminal may prompt the user to input the default location manually. In yet another example, if the navigator icon is added to the palette, the home address of the user, which may have been already stored in the mobile terminal as the user's information, may be automatically set into navigator as a starting location. If the navigator icon is added to the dedicated palette of the specific contact, the mobile terminal may set the address of the contact into the navigator as a starting location or a destination location. If there are two or more addresses are found with respect to the contact or the user, the mobile terminal may prompt the user to choose one of them or to input another address for the navigator.

3-49. DOWNLOAD NEW APPLICATION AND CREATE A NEW FUNCTIONAL ICON

The mobile terminal of the present application may download a new application program from outside of the mobile terminal, for example, through a wireless network. For example, the user may access the predetermined website through the browser function of the mobile terminal and select the specific new application program. The mobile terminal then downloads the application program and stores it in the memory. Upon finishing the download, the mobile terminal prompts the user whether he/she wishes to create a new functional icon associated with the new application program. If the mobile terminal detects the affirmative answer by the user, the circuitry of the mobile terminal causes the display panel to display a new functional icon or icons associated with the new application program either on the first region or into the current palette. Further, depending on the application program, the mobile terminal may automatically arrange or modify the icons included in the current palette.

(4) Other Features

In the above described examples, the smart object based graphical user interface is provided for the mobile terminal, such as a mobile phone. However, this user interface may be portable across different platforms, for example, from the display of a mobile terminal to a PC screen or a TV screen. The mobile terminal may be configured to have an input/output terminal 165, for example, a USB port. When the input/output terminal is connected to a USB port of the PC and an appropriate application program is installed in the PC, the smart object based user interface of the mobile terminal may be displayed on the PC screen. On the PC screen, the user may modify the arrangement of the functional icons in the palette 35, edit the contact list or use other functions of the mobile terminal. In another example, the user may create his/her desirable palette, contact information, list of contact, etc. on the PC off-line. Then, these information or data can be transmitted to the mobile terminal via the USB connection, the wireless network or a detachable storage device. This feature may provide the user more easy operation of the mobile terminal.

Further, the smart object based graphical user interface and the mobile terminal employing the same may provide personal modification or customization of the functional icons which meets the specific user's needs. For example, one user may prefer that, when the list of contact icon 30B is dragged and tapped, the list of telephone numbers is always displayed first on the execution area 25. However, another user may prefer that a list of social networking site addresses or a list of e-mail addresses is always displayed first. The mobile terminal allows the user to modify each of the functional icons according to his/her needs. To modify the detailed functions (or sub-functions) of the functional icon, the user may drag the icon into the first region and press, for example, for over 500 milliseconds. When the circuitry of the mobile terminal detects the pressing, the circuitry of the mobile terminal causes the touch panel display to display an edit screen for the functional icon. Through this edit screen, the user may modify the details of the functional icon according to his/her needs. Of course, physical properties of the mobile terminal, for example, touch sensitivity of the touch panel display, size of the characters or icons, or brightness of the display, may be modified or set through the functional icons.

The mobile terminal may have several level of the customization. For example, simply arranging the palette by adding or removing the functional icons may be available for all users. However, customizing the details of the functional icon may be password-protected and be available only for the users who are provided with such password.

As set forth above, the graphical user interface functions of the mobile terminal having a touch panel display may be achieved by any combination of the software and hardware in the mobile terminal. When the above functions of the mobile terminal are implemented in software for programming the processor of the mobile terminal, the software may be stored in an article of manufacture, such as a CD-ROM, DVD-ROM, Flash memory, hard disc or other types of storage media. The software, i.e., programming instructions embodied in the storage media are executed by a programmable controller, for example a processor 150 of the exemplary mobile terminal 10 having a touch panel display 200, wherein execution of the software by the processor 150 causes the mobile terminal 10 to execute the variety of tasks, i.e., operations as set forth above.

The smart object type graphical user interface disclosed herein provides numerous advantages over prior art mobile terminals having touch panel interfaces. Most importantly, the described interface of the mobile terminal provides the functional icons so that users can operate the mobile terminal easier and in a more intuitive manner. Another advantage associated with the disclosed interface for the mobile terminal is that it may provide a more readily customized mobile terminal having a touch panel display. Regardless of the initial setups of the mobile terminal, the present mobile terminal enables the user to customize the palette of the functional icons.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

What is claimed is:

1. A mobile terminal configured to execute a plurality of functions, comprising:
   a touch panel display; and
   circuitry configured to control the touch panel display and to respond to touching of the touch panel display, wherein:
   the circuitry configures the touch panel display to display:
      a plurality of functional icons, each of which is associated with one or more of the plurality of functions that are actions the mobile terminal is configured to perform, at least one of the plurality of functions including a phone function, the plurality of functional icons being displayed in a functional icon palette;
      a plurality of incoming event icons, each of which is associated with an incoming event triggered by an incident other than user input and with one of the plurality of functions, the plurality of incoming event icons being displayed in an incoming event icon palette separate from the functional icon palette; and
      a destination icon, and
   the mobile terminal is configured such that:
   upon the circuitry detecting when one of the functional icons is dragged from the functional icon palette into a first region which is a designated area of the touch panel display and, without overlapping with any icon, is tapped or released by a user on the touch panel display, the mobile terminal executes a first function with which the one of the functional icons is associated, and
   upon the circuitry detecting when the one of the functional icons is dragged from the functional icon palette and overlapped with the destination icon within the first region on the touch panel display, the mobile terminal executes a second function with which the one of the functional icons is associated.

2. The mobile terminal of claim 1, wherein:
   the plurality of functional icons are grouped into a plurality of functional icon groups,
   the circuitry further configures the touch panel display to display a switching icon, and
   the switching icon is associated with a function of changing the functional icon groups to be displayed on the touch panel display.

3. The mobile terminal of claim 1, wherein:
   the destination icon is associated with contact information.

4. The mobile terminal of claim 3, wherein:
   the contact information with which the destination icon is associated includes a telephone number, an e-mail address, an instant message screen name, a web site address or a social networking site address.

5. The mobile terminal of claim 4, wherein:
   the phone function is a dialing function and the contact information with which the destination icon is associated includes a telephone number, and
   when the circuitry detects that the one of the functional icons is dragged and overlapped with the destination icon within the first region on the touch panel display, the mobile terminal makes a phone call to the telephone number.

6. The mobile terminal of claim 4, wherein:
   one of the functional icons is associated with one of a text message creation function, an e-mail message creation function and an instant message creation function, and the contact information with which the destination icon is associated includes a list of contact information, and
   when the circuitry detects that the one of the functional icons is dragged and overlapped with the destination icon within the first region on the touch panel display, the mobile terminal displays the list of contact information.

7. The mobile terminal of claim 4, wherein:
   one of the functional icons is associated with one of a text message creation function, an e-mail message creation function and an instant message creation function, and the contact information with which the destination icon is associated includes a telephone number capable of receiving a text message, e-mail address or an address for instant message, and
   when the circuitry detects that the one of the functional icons is dragged and overlapped with the destination icon within the first region on the touch panel display, the mobile terminal displays a text editor for composing a text message, an e-mail message or an instant message.

8. The mobile terminal of claim 1, wherein:
the mobile terminal is further configured to notify the user reception of the incoming event upon receiving the incoming event by the mobile terminal,
when the circuitry detects one of the incoming event icons, which is associated with the incoming event received by the mobile terminal, being dragged from the incoming event icon palette into the first region and released by the user, the mobile terminal executes a third function with which the one of the incoming event icons is associated, and
the incoming events include at least one of receiving an incoming call, receiving a text message, receiving an e-mail and receiving an instant message.

9. The mobile terminal of claim 1, wherein:
a user interface relating to the first function or the second function with which the one of the functional icons is associated is displayed on a second region which is a designated area of the touch panel display.

10. The mobile terminal of claim 9, wherein:
the touch panel display comprises a first touch panel display and a second touch panel display, and
the first touch panel display includes the first region and the second touch panel display includes the second region.

11. The mobile terminal of claim 1, wherein the circuitry further configures the touch panel display to display a termination region associated with a function of terminating a function being executed by the mobile terminal.

12. The mobile terminal of claim 1, wherein the mobile terminal is a cellular phone.

13. The mobile terminal of claim 1, wherein the circuitry is further configured to output a control signal for the touch panel display to an external display configured to be connected to the mobile terminal so that the user operate the mobile terminal on the external display.

14. The mobile terminal of claim 1, wherein:
at least one of the plurality of functional icons is associated with one or more sub-functions executed by the mobile terminal,
the sub-functions are configured to be provided with an order of priority to be executed by the mobile terminal, the priority being set by the user, and
upon executing the first or function or the second function associated with the at least one of the plurality of functional icons, the sub-functions are provided according to the order of priority.

15. The mobile terminal of claim 1, wherein the circuitry is further configured to:
receive an application program executable on the mobile terminal as one of the plurality of functions, and
when the application program is installed in the mobile terminal, display a new functional icon associated with the application program on the touch panel display.

16. The mobile terminal of claim 1, wherein:
the plurality of functional icons are inactive unless dragged into the first region.

17. The mobile terminal of claim 1, wherein no functional icon is initially displayed in the first region prior to the dragging of any functional icon into the first region.

18. The mobile terminal of claim 1, wherein the mobile terminal executes the first function, when the circuitry detects the one of the functional icons being dragged into the first region and, without overlapping with any icon, tapped by the user on the touch panel display.

19. The mobile terminal of claim 1, wherein the circuitry configures the touch panel display to display the one of the plurality of functional icons in the first region even after start of the execution of the associated function.

20. The mobile terminal of claim 19, wherein:
the circuitry further configures the touch panel display to display a termination region, and
when the circuitry detects the one functional icon being displayed in the first region being dragged onto the termination region, the mobile terminal terminates the execution of the associated function and removes the one functional icon from the first region.

21. The mobile terminal of claim 1, wherein:
the circuitry further configures the touch panel display to display a termination region associated with a function of terminating a function being executed by the mobile terminal, and
when the circuitry detects one of the functional icons of which function is being executed being dragged onto the termination region, the mobile terminal terminates the function associated with the one of the functional icons and being executed.

22. The mobile terminal of claim 1, wherein the mobile terminal executes the second function in response to the circuitry detecting that the one of the functional icons is overlapped with the destination icon within the first region and tapped by the user on the touch panel display.

23. The mobile terminal of claim 1, wherein the destination icon specifies the manner in which the first function is to be executed.

24. A mobile terminal configured to execute a plurality of functions, comprising:
a touch panel display; and
circuitry configured to control the touch panel display and to respond to touching of the touch panel display, wherein:
the circuitry configures the touch panel display to display:
a plurality of functional icons, each of which is associated with one or more of the plurality of functions that are actions the mobile terminal is configured to perform, at least one of the plurality of functions including a phone function, the plurality of functional icons being displayed in a functional icon palette;
a plurality of incoming event icons, each of which is associated with an incoming event triggered by an incident other than user input and with one of the plurality of functions, the plurality of incoming event icons being displayed in an incoming event icon palette separate from the functional icon palette;
a destination icon associated with one of contact information including an e-mail address, a web site address, a social networking site address and any contact information capable of receiving electronic data; and
a content icon associated with one of text data, image data, sound data and program data stored in the mobile terminal,
when the circuitry detects that the destination icon overlaps with the content icon on the touch panel display, the mobile terminal sends the one of text data, image data, sound data and program data with which the content icon is associated to the one of an e-mail address, a web site address, a social networking site address and any contact information capable of receiving electronic data with which the destination icon is associated, and
the destination icon and the content icon are displayed in a first region which is a designated area of the touch panel display, and the destination icon is displayed in the first region by user initiation.

25. A method for operating a mobile terminal comprising a touch panel display, comprising steps of:
 displaying, on the touch panel display:
  a plurality of functional icons, each of which is associated with one or more of the plurality of functions that are actions the mobile terminal is configured to perform, at least one of the plurality of functions including a phone function, the plurality of functional icons being displayed in a functional icon palette;
  a destination icon; and
  a plurality of incoming event icons, each of which is associated with an incoming event triggered by an incident other than user input and with one of the plurality of functions, the plurality of incoming event icons being displayed in an incoming event icon palette separate from the functional icon palette;
 upon detecting touching of the touch panel display in such a manner that one of the functional icons is dragged from the functional icon palette into a first region which is a designated area of the touch panel display and, without overlapping with any icon, is tapped or released by a user on the touch panel display, executing a first function with which the one of the functional icons is associated; and
 upon detecting touching of the touch panel display in such a manner that the one of the functional icons is dragged from the functional icon palette and overlapped with the destination icon within the first region on the touch panel display, executing a second function with which the one of the functional icons is associated.

26. The method of claim 25, wherein:
 the plurality of functional icons are grouped into a plurality of functional icon groups,
 the method further comprises a step of displaying a switching icon, the switching icon being associated with a function of changing the functional icon groups to be displayed on the touch panel display.

27. The method of claim 25, further comprising the step of outputting a control signal for the touch panel display to an external display configured to be connected to the mobile terminal so that the user operates the mobile terminal on the external display.

28. The method of claim 25, wherein:
 at least one of the plurality of functional icons is associated with one or more sub-functions executed by the mobile terminal,
 the sub-functions are configured to be provided with an order of priority to be executed by the mobile terminal, the priority being set by the user, and
 upon executing the first function or the second function associated with the at least one of the plurality of functional icons, the sub-functions are provided according to the order of priority.

29. The method of claim 25, further comprising:
 receiving an application program executable on the mobile terminal as one of the plurality of functions, and
 when the application program is installed in the mobile terminal, displaying a new functional icon associated with the application program on the touch panel display.

30. The method of claim 25, the method further comprising steps of:
 notifying the user reception of one of the incoming events upon receiving the one of the incoming event;
 detecting the touching of the touch panel display in such a manner that the one of the incoming event icons, which is associated with the one of the incoming events received by the mobile terminal, is dragged from the incoming icon palette into the first area by the user on the touch panel display; and
 responsive to the touching, executing the function with which the one of the incoming event icons is associated,
 wherein the events include at least one of receiving an incoming call, receiving a text message, receiving an e-mail and receiving an instant message.

31. The method of claim 25, wherein:
 the plurality of functional icons are inactive unless dragged into the first region.

32. A method for operating a mobile terminal comprising a touch panel display, comprising steps of:
 displaying a plurality of functional icons, each of which is associated with one of the plurality of functions, on the touch panel display, at least one of the plurality of functions including a phone function, the plurality of functional icons being displayed in a functional icon palette;
 displaying a destination icon associated with contact information;
 displaying a plurality of incoming event icons, each of which is associated with an incoming event triggered by an incident other than user input and with one of the plurality of functions, the plurality of incoming event icons being displayed in an incoming event icon palette separate from the functional icon palette;
 detecting touching of the touch panel display in such a manner that one of the functional icons is dragged from the functional icon palette and overlapped with the destination icon on the touch panel display; and
 responsive to the detecting, executing the function with which the one of the functional icons is associated with respect to the contact information, wherein:
 at least one of the plurality of functional icons is associated with one or more sub-functions executed by the mobile terminal,
 the sub-functions are configured to be provided with an order of priority to be executed by the mobile terminal, the priority being set by user's preference, and
 upon executing the function associated with the at least one of the plurality of functional icons, the sub-functions are provided according to the order of priority.

33. The method of claim 32, wherein:
 the contact information with which the destination icon is associated includes a telephone number, an e-mail address, an instant message screen name, a web site address or a social networking site address.

34. The method of claim 33, wherein:
 the phone function is a dialing function and the contact information with which the destination icon is associated includes a telephone number, and
 the step of executing the function comprises making a phone call to the telephone number.

35. The method of claim 33, wherein:
 one of the functional icons is associated with one of a text message creation function, an e-mail message creation function and an instant message creation function and the contact information with which the destination icon is associated includes a list of contact information, and
 the step of executing the function comprises displaying the list of contact information.

36. The method of claim 33, wherein:
 one of the functional icons is associated with one of a text message creation function, an e-mail message creation function and an instant message creation function, and the contact information with which the destination icon is associated includes a telephone number capable of receiving text message, an e-mail address or an address for instant message, and the step of executing the function comprises displaying a text editor for composing a text message, an e-mail message or an instant message.

37. A method for operating a mobile terminal comprising a touch panel display, comprising steps of:

displaying a plurality of functional icons, each of which is associated with one or more of the plurality of functions that are actions the mobile terminal is configured to perform, at least one of the plurality of functions including a phone function, the plurality of functional icons being displayed in a functional icon palette;

displaying a plurality of incoming event icons, each of which is associated with an incoming event triggered by an incident other than user input and with one of the plurality of functions, the plurality of incoming event icons being displayed in an incoming event icon palette separate from the functional icon palette;

displaying a destination icon associated with contact information including an e-mail address, a web site address, a social networking site address and any destination information capable of receiving electronic data on the touch panel display;

displaying a content icon associated with one of text data, image data, sound data and program data stored in the mobile terminal on the touch panel display; and detecting touching of the touch panel display in such a manner as to move one of the icons so that the destination icon overlaps with the content icon; and responsive to the detecting, sending the one of text data, image data, sound data and program data with which the content icon is associated to the one of an e-mail address, a web site address, a social networking site address and any destination information capable of receiving electronic data with which the destination icon is associated, wherein the destination icon and the content icon are displayed in a first region which is a designated area of the touch panel display, and the destination icon is displayed in the first region by user initiation.

38. The method of claim 37, the method further comprising:

a user interface relating to the function with which the one of the functional icons is associated is displayed on a second region which is a designated area of the touch panel display.

39. The method of claim 37, the method further comprising displaying a termination region associated with a function of terminating a function being executed by the mobile terminal.

40. An article of manufacture, comprising:

a non-transitory and tangible machine readable storage medium; and programming instructions embodied in the medium for execution by a programmable controller of a mobile terminal having a touch panel display, wherein execution of the programming instructions by the programmable controller causes the mobile terminal to execute tasks comprising:

displaying on the touch panel display:

a plurality of functional icons, each of the functional icons being associated with one of the plurality of functions that are actions the mobile terminal is configured to perform, at least one of the plurality of functions including a phone function, the plurality of functional icons being displayed in a functional icon palette;

a destination icon; and a plurality of incoming event icons, each of which is associated with an incoming event triggered by an incident other than user input and with one of the plurality of functions, the plurality of incoming event icons being displayed in an incoming event icon palette separate from the functional icon palette;

upon detecting touching of the touch panel display in such a manner that one of the functional icons is dragged from the functional icon palette into a first region which is a designated area of the touch panel display and, without overlapping with any icon, is tapped or released by a user, executing a first function with which the one of the functional icons is associated; and upon detecting touching of the touch panel display in such a manner that the one of the functional icons is dragged from the functional icon palette and overlapped with the destination icon within the first region on the touch panel display, executing a second function with which the one of the functional icons is associated.

41. The article of manufacture of claim 40, wherein:

the plurality of functional icons are grouped into a plurality of functional icon groups, and the tasks further comprise:

displaying a switching icon, the switching icon being associated with a function of changing the functional icon groups to be displayed on the touch panel display.

42. The article of manufacture of claim 40, further comprising the step of outputting a control signal for the touch panel display to an external display configured to be connected to the mobile terminal so that the user operate the mobile terminal on the external display.

43. The article of manufacture of claim 40, wherein:

at least one of the plurality of functional icons is associated with one or more sub-functions executed by the mobile terminal, the sub-functions are configured to be provided with an order of priority to be executed by the mobile terminal, the priority being set by the user, and upon executing the first function or the second function associated with the at least one of the plurality of functional icons, the sub-functions are provided according to the order of priority.

44. The article of manufacture of claim 40, further comprising:

receiving an application program executable on the mobile terminal as one of the plurality of functions, and when the application program is installed in the mobile terminal, displaying a new functional icon associated with the application program on the touch panel display.

45. The article of manufacture of claim 40, wherein:

the plurality of functional icons are inactive unless dragged into the first region.

46. An article of manufacture, comprising:

a non-transitory and tangible machine readable storage medium; and programming instructions embodied in the medium for execution by a programmable controller of a mobile terminal having a touch panel display, wherein execution of the programming instructions by the programmable controller causes the mobile terminal to execute tasks comprising:

displaying a plurality of functional icons on the touch panel display, each of the functional icons being associated with one of the plurality of functions, at least one of the plurality of functions including a phone function, the plurality of functional icons being displayed in a functional icon palette;

displaying a plurality of incoming event icons, each of which is associated with an incoming event triggered by an incident other than user input and with one of the plurality of functions, the plurality of incoming event icons being displayed in an incoming event icon palette separate from the functional icon palette;

displaying a destination icon associated with contact information;

detecting touching of the touch panel display in such a manner that the one of the plurality of functional icons is dragged and overlapped with the destination icon; and responsive to the detecting, executing the function with which the one of the functional icons is associated with respect to the contact information, wherein:

at least one of the plurality of functional icons is associated with one or more sub-functions executed by the mobile terminal, the sub-functions are configured to be provided with an order of priority to be executed by the mobile terminal, the priority being set by user's preference, and upon executing the function associated with the at least one of the plurality of functional icons, the sub-functions are provided according to the order of priority.

47. The article of manufacture of claim 46, wherein:

the contact information with which the destination icon is associated includes a telephone number, an e-mail address, an instant message screen name, and a web site address or a social networking site address.

48. The article of manufacture of claim 47, wherein:

the phone function is a dialing function and the contact information with which the destination icon is associated includes a telephone number, and the executing the function comprises making a phone call to the telephone number.

49. The article of manufacture of claim 47, wherein:

one of the functional icons is associated with one of a text message creation function, an e-mail message creation function and an instant message creation function and the contact information with which the destination icon is associated includes a list of contact information, and the executing the function comprises displaying the list of contact information.

50. The article of manufacture of claim 47, wherein:

one of the functional icons is associated with one of a text message creation function, an e-mail message creation function and an instant message creation function and the contact information with which the destination icon is associated includes a telephone number capable of receiving text message, an e-mail address or an address for instant message, and the executing the function comprises displaying a text editor for composing a text message, an e-mail message or an instant message.

51. An article of manufacture, comprising:

a non-transitory and tangible machine readable storage medium; and programming instructions embodied in the medium for execution by a programmable controller of a mobile terminal having a touch panel display, wherein execution of the programming instructions by the programmable controller causes the mobile terminal to execute tasks comprising:

displaying a plurality of functional icons on the touch panel display, each of the functional icons being associated with one of the plurality of functions, at least one of the plurality of functions including a phone function, the plurality of functional icons being displayed in a functional icon palette;

displaying a plurality of incoming event icons, each of which is associated with an incoming event triggered by an incident other than user input and with one of the plurality of functions, the plurality of incoming event icons being displayed in an incoming event icon palette separate from the functional icon palette;

displaying a destination icon associated with contact information including an e-mail address, a web site address, a social networking site address and any destination information capable of receiving electronic data on the touch panel display;

displaying a content icon associated with one of text data, image data, sound data and program data stored in the mobile terminal on the touch panel display; and detecting touching of the touch panel display in such a manner that the destination icon overlaps with the content icon; and responsive to the detecting, sending the one of text data, image data, sound data and program data with which the content icon is associated to the one of an e-mail address, a web site address, a social networking site address and any destination information capable of receiving electronic data with which the destination icon is associated, wherein the destination icon and the content icon are displayed in a first region which is a designated area of the touch panel display, and the destination icon is displayed in the first region by user initiation.

52. The article of manufacturer of claim 51, the tasks further comprising:

a user interface relating to the function with which the one of the functional icons is associated is displayed on the second region.

53. The article of manufacture of claim 51, the tasks further comprising displaying a termination region associated with a function of terminating a function being executed by the mobile terminal.

* * * * *